(12) United States Patent
Knotwell et al.

(10) Patent No.: US 11,489,827 B2
(45) Date of Patent: Nov. 1, 2022

(54) DEDICATED NETWORK AUTHENTICATION AND ALLOCATION FOR DEDICATED VIRTUAL MACHINE HOST CLUSTERS

(71) Applicant: ORACLE INTERNATIONAL CORPORATION, Redwood Shores, CA (US)

(72) Inventors: Bradley P. Knotwell, Bellevue, WA (US); Jagwinder S. Brar, Bellevue, WA (US); David D. Becker, Seattle, WA (US); Cyrus J. Durgin, Seattle, WA (US); Matthew G. Ryanczak, Bainbridge Island, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/092,682

(22) Filed: Nov. 9, 2020

(65) Prior Publication Data
US 2021/0058388 A1 Feb. 25, 2021

Related U.S. Application Data

(63) Continuation-in-part of application No. 16/153,924, filed on Oct. 8, 2018, now Pat. No. 10,862,816.

(51) Int. Cl.
*H04L 9/40* (2022.01)
*G06F 9/455* (2018.01)
*H04L 9/30* (2006.01)

(52) U.S. Cl.
CPC ...... *H04L 63/0823* (2013.01); *G06F 9/45558* (2013.01); *H04L 9/30* (2013.01);
(Continued)

(58) Field of Classification Search
CPC .... H04L 9/0819; H04L 67/10; G06F 13/1663
See application file for complete search history.

(56) References Cited

U.S. PATENT DOCUMENTS 9,983,979 B1 * 5/2018 Dolinsky ............ G06F 11/3664
2009/0109963 A1 * 4/2009 Tanizawa ................ H04L 12/66
370/352

(Continued)

OTHER PUBLICATIONS

Congdon et al., IEEE 802.1X Remote Authentication Dial-In User Service (RADIUS) Usage Guidelines, (Internet Engineering Task Force, 2003) Available at https://tools.ietf.org/html/rfc3580).

(Continued)

*Primary Examiner* — Mahran Y Abu Roumi
(74) *Attorney, Agent, or Firm* — Kraguljac Law Group, LLC

(57) ABSTRACT

Systems, methods, and computer-readable media for operating a dedicated virtual machine host cluster within cloud computing infrastructure are described herein. In one embodiment, an instance principal certificate that includes a virtual network identifier for a dedicated virtual network for the cluster is retrieved by a host computing device. The instance principal certificate is authenticated by the host against a switch to grant access of the host to a virtual network indicated by the virtual network identifier through a network interface card of the host. A virtual function of the network interface card of the host is allocated to a guest virtual machine. The guest virtual machine is launched in the host with the virtual function as a network device of the guest virtual machine.

20 Claims, 20 Drawing Sheets

(52) U.S. Cl.
CPC ............... *G06F 2009/4557* (2013.01); *G06F 2009/45595* (2013.01)

(56) References Cited

U.S. PATENT DOCUMENTS

| | | | |
|---|---|---|---|
| 2010/0174811 A1 | 7/2010 | Musiri et al. | |
| 2011/0225574 A1* | 9/2011 | Khalidi | G06F 8/656 717/168 |
| 2011/0258333 A1* | 10/2011 | Pomerantz | H04L 63/0428 709/229 |
| 2014/0052994 A1* | 2/2014 | Sabin | H04L 9/3247 713/176 |
| 2014/0258733 A1* | 9/2014 | Scott-Nash | G06F 21/64 713/190 |
| 2015/0304315 A1* | 10/2015 | Estehghari | H04L 63/083 713/156 |
| 2016/0103700 A1* | 4/2016 | Bragstad | H05K 999/99 718/1 |
| 2017/0005990 A1* | 1/2017 | Birger | H04L 9/0819 |
| 2019/0007518 A1* | 1/2019 | Mcelhoe | H04L 67/10 |
| 2019/0199626 A1* | 6/2019 | Thubert | H04L 45/245 |

OTHER PUBLICATIONS

Rigney et al., Remote Authentication Dial-In User Service (RADIUS) Internet Engineering Task Force, 2000) (available at https://tools.ietf.org/html/rfc2865).

Simon et al., The EAP-TLS Authentication Protocol (Internet Engineering Task Force, 2008) (available at https://tools.ietf.org/html/rfc5216).

ARRIS ENT.LLC, Ruckus Fastiron Security Configuration Guide, 211-216 (rev. 08.0.70, Jun. 29, 2018) (available at http://docs.ruckuswireless.com/fastiron/08.0.70/fastiron-08070-securityguide/fastiron-08070-securityguide.pdf).

Vocal Technologies, Ltd., EAPoL—Extensible Authentication Protocol over LAN, https://www.vocal.com/secure-communication/eapol-extensible-authentication-protocol-over-lan/ (accessed Oct. 5, 2018).

* cited by examiner

US 11,489,827 B2

DEDICATED NETWORK AUTHENTICATION AND ALLOCATION FOR DEDICATED VIRTUAL MACHINE HOST CLUSTERS

CROSS REFERENCE TO RELATED APPLICATIONS

This disclosure claims the benefit of priority to U.S. patent application Ser. No. 16/153,924 filed Oct. 8, 2018, titled "CLOUD COMPUTING CLUSTER ISOLATION WITH STRONG AUTHENTICATION AND AUTOMATIC CONFIGURATION DEPLOYMENT", with inventors Jagwinder S. BRAR, David D. BECKER, Cyrus J. DURGIN, & Matthew G. RYANCZAK, and assigned to the present assignee, which is incorporated by reference herein in its entirety.

BACKGROUND

Compute clusters of dedicated virtual machine hosts are challenging to create and operate due at least in part to the complexity of cluster network access management. Customers of cloud infrastructure do not wish to involve their guest virtual machines in cluster network access management, and do not wish to administer such access.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
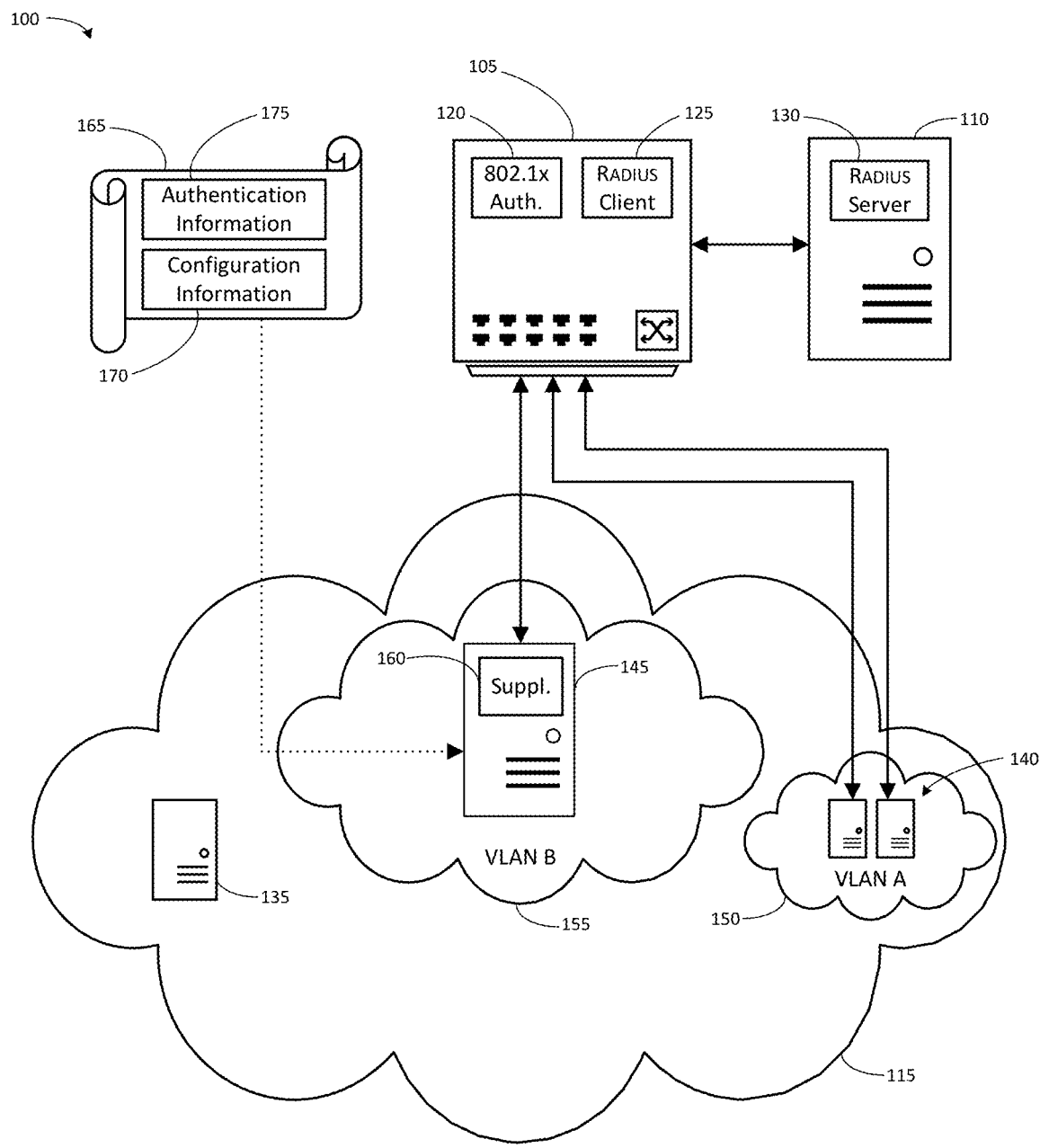
FIG. 1 illustrates one embodiment of a cloud computing system associated with authentication of, configuration deployment for, and traffic isolation between cloud computing customers.

Systems and methods are described herein that provide cloud computing cluster isolation that has strong authentication and automatic configuration deployment. In one embodiment, authentication protocols form a simple network control plane through a modified digital certificate issuance and authentication process. Cluster tenancy and network configuration information is piggybacked on digital certificates to allow the piggybacked information to pass through closed network ports that would otherwise not allow such information through the ports. The piggybacked information is, in one sense, sneaked through a port that only allows authentication traffic to pass by being embedded into the digital certificate that is passed as an authentication credential. Once through the port, the switch passes the authentication credentials to the authentication service which uses the piggybacked information to determine the customer tenancy information. The authentication service then signals the customer tenancy information back to the switch. The switch uses that information to isolate network traffic of one cluster from another using virtual networks. The digital certificate is the piggybacking medium for the network configuration information because the switch is configured to pass the digital certificate on to an authentication service that returns network configuration information to the switch if the certificate is authenticated. The authentication service is customized to extract and pass back the piggybacked network configuration information, rather than generating its own network configuration information.

In one embodiment, a customized public key infrastructure certificate service (PKI service) is used to create digital certificates that include piggybacked virtual network identifiers associated with a computing cluster. Copies of the digital certificate are provided to the physical hosts of the computing cluster. The host includes the digital certificate in an authentication frame that the host sends after the host links-up to a physical port of a switch. The authentication frame passes through an uncontrolled logical port of the physical port, which is a port restricted to only allow authentication traffic to pass through. However, since the digital certificate in the authentication frame is also carrying the piggybacked network configuration information into the switch, the piggybacked data passes through the uncontrolled logical port unperceived or undetected by the port that would otherwise not allow such data to pass.

The switch authenticates the digital certificate as belonging to the cluster using a customized authentication service. The authentication service both authenticates the certificate against a private certificate authority and additionally looks for the presence of any piggybacked data. If present, the authentication service extracts the piggybacked virtual network identifier. The switch then applies the piggybacked virtual network identifier to a controlled port of the physical port, forming a connection isolated from other network traffic passing through the switch. The controlled port of the physical port is then opened, allowing general network traffic to pass between the host and the switch in isolation from other network traffic.

Thus, the cluster tenancy information is provided to the switch in a way that allows the switch to automatically configure a virtual network that isolates the cluster hosts from other network traffic. It is therefore possible to build a customer-isolated cloud network without requiring a smart network interface card or hypervisor because the network provisioning information is dynamically signaled from the authentication service.

In one embodiment, identifying the piggybacked virtual network identifier in the authentication frame received through the uncontrolled port avoids communicating with a hypervisor or smart network interface card, thereby reducing network traffic through the port. Instead, the present configuration and technique allows isolation of the cluster without any host-side functionality, avoiding the need for a hypervisor or smart network interface to be involved in the process or even being present on the host.

Further, the elimination of these host side enforcement mechanisms reduces network latency. There is an observable improvement in network performance (for example, from 10-20 microseconds down to 2 microseconds) for a round-trip measurement because exchanges do not need to be prefaced by isolation enforcement traffic with the hypervisor or smart network interface card. This order of magnitude reduction is significant to customers.

While existing solutions require that the static configurations of the switches be updated often in order to maintain traffic isolation, the static configurations of the switches in embodiments of the present system rarely need to be updated. This increases reliability and reduces traffic overhead on the network. The present system is also simpler to manage due to the implemented features.

Yet another advantage is that the customer may be given a host without a pre-installed operating system (a bare-metal host) with direct access to the cloud computing network. In prior systems, this would be considered very insecure. However in the present system, only opening a port to a host after (i) the host is authenticated as belonging to the cluster, and (ii) the VLAN associated with the host is applied to the port provides strong data isolation. Further, no prior configuration of the hosts is required other than provision of the certificate and an EAPOL/802.1x supplicant module to pass the certificate, which reduces the possibility for error in configuration of the hosts.

Further, configuration in the network is simple. There is no per-customer or per-cluster configuration of the network until the authentication service signals a piggybacked virtual network identifier extracted from a digital certificate provided by a host.

Example Bare Metal System Embodiment

Referring now to FIG. 1, one embodiment of a system 100 for cloud computing cluster isolation that has strong authentication and automatic configuration deployment is shown. System 100 includes a network device such as a switch 105 (described in more detail with reference to FIG. 9 as switch 905), an authentication server 110, and a cloud computing environment 115.

In one embodiment, the switch 105 is configured to implement port-based authentication, such as Extensible Authentication Protocol over Local Area Network (EAPOL, IEEE 802.1x) port-based authentication. (Additional information regarding port-based authentication is included in "IEEE 802.1X Remote Authentication Dial-In User Service (RADIUS) Usage Guidelines," available at https://tools.ietf.org/html/rfc3580.) In this configuration, the physical ports of switch 105 are each divided into two logical port entities: an uncontrolled port and a controlled port.

The uncontrolled port is always open, and is used by the switch 105 to send and receive authentication protocol messages, such as EAPOL frames. The uncontrolled port is used to pass authentication messages between a supplicant host physically connected to the physical port and the authenticator module 120 within the switch 105. The authentication messages are generally used to negotiate authentication/opening of the controlled port. The uncontrolled port only accepts and passes authentication messages. No other network traffic is permitted or passed through the uncontrolled port.

Other network traffic is sent and received by the switch 105 through the controlled port. The physical port may be set to one of two states by the authenticator module 120 of switch 105: an unauthenticated state or an authenticated state.

In the unauthenticated state the controlled port is "closed," and the switch 105 prevents network traffic from entering or exiting through the controlled port. All network traffic that arrives at a closed controlled port is dropped. No network traffic will be passed through a controlled port in a closed state. The unauthenticated state is commonly the default state for physical ports.

In the authenticated state the controlled port is "open," the switch 105 allows network traffic both to enter and exit the controlled port. The open/authenticated port passes all network traffic that arrives at the controlled port.

Thus, the switch 105 will not pass any traffic to or from unauthenticated physical ports (with a closed controlled port) except to process authentication traffic. The authentication traffic, such as Extensible Authentication Protocol—Transport Layer Security (EAP-TLS) authentication, passes through the uncontrolled port. (Additional information regarding the EAP-TLS authentication protocol is included in "The EAP-TLS Authentication Protocol," available at https://tools.ietf.org/html/rfc5216.)

A client host may request access at a physical port in an unauthenticated state and provide authentication information through the uncontrolled port of the physical port. If the authentication is successful, the switch 105 changes the state of the port from unauthenticated to authenticated, opening the controlled port of the physical port to pass traffic. In some situations, the switch may pass the network traffic only into a virtual network assigned by an authentication service as part of the authentication process.

Switch 105 includes an authenticator module 120 and an authentication client module 125. Authenticator module 120 is a port authentication entity that controls access to a network by opening or closing the controlled ports of switch 105. Authenticator module 120 receives, parses, composes, and sends authentication messages, such as EAPOL network traffic. The authentication messages are received from and sent to supplicant cloud hosts through the uncontrolled ports of switch 105. The authenticator module 120 parses messages received from supplicant cloud hosts. Authenticator module 120 operates to enforce isolation of a host connected to the physical port until the host is authenticated. Authenticator module 120 may be implemented as software executed by switch 105, or as an ASIC or other circuit that performs the functions described herein for the authenticator module 120.

Authentication client module 125 is in communication with authentication service module 130 and authenticator module 120. Authentication client module 125 forwards data received from supplicant cloud hosts by the authenticator module 120 to authentication service module 130. Such data can include for example credentials such as username/password or digital certificate. Authentication client module 125 also forwards data received from authentication service module 130 to authenticator module 120. Such data can include for example access authorizations or denials which inform authenticator module 120 whether a port connected to a supplicant cloud host should be opened. Authentication client module 125 may be implemented as software executed by switch 105, or as an ASIC or other circuit that performs the functions described herein for the authentication client module 120.

Communications between Authentication client module 125 and authentication service module 130 may use the Remote Authentication Dial-In User Service (RADIUS) networking protocol. RADIUS is an authentication and authorization protocol for verifying credentials and managing network access. (Additional information regarding RADIUS is included in "Remote Authentication Dial-In User Service (RADIUS)," available at https://tools.ietf.org/html/rfc2865.)

Authentication server 110 includes authentication service module 130. Authentication service module 130 parses data received from authentication client module 125 and determines whether the credentials of the supplicant cloud host are valid and authorized. Authentication service module 130 additionally composes messages to authentication client module authorizing or declining to authorize opening the controlled port connected to the supplicant host. Authentication server 110 may, in some embodiments, be switch 105, rather than a separate server device, and authentication service module 130 is hosted by switch 105. In other embodiments, authentication server 110 may be a separate server device external to switch 105. In some embodiments, authentication service module 130 may be part of an authentication service hosted by multiple redundant external authentication server 110 devices. Authentication service module 130 may be implemented as software executed by switch 105 or authentication server 110, or as an ASIC or other circuit that performs the functions described herein for the authentication service module 130.

Authentication service module 130 may be a server application supporting RADIUS protocols, such as the open-source FreeRadius server, with certain custom modifications. In one embodiment, authentication service module 130 is configured not only to authenticate received certificates against a private certificate authority, but also to extract piggybacked configuration information, such as a piggybacked virtual network identifier. The authentication service module 130 parses a received digital certificate to detect the presence of piggybacked configuration information. In one embodiment, X.509 attributes considered to be optional are used to carry this piggybacked configuration information. The piggybacked configuration information may be contained, for example, in an otherwise unused X.509 attribute that is available to the server for processing, such as proprietary certificate extension msUPN. This piggybacked configuration information may be encrypted, and the authentication service module 130 is configured to decrypt it. The authentication service module 130 is configured to extract the piggybacked configuration information and make it available to the switch 105 by storing it, for example, as a data structure in memory 915, storage 935, or data 940. In one embodiment, the authentication service module 130 is configured to extract a piggybacked virtual network identifier and make it available to the switch 105 as one or more environment variables.

In one embodiment, cloud computing environment 115 is a computing/data processing system including an application or collection of distributed applications for enterprise organizations. The applications and computing system 100 may be configured to operate with or be implemented as a cloud-based networking system, a software as a service (SaaS) architecture, or other type of networked computing solution Cloud computing environment 115 incorporates one or more cloud hosts such as cloud hosts 135, 140, and 145. The cloud hosts are physical computers (such as computer 805, shown in FIG. 8) with a network device (such as network devices 855, shown in FIG. 8). The network device of each cloud host is connected to a physical port of switch 105 (or of another switch connected to switch 105). The connection between the network device and the port may be a wired, wireless, fiber-optic, or other connection capable of carrying data signals between the network device and the port. In one embodiment, each cloud host may be a rack-mounted server, and the switch 105 may be a top-of-rack (ToR) ethernet switch. The servers of multiple such rack units may be interconnected by interconnecting the top-of-rack switches of each rack. In one embodiment, a computing cluster may include as many as 18 cloud hosts per rack, across 32 racks in a data center, for 576 cloud hosts total in a cluster.

The cloud hosts are each associated with a computing cluster in the cloud computing environment 115. In some embodiments, it is desirable to isolate the network traffic of one computing cluster in the cloud computing environment 115 from the network traffic of another computing cluster. For example, it may be desirable to isolate the network traffic of one or more computing cluster(s) associated with one client entity (such as a customer) of the cloud computing environment 115 from the network traffic of other computing clusters associated with one or more different client entities, but not from the network traffic of other computing clusters associated with the one client entity.

Accordingly, the network traffic generated by the cloud hosts may be isolated in virtual networks, such as virtual networks 150 and 155. Cloud host 135 is shown un-isolated within the cloud computing environment. Cloud hosts 140 are shown isolated from the network traffic of cloud hosts 135 and 145 within virtual network VLAN A 150. Cloud host 145 is shown isolated from the network traffic of cloud hosts 135 and 140 within virtual network VLAN B 155.

Cloud hosts, such as cloud hosts 135, 140, and 145, are configured with supplicant module 160. Supplicant module 160 communicates with authentication module 120 using EAPOL authentication messages. Supplicant module 160 may be implemented as software executed by cloud hosts 135, 140, or 145, or as an ASIC or other circuit that performs the functions described herein for the supplicant module 160. In some embodiments, supplicant module 160 may be implemented as a software application, an operating system kernel module, part of the operating system kernel, firmware on a network interface card of the cloud hosts 135, 140, or 145, or even as part of the hardware of the network interface card.

A cloud host, such as cloud host 145, may be provided with the digital certificate 165 that includes piggybacked configuration information 170 in addition to authentication information 175. The piggybacked configuration information 170 may include a virtual network identifier associated with the computing cluster to which a cloud host belongs.

In one embodiment, switch 105 is configured by default to place the controlled port of the port physically connected to a cloud host in the unauthorized/closed state at cloud host boot-up or link-up. Thus, at cloud host boot-up, the cloud host is physically connected to switch 105 but is not communicatively connected with the switch 105 through any authorized/open controlled port, as shown by cloud host 135. In order to communicatively connect the cloud host to switch 105, digital certificate 165 is provided to the cloud host, as shown by cloud host 145. The piggybacked configuration information 170 indicates that cloud host 145 should have an isolated connection to VLAN B 155.

In response to a prompt from the authenticator module 120 at cloud host link-up, supplicant 160 of cloud host 145 sends an EAP-response message that contains the digital certificate through the uncontrolled port to authenticator module 120. Authentication client module 125 sends an ACCESS-REQUEST message including the digital certificate to authentication service module 130. Authentication service module 130 parses the digital certificate 165 to extract the authentication information 175 and the piggybacked configuration information 170. Authentication service module 130 authenticates the digital certificate based on the authentication information 175.

If the authentication process is successful and the piggybacked configuration information 170 was present, authentication service module 130 sends an ACCESS-ACCEPT message to authentication client module 125 that includes at least some of the piggybacked configuration information 170 such as the virtual network identifier indicating VLAN B. Switch 105 then applies the virtual network identifier "VLAN B" to the controlled port of the port physically connected to cloud host 145, thus creating an isolated connection. Then, switch 105 opens the controlled port of the port physically connected to cloud host 145.

If the authentication process is unsuccessful and or the piggybacked configuration information 170 is not present authentication service module 130 sends an ACCESS-REJECT message to authentication client module 125. Switch 105 would then apply a quarantine virtual network identifier to the controlled port of the port physically connected to cloud host 145 thus creating an isolated connection. Then switch 105 opens the controlled port of the port physically connected to cloud host 145, limiting the access of cloud host 145 to the quarantined VLAN only.

Example Bare Metal Method Embodiment

Figure 2:
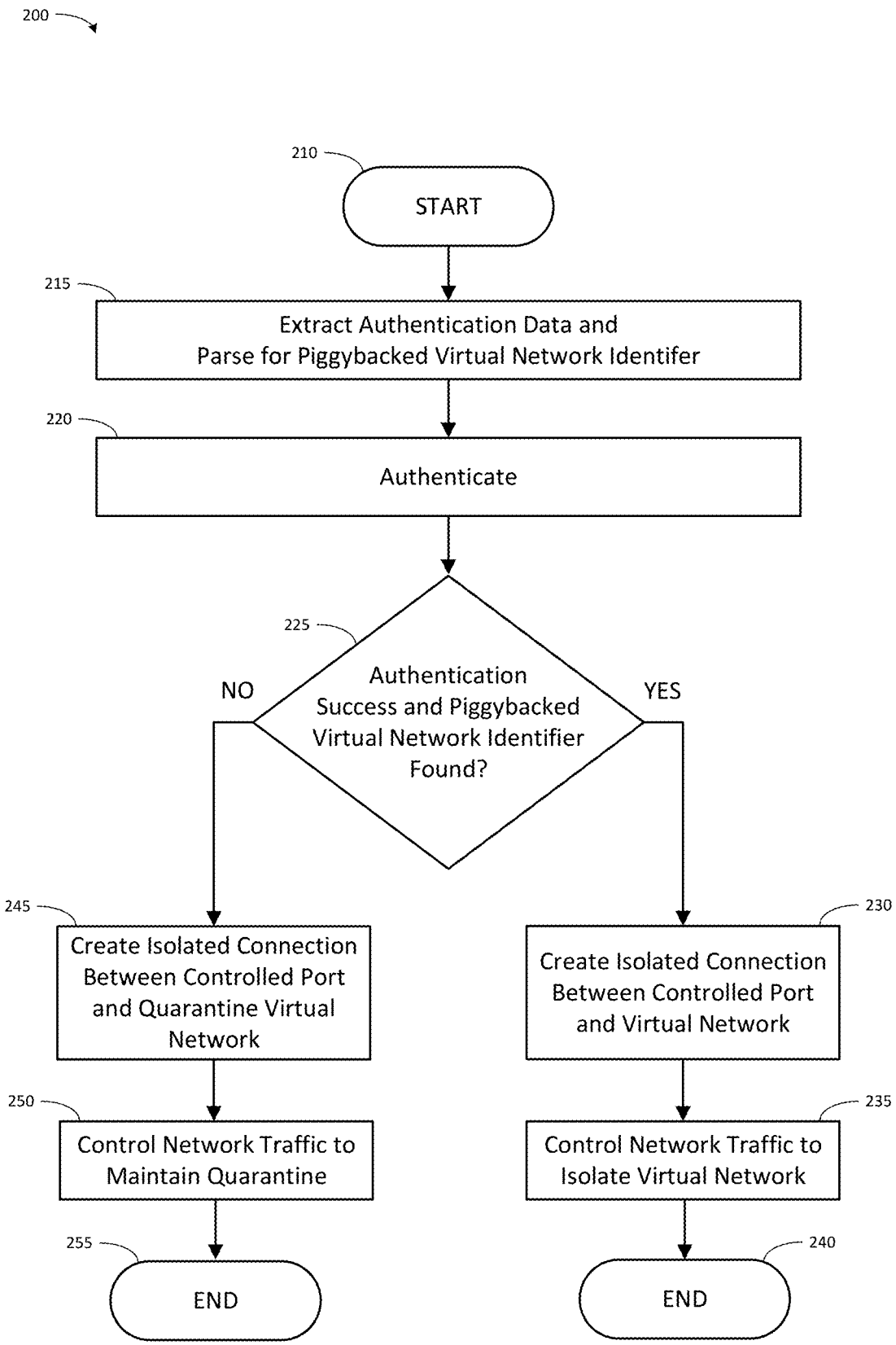
FIG. 2 illustrates one embodiment of a computer-implemented method associated with authentication of, configuration deployment for, and traffic isolation between cloud computing customers.

FIG. 2 shows an embodiment of a computer-implemented method 200 associated with cloud computing cluster isolation that has authentication and automatic configuration deployment. In one embodiment, a network device (such as switch 905, shown in FIG. 9) is implemented with an executable algorithm that is configured to perform the method 200. The network device 905 has at least one of its physical ports (such as network ports 980, shown in FIG. 9) logically divided into (i) a controlled port and (ii) an uncontrolled port. Method 200 may initiate following various triggers, such as (i) receiving an authentication frame through an uncontrolled port of the network device, (ii) receiving a signal indicating that a user has initiated method 200, or (iii) launching method 200 based on a scheduled time(s) or time interval(s).

The method 200 initiates at start block 210 and processing continues to process block 215. At process block 215, in response to receiving an authentication frame through the uncontrolled port, data is extracted from the authentication frame for performing authentication, and the authentication frame is parsed to identify a piggybacked virtual network identifier that functions as an instruction to create an isolated connection. In one embodiment, the extracting and parsing include one or more of the following steps.

Initially, processor 910 parses the authentication frame to identify a digital certificate. On identification, processor 910 extracts the digital certificate and stores it, for example as a data structure in memory 915, storage 935, or data 940.

In one embodiment, where the authentication service is implemented by switch 905, processor 910 then parses the digital certificate to identify the authentication data. Processor 910 then extracts the authentication data and stores it, for example as a data structure in memory 915, storage 935, or data 940.

Processor 910 additionally parses the digital certificate to identify piggybacked configuration information that contains a piggybacked virtual network identifier. Processor 910 then extracts the piggybacked configuration information and stores it, for example as a data structure in memory 915, storage 935, or data 940. In some embodiments, the piggybacked configuration information is an encrypted blob. If the piggybacked configuration information is encrypted, Processor 910 decrypts the piggybacked configuration information, and then parses the (decrypted) piggybacked configuration information to identify the piggybacked virtual network identifier. In one embodiment, the piggybacked virtual network identifier may include both a VLAN ID, and a VXLAN VNI. Processor 910 extracts the piggybacked virtual network identifier and storing it, for example as a data structure in memory 915, storage 935, or data 940.

Figure 8:
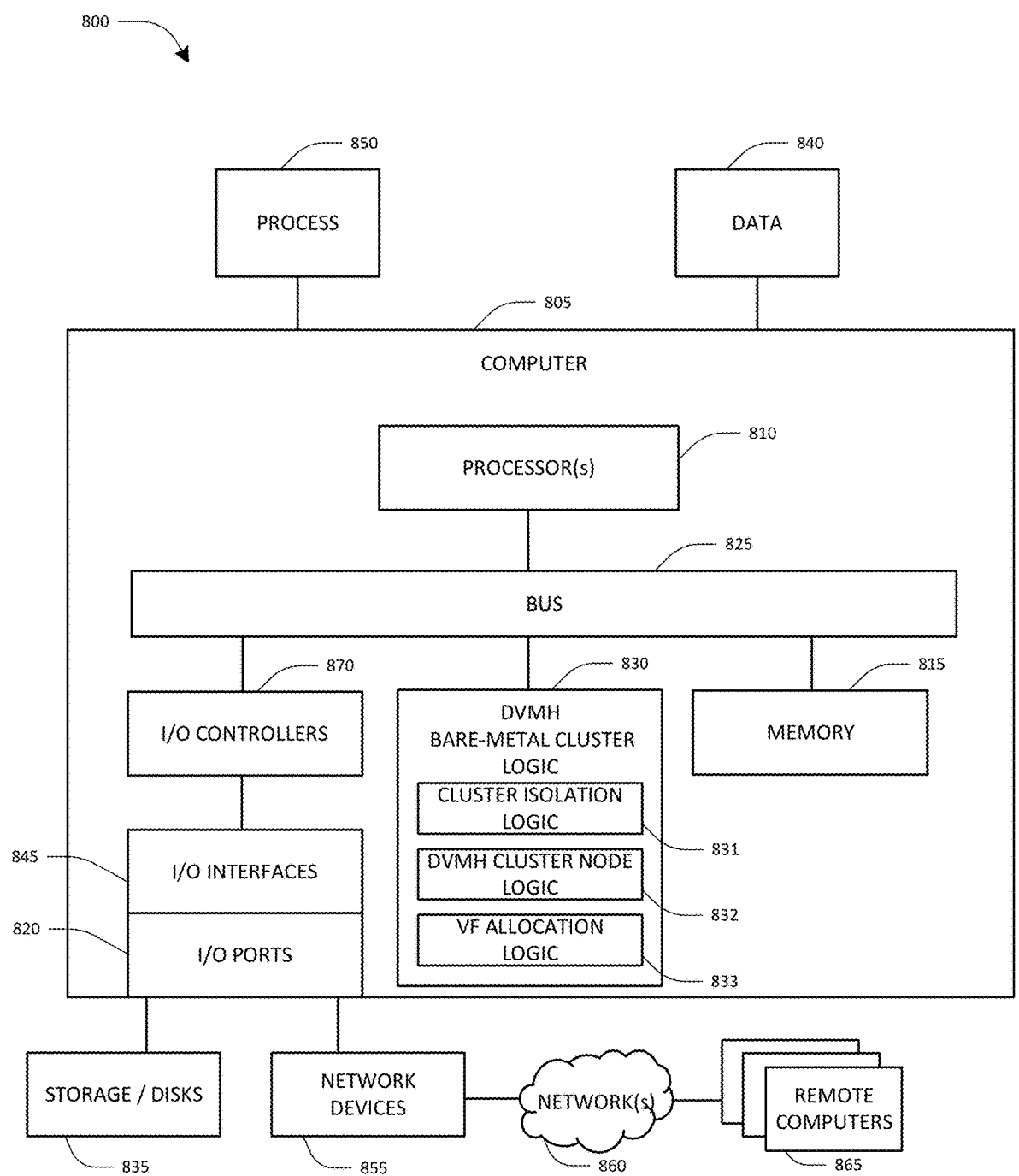
FIG. 8 illustrates an embodiment of a computing system configured with the example systems and/or methods disclosed.
Figure 9:
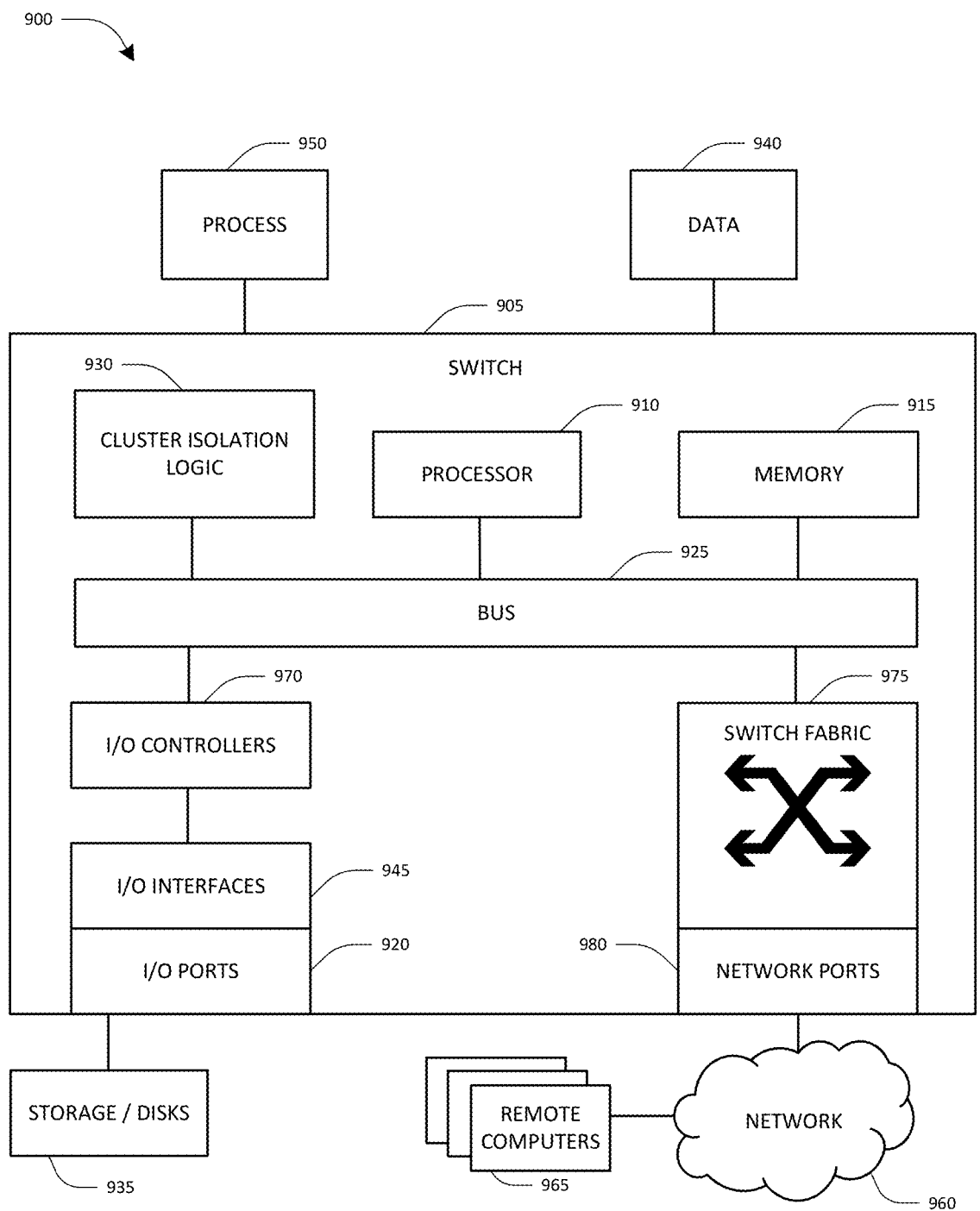
FIG. 9 illustrates an embodiment of a network switch configured with the example systems and/or methods disclosed.

In another embodiment, where the authentication service is implemented by one or more external authentication server devices (such as computer 805, shown in FIG. 8), processor 905 sends the digital certificate to an external authentication server device through a network (such as network 860, shown in FIG. 8, or network 960, shown in FIG. 9, and which may be the same network). Processor 810 (shown in FIG. 8) of the external authentication server, rather than processor 910 of the switch 905, performs the steps described above to extract the piggybacked virtual network identifier. Processor 810 stores the piggybacked virtual network identifier, for example as a data structure in memory 815, storage 835, or data 840.

In some embodiments, the piggybacked virtual network identifier functions as an instruction to create an isolated connection between the controlled port and a virtual network indicated by the piggybacked virtual network identifier.

Upon completion of the extraction and storage of (i) the authentication information and (ii) the piggybacked virtual network identifier, processor 910 (if performed locally on the switch 905) or processor 810 (if performed on the external authentication server device) sends a message or stores data indicating that the extraction and storage is complete. Process block 215 completes and processing continues at process block 220.

At process block 220, the digital certificate is authenticated based on the stored authentication data. In one embodiment, the authenticating includes one or more of the following steps.

In an embodiment where the authentication service is implemented by switch 905, processor 910 parses the message or data indicating that the extraction and storage is complete to determine whether or not to begin process block 215. Processor 910 retrieves the stored authentication data and authenticates the digital certificate based on this data. In one embodiment, the certificate is authenticated by passing the authentication data to a private certificate authority. In another embodiment, the authentication process is customized such that the certificate is valid so long as it has not expired and is signed by the private certificate authority (a trusted certificate authority).

Processor 910 receives a message or data from the certificate authority indicating either that the digital certificate is authentic, or that the digital certificate is not authentic, and storing it, for example as a data structure in memory 915, storage 935, or data 940. The authentication verifies that the host belongs to a cluster associated with the piggybacked virtual network identifier.

In an embodiment where the authentication service is implemented by the external authentication server device, processor 810 of the external authentication server, rather than processor 910 of the switch 905, performs the steps described above to authenticate the digital certificate. Once processor 810 has received a message or data that the certificate is authentic or is not authentic, processor 810 sends this result to switch 905, and processor 910 of switch 905 stores it, for example as a data structure in memory 915, storage 935, or data 940.

Upon completion of the authenticating, processor 910 sends a message or stores data indicating that the result of the authentication has been stored. Process block 220 completes and processing continues at decision block 225.

In some embodiments, the certificate authority should be private because the signed certificates will be valid for authentication. This certificate authority should be inaccessible outside system 100.

At decision block 225, processor 910 determines whether the authentication was successful, and whether the piggybacked virtual network identifier was found. In one embodiment, the determining includes one or more of the following steps. Processor 910 parses the message or data indicating that the result of the authentication has been stored to determine whether or not to begin decision block 225. Processor 910 retrieves the stored piggybacked virtual network identifier and the stored message from the certificate authority indicating the authenticity of the certificate. Processor 910 determines from the stored piggybacked virtual network identifier and from the stored message whether the authentication was successful and the piggybacked virtual network identifier was identified.

If the authentication was successful and the piggybacked virtual network identifier was identified, processor 910 sends a message or stores data indicating a success condition. In one embodiment, processor 910 has authentication server return the piggybacked virtual network identifier to the authentication client as switch configuration information. Process block 225 completes and processing continues at decision block 230. If the authentication was not successful or the piggybacked virtual network identifier was not identified, processor 910 sends a message or stores data indicating a failure condition. Process block 225 completes and processing continues at decision block 245.

At process block 230, processor 910 creates the isolated connection between the controlled port and a virtual network that is identified by the piggybacked virtual network identifier. In one embodiment, the creating includes one or more of the following steps. Processor 910 parses the message or data indicating a success condition to determine that process block 230 should begin. Processor 910 retrieves the stored piggybacked virtual network identifier.

If no virtual network identified by the piggybacked virtual network identifier is presently configured on the network device 905, processor 910 creates a new virtual network and gives the new virtual network the piggybacked virtual network identifier as its network identifier. Alternatively, a virtual network with the same identifier as the piggybacked virtual network identifier is configured on network device 905 prior to retrieving the piggybacked virtual network identifier.

Processor 910 then creates the isolated connection between the controlled port and a virtual network that is identified by the piggybacked virtual network identifier. In some embodiments, creating the isolated connection includes processor 910 connects the controlled port to the virtual network as the isolated connection. The networking device is configured to direct all traffic received though the controlled port into the virtual network. This is in order to isolate the controlled port before opening the controlled port to pass network traffic other than authentication traffic.

At the time the host links-up to the controlled port, the controlled port is in a closed (physical port unauthorized)

state preventing the passage of network traffic other than authentication traffic. After the isolated connection between the controlled port and the virtual network, processor 910 opens the controlled port to permit the passage of network traffic between a host and the virtual network through the isolated connection. To open the controlled port, the physical port is set to an authorized state. Upon opening the controlled port with an isolated connection to the virtual network, process block 230 completes and processing continues at process block 235.

At process block 235, network device 105 controls network traffic entering and leaving the network device to isolate the network traffic of the virtual network from other network traffic through the network device. In one embodiment, this controlling includes one or more of the following steps. Network device 105 operates to allow only network traffic entering the network device at the controlled port or one or more additional controlled ports assigned to the virtual network to enter the virtual network. Network device 105 prevents any network traffic not arriving through ports assigned to the virtual network from passing through the ports assigned to the virtual network. Process block 235 subsequently completes and processing continues to end block 240, where processing completes.

Note that method 200 does not require modification of any static configuration of the network device in order to create an isolated customer network. Thus, creating the isolated connection between the controlled port and a virtual network effects a dynamic network configuration of a customer overlay network without modifying a static configuration of the network device. The need for a configuration management system to enforce the isolation of customer overlay networks through modification of the static configurations of switches is obviated.

Further, the port-based nature of the authentication process ensures that no wiring or configuration errors can cause an incorrect port to be authenticated.

Example Authentication Progression with Piggybacked Configuration

Figure 3:
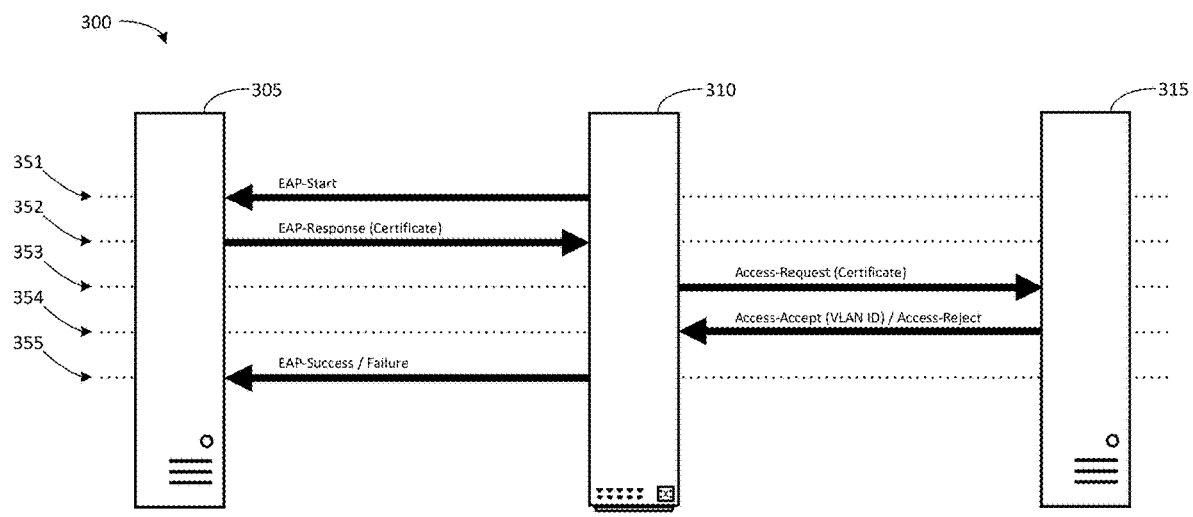
FIG. 3 illustrates one embodiment of an authentication progression between elements of the system to authenticate, configure deployment, and isolate traffic for a new cloud computing customer host.

FIG. 3 illustrates one embodiment of an authentication progression 300 between elements of the system 100 to authenticate, configure deployment, and isolate traffic for a new cloud computing customer host. Authentication messaging between a new host 305, a switch 310 (such as switch 105), and an authentication service 315 (such as authentication service module 130 of authentication server 110), operates to connect new host 305 to 80 a cloud computing environment, such as cloud computing environment 115.

The supplicant of host 305 and the authenticator of switch 310 exchange authentication messages between the host 305 and the switch 310. In some embodiments the authentication messages exchanged between host 305 and switch 310 are 802.1x/EAP frames. As discussed above, the authentication messages passed between the host 305 and the switch 310 pass through the uncontrolled port of the physical port by which the host 305 is connected to the switch 310. Thus, authentication frames may be received by the switch 310 through the uncontrolled port when the controlled port is closed.

Embodiments of the system and method make advantageous use of this port configuration, enabling a piggybacked virtual network identifier to pass through the uncontrolled port because the piggybacked data is added to a digital certificate included as a credential in the authentication frame. Adding the piggybacked data to the digital certificate makes the piggybacked data hidden from the port/switch. This allows the piggybacked data to pass through undetected as part of the digital certificate and/or the authentication frame. This virtual network identifier is thus "piggybacked" through the uncontrolled port, allowing host 305 to provide network configuration information to the switch 310 even though the controlled port is closed.

The authentication client of switch 310 and the authentication service 315 exchange authentication messages. In some embodiments the authentication messages exchanged between switch 310 and authentication service 315 are RADIUS access packets.

Advantageous use is also made of the authentication process. The switch 310 is not ordinarily configured to extract the piggybacked data received through the uncontrolled port. But, the switch 310 will further the pass digital certificate to authentication service 315. An authentication request may be made by sending an access-request packet that includes credentials to the authentication service 315. The digital certificate is one such credential. Adding the piggybacked data to the digital certificate allows the piggybacked data to be passed to the authentication service 315 using the ordinary handling processes of switch 310. The virtual network identifier is thus "piggybacked" to the authentication service 315, allowing the authentication service 315 to receive network configuration information from the host 305, even though the controlled port is closed.

The order of messages between host 305, switch 310, and authentication service 315 is indicated by references 351-355.

At reference 351, the authenticator of switch 310 sends a message requesting the identity of new host 305, such as an EAP-Request Identity frame. This message may have been sent in response to the switch 310 detecting the new host 305 at the physical port. The message is received by the supplicant of new host 305.

In response to receiving the message at reference 351, at reference 352, the supplicant of host 305 sends a message providing the identity of new host 305, along with a certificate including a piggybacked virtual network identifier, to the switch 310. This may be an EAP-Response Identity frame containing a host identifier for the new host 305 such as a user identifier. The message is received by the authenticator of switch 310.

In response to switch 310 receiving the message at reference 352, the switch 310 attempts to authenticate the new host 305 against authentication service 315. At reference 353, the authenticator parses the message to extract the host identifier and the certificate from the message. The authentication client (such as authentication client 125) of the switch 310 then encapsulates at least the host identifier and the certificate in an access request message and sends it to the authentication service 315. In some embodiments, the access request message should include the host identifier, the certificate, the port number of the physical port of the switch 310 to which the new host is connected (the source port for the message), the media type of the port, and the media access control (MAC) address of the new host. The port number, media type, and host MAC address are information available to the switch 310. The access request message may be a RADIUS Access-Request package, and the host identifier may be passed using RADIUS attribute 5, Username; the certificate may be passed using RADIUS attribute 2, User-Password; the port number may be passed using RADIUS attribute 5, NAS-Port; the media type may be passed using RADIUS attribute 61, NAS-Port-Type; and host MAC address may be passed using RADIUS attribute 31, Calling-Station-ID.

In response to receiving the message at reference 353, authentication service 315 attempts to authenticate the certificate and retrieve the piggybacked virtual network identifier. An ordinary authentication service would authenticate the certificate and, if the authentication was successful, respond with a message to the switch 310 indicating that access should be granted, such as a RADIUS Access-Accept message. However, authentication service 315 authenticates the certificate, and additionally parses it to extract the piggybacked virtual network identifier. If the authentication was successful, and the piggybacked virtual network identifier was found, authentication service 315 responds with a message to the switch 310 indicating that access should be granted (such as a RADIUS Access-Accept message).

If the authentication service 315 successfully authenticates the certificate, and the piggybacked virtual network identifier was found, at reference 354 authentication service 315 sends a message back to the switch 310 indicating that access should be granted. In some embodiments, this message should include an instruction to use a VLAN, and the piggybacked virtual network identifier. The message may be a RADIUS Access-Accept package, and the instruction to use a VLAN may be passed using RADIUS attribute 64, Tunnel-Type with Value 13 (which indicates a VLAN); and the piggybacked virtual network identifier may be passed using RADIUS attribute 81, Tunnel-Private-Group-ID.

If the authentication service 315 does not successfully authenticate the certificate, or the piggybacked virtual network identifier is not found, at reference 354 authentication service 315 sends a message back to the switch 310 indicating that access should not be granted. In some embodiments, this message may be a RADIUS Access-Reject package.

In response to receiving the message at reference 354 indicating that access should be granted, switch 310 applies the piggybacked virtual network identifier to the controlled port, causing all network traffic arriving at the controlled port to be directed into a virtual network indicated by the piggybacked virtual network identifier, and permitting network traffic to pass to the controlled port from within the virtual network. Switch 310 then sets the controlled port to an open state (physical port authorized state), allowing network traffic to pass between the new host 305 and the virtual network. At reference 355, switch 310 sends a message indicating that access was granted to new host 305. This message may take the form of an EAP-Success frame.

In response to receiving the message at reference 354 indicating that access should not be granted, switch 310 maintains the controlled port in a closed state (physical port unauthorized state) and awaits further authentication traffic requests.

In the event that the authenticator authenticates a port, but a virtual network identifier does not accompany the message that access should be granted, switch 310 applies a quarantine virtual network identifier to the controlled port, causing all network traffic arriving at the controlled port to be directed into a quarantine virtual network indicated by the quarantine virtual network identifier. This prohibits communication with any other port. In one embodiment, switch 310 then sets the controlled port to an open state (physical port authorized state), allowing network traffic to pass between the new host 305 and the quarantine virtual network. In an alternative embodiment, the controlled port is set to an unauthorized (closed) state. At reference 355, switch 310 sends a message indicating that access was not granted to new host 305. This message may take the form of an EAP-Failure frame.

Note that in some embodiments, additional message traffic may be interspersed with the foregoing traffic in order to effect the described outcome or to support additional features. For example, traffic for security protocol negotiation, such as when using the Extensible Authentication Protocol—Transport Layer Security (EAP-TLS) protocol. Further, information described above as being passed by a single message may be passed by multiple messages, or the other way around.

Isolating Cluster Traffic on a Single Switch

To isolate each computing cluster from all other computing clusters in the cloud computing environment, a unique virtual network is applied to the cluster. Each cluster is associated in a one-to-one relationship with a unique virtual network. In one embodiment where the number of hosts in a computing cluster does not exceed the number of available switch ports, a unique virtual local area network (VLAN) per cluster per switch is provided. This may be the case for example in a single-rack computing cluster configuration.

Here, processor 910 causes network device 105 to (i) create a second isolated connection between the second controlled port and a second virtual network; and (ii) control network traffic to isolate the second virtual network from the network traffic received through the controlled port. Processor 910 may cause network device 105 to permit network traffic to enter the virtual network only through either (i) the isolated connection or (ii) one or more additional isolated connections to one or more additional controlled ports. Processor 910 may also cause network device 105 to prevent network traffic that enters the virtual network from exiting the virtual network except through either (i) the isolated connection or (ii) the one or more additional isolated connections.

Figure 4:
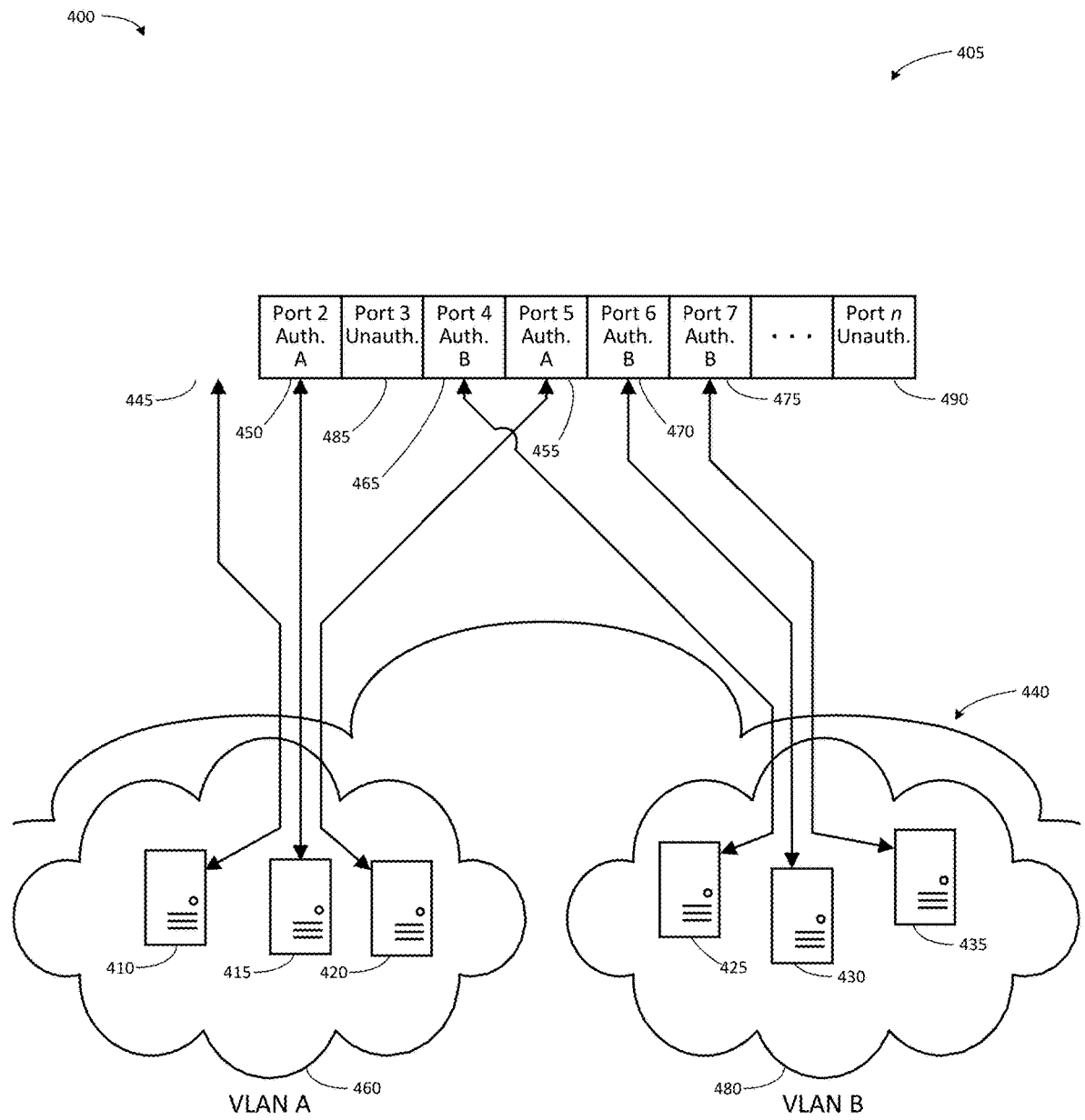
FIG. 4 illustrates an embodiment of a system associated with authentication of, configuration deployment for, and traffic isolation between cloud computing customers in a single-switch environment.

Referring now to FIG. 4, one embodiment 400 shows a switch 405 which has hosts 410-435 provisioned to two separate cloud computing clusters in a cloud computing environment 440. The hosts 410, 415, and 420 are connected to Port 1 445, Port 2 450, and Port 5 455, respectively. The hosts 410, 415, and 420 are authenticated as belonging to a first cluster and the network traffic through Port 1 445, Port 2 450, and Port 5 455, is assigned to virtual network A 460. The hosts 425, 430, and 435 are connected to Port 4 465, Port 6 470, and Port 7 475. The hosts 425, 430, and 435 are authenticated as belonging to a second cluster and the network traffic through Port 4 465, Port 6 470, and Port 7 475, is assigned to virtual network B 480. Port 3 485 and all other ports 490 of switch 405 are set to an unauthenticated state.

Switch 405 enforces the separation of virtual network A 460 and virtual network B 480. Network traffic from any of hosts 410, 415, and 420 may only pass through each of Port 1 445, Port 2 450, and Port 5 455. Network traffic from any of hosts 410, 415, and 420, may not pass through any of Port 4 465, Port 6 470, Port 7 475, or any unauthorized port, 485, 490.

A new host may join either of virtual network A 460 or virtual network B 480, or may be assigned to a further virtual network by presenting a digital certificate with piggybacked configuration information at an unauthorized port, 485, 490. Further, any of the existing hosts 410, 415, 420, 425, 430, and 435 may be disconnected from their current virtual network and assigned to another virtual network by presenting a digital certificate with other piggybacked configuration information that indicates a different virtual network than the one to which the host is presently connected.

In this way, the traffic of two network clusters can pass in isolation through the switch.

Isolating Cluster Traffic Across Multiple Switches

In another embodiment, (i) the number of hosts in a computing cluster exceeds the number of available switch ports thus requiring multiple switches, or (ii) multiple switches may otherwise be desirable or required to support the hosts of a computing cluster. In this case, separate VLANs per switch are used in conjunction with a further virtual network encapsulation, such as virtual extensible LAN (VXLAN), to carry traffic between switches and maintain isolation. This may be the case for example in a multiple-rack computing cluster configuration.

Here, at least one of the one or more additional controlled ports is a logical division of a second physical port included in a second networking device and the virtual network includes an overlay network for interconnecting two or more subnetworks. The processor 910 causes the network device 105 to parse the piggybacked virtual network identifier to identify (i) an overlay network identifier that indicates the overlay network, and (ii) a first subnetwork identifier that indicates a first virtual subnetwork associated with the networking device. The overlay network identifier functions as an instruction to create an isolated interconnection. In response to identifying the overlay network identifier, processor 910 creates the isolated interconnection between the first virtual subnetwork and at least a second virtual subnetwork associated with the second networking device. There is also a second isolated connection between the second virtual subnetwork and the at least one of the one or more additional controlled ports.

Figure 5:
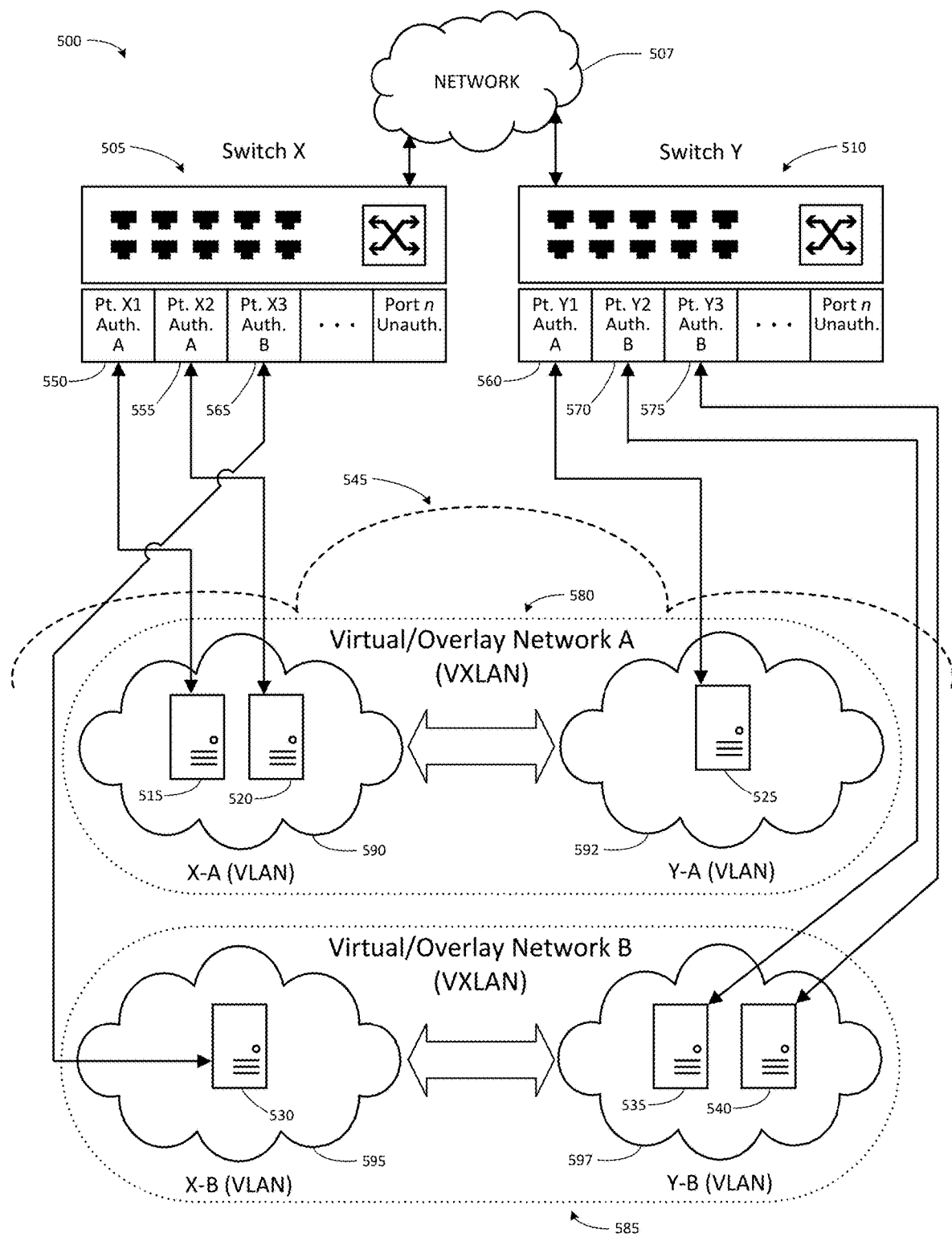
FIG. 5 illustrates an embodiment of a system associated with authentication of, configuration deployment for, and traffic isolation between cloud computing customers in a multi-switch environment.

Referring now to FIG. 5, one embodiment 500 shows a switch X 505 connected by a network 507 to a switch Y 510. Switches X 505 and Y 510 have hosts 515-540 provisioned to two separate cloud computing clusters in a cloud computing environment 545. The hosts 515 and 520 are connected to Port X1 550 and Port X2 555, respectively, of switch X 505. Host 525 is connected to Port Y1 560 of switch Y 510. Host 530 is connected to Port X3 565 of switch X 505. The hosts 535 and 540 are connected to Port Y2 570 and Port Y3 575, respectively, of switch Y 510. The hosts 515, 520, and 525 are authenticated as belonging to a first cluster and the network traffic through Port X1 550, Port X2 555, and Port Y1 560, is assigned to virtual/overlay network A 580, which includes virtual network X-A 590 and virtual network Y-A 592. The hosts 530, 535, and 540 are authenticated as belonging to a second cluster and the network traffic through Port X3 565, Port Y2 570, and Port Y3 575, is assigned to virtual/overlay network B 585, which includes virtual network X-B 595 and virtual network Y-B 597. The virtual/overlay networks may be implemented as VXLANs. The virtual networks may be implemented as VLANs. All other ports of switch X 505 and switch Y 510 are set to an unauthenticated state.

The switches, switch X 505 and switch Y 510 enforce the separation of traffic between hosts assigned to separate virtual/overlay networks in a similar manner as described above with reference to FIG. 4 by isolating the traffic within virtual networks associated with the virtual/overlay networks. Switch X 505 thus prevents the exchange of network traffic between hosts 515 and 520, which are assigned to virtual network X-A 590, and host 530, which is assigned to virtual network X-B 595. Also, switch Y 510 prevents the exchange of network traffic between host 525, which is assigned to virtual network Y-A 592, and hosts 535 and 540, which are assigned to virtual network Y-B 597.

In addition, the switches also pass network traffic between a virtual network and other switches, provided that the network traffic is associated with the same virtual/overlay network as is the virtual network. Thus, switch X 505 and switch Y 510 permit the exchange of network traffic between hosts 515 and 520, and host 525, each of which is assigned to the same virtual/overlay network A 580. Similarly, switch X 505 and switch Y 510 permit the exchange of network traffic between host 530 and hosts 535 and 540, each of which is assigned to the same virtual/overlay network B 585. But, switch X 505 and switch Y 510 prevent the exchange of network traffic between hosts 515 and 520, which are assigned to virtual/overlay network A 580 and hosts 535 and 540, which are assigned to virtual/overlay network B 585. Similarly, switch X 505 and switch Y 510 prevent the exchange of network traffic between host 525, which is assigned to virtual/overlay network A 580 and host 530, which is assigned to virtual/overlay network B 585.

Network traffic from hosts 515 and 520 belongs to VLAN X-A, as such it may only pass through each of port X1 550, port X2 555, and to switch Y 510 through a VXLAN associated with virtual/overlay network A 580. Switch Y 510 will only pass traffic arriving through the VXLAN associated with virtual network A 580 into the VLAN associated with Y-A—or to host 525 on port Y1 560. Network traffic from host 530 belongs to VLAN X-B, as such it may not pass through either of Port X1 550 or Port X2 555, or any unauthorized port. Network traffic from hosts 535 and 540 belongs to VLAN Y-B, as such it may only pass through each of port Y2 570, port Y3 575, and to Switch X 505 through a VXLAN associated with virtual/overlay network B 585. Switch X 505 will only pass traffic arriving through the VXLAN associated with virtual network B 585 into the VLAN associated with X-B—or to host 530 on port X3 565. Network traffic from host 525 belongs to VLAN Y-A, as such it may not pass through either of Port Y2 570 or Port Y3 575, or any unauthorized port.

The virtual networks X-A 590 and Y-A 592 are linked by the VXLAN associated with virtual/overlay network A 580. The virtual networks X-B 595 and Y-B 597 are linked by the VXLAN associated with virtual/overlay network B 585.

A new host may join either of virtual network A 480 or virtual network B 485, or may be assigned to a further virtual network by presenting a digital certificate with piggybacked configuration information at an unauthorized port of either switch X 505 or Switch Y 510

In this way, the traffic of two network clusters can pass in isolation across multiple switches.

Bare Metal Cluster Setup

Figure 6:
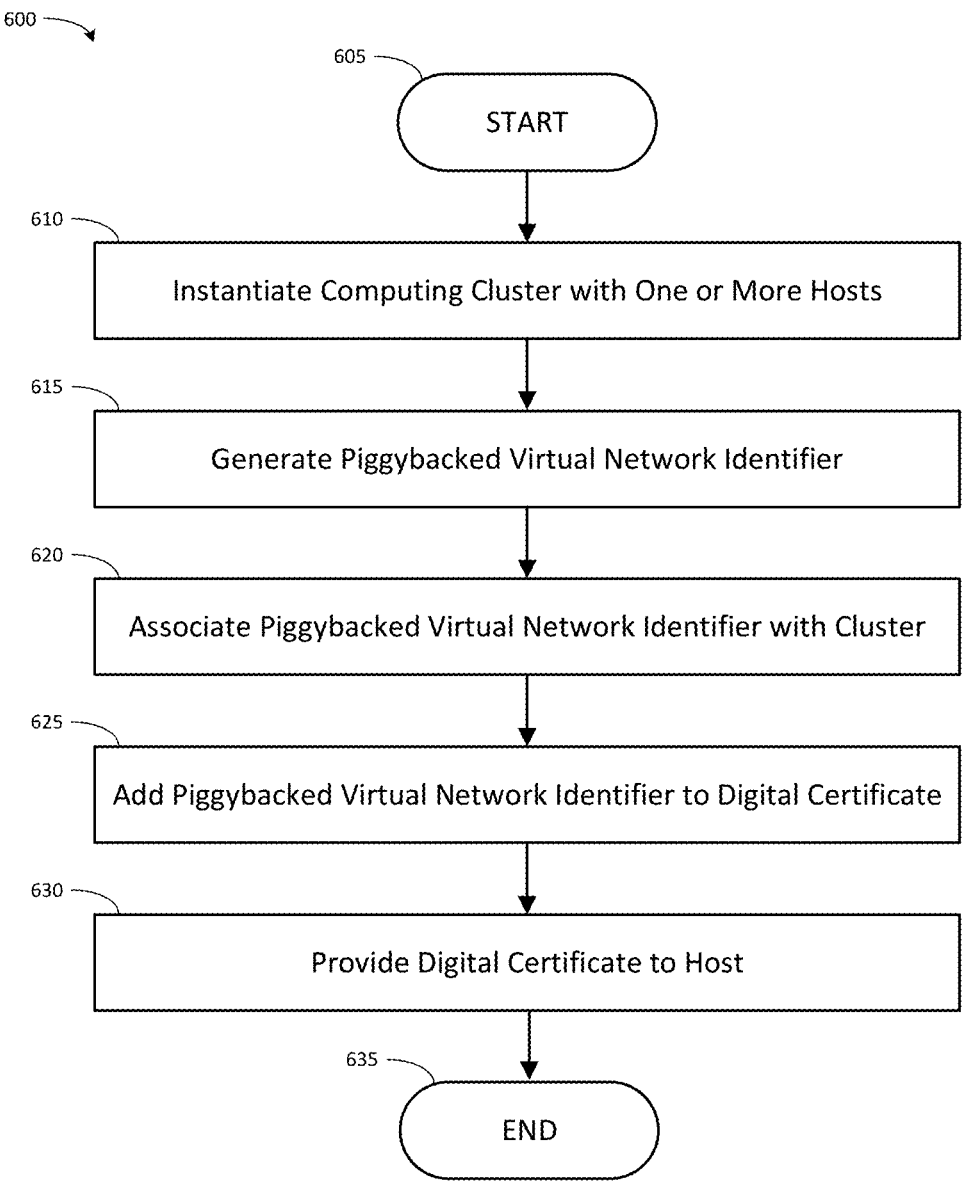
FIG. 6 illustrates a computer-implemented method associated with instantiating a computing cluster with hosts that may be authenticated, configured, and isolated in accordance with an embodiment of the method disclosed.

Referring now to FIG. 6, one embodiment of a computer-implemented method 600 associated with initialization of a cluster instantiation method in accordance with one embodiment is shown. This method 600 may initiate following various triggers, such as (i) a request from a user of the system for access to cloud computing resources, (ii) a request for a new computing cluster, (iii) receiving a signal indicating that a user has initiated method 600, or (iv) launching method 600 based on a scheduled time(s) or time interval(s).

The method 600 initiates at start block 605 and processing continues to process block 610. At process block 610, processor 810 instantiates a computing cluster in a cloud computing environment. In this instantiation, at least one host in the computing cluster is connected to the at least one physical port. In one embodiment, this instantiating includes one or more of the following steps.

One or more hardware computers operates compute control plane service(s). In response to determining that a customer has requested a new computing cluster, the compute control plane service creates an instance pool for the new cluster. The instance pool is made up of the set of hosts assigned to the cluster and configured to operate in the cluster. The hosts of the instance pool are each of the same configuration, and may be within the same region and may be managed as a group. The compute control plane service chooses a location for the new computing cluster on one or more hardware hosts interconnected by a switch based on the availability of computing resources sufficient to support the new computing cluster. Each of the hardware hosts is connected to a physical port of a network device in order to effect the interconnection.

The compute control plane service places the new computing cluster in the chosen set of one or more hardware hosts. Then, the compute control plane service assigns a host group identifier associated with the instance pool to be a cluster identifier for purposes of hardware network management. The compute control plane service records the host group identifier and a network device identifier associated with the network device (for example, the switch ID), for example, in memory 815, storage 835, or data 840. Processing at process block 610 completes, and processing continues to process block 615.

At process block 615, processor 810 generates the piggybacked virtual network identifier. In one embodiment, this generating includes one or more of the following steps.

The compute control plane service creates a layer 2 virtual network identifier selected for the cluster (such as a VLAN ID, or a switch ID/VLAN ID tuple per switch, if the cluster hosts are connected across multiple switches). The compute control plane service may also create a layer 3 virtual network identifier (such as a VXLAN VNI) for the cluster. The compute control plane service stores the layer 2 and layer 3 virtual network identifiers for example, in memory 815, storage 835, or data 840. In one embodiment, these virtual network identifiers are used as the piggybacked virtual network identifier. Processing at process block 615 completes, and processing continues to process block 620.

At process block 620, processor 810 associates the piggybacked virtual network identifier with the computing cluster. In one embodiment, this associating includes one or more of the following steps.

The compute control plane service retrieves the host group identifier, the network device identifier, and the virtual network identifiers from memory 815, storage 835, or data 840. The compute control plane service forms one or more mappings between the host group identifier (ClusterID), the network device identifier (SwitchID) and the layer 2 virtual network identifier (VLAN ID). Compute control plane service also forms a mapping between the host group identifier (ClusterID) and the layer 3 virtual network identifier (VXLAN VNI). Compute control plane service stores these mappings, for example, in memory 815, storage 835, or data 840. In one embodiment, these mappings serve to associate the piggybacked virtual network identifier with the computing cluster.

Additionally, in one embodiment, a front-end virtual network interface card (VNIC) is associated with the computing cluster to enable the customer to access the computing cluster through the VNIC. Or, in one embodiment a front-end VNIC is associated with each node in the computing cluster, and the customer is able to access the computing cluster through each of the front-end VNICs.

Processing at process block 620 completes, and processing continues to process block 625.

At process block 625, processor 810 adds the piggybacked virtual network identifier to the digital certificate. In one embodiment, this adding includes one or more of the following steps.

Processor 810 activates a public key infrastructure (PKI) certificate agent. The PKI certificate agent generates a private key and request a digital certificate from a PKI service. The PKI service is custom-configured to retrieve the piggybacked virtual network identifier from memory 815, storage 835, or data 840, and include it in the requested certificate. Accordingly, this PKI service may be private, and inaccessible outside of embodiments of the disclosed system. In some embodiments, the PKI service retrieves the piggybacked virtual network identifier, includes it in the digital certificate, and signs it. In some embodiments, the PKI service retrieves the piggybacked virtual network identifier, includes it as an encrypted (customer-opaque) blob within an X.509 attribute of the digital certificate, and signs it.

For example, the PKI service embeds the ClusterID: VXLAN VNI and Switch ID: VLAN mappings (the piggybacked virtual network identifier) in the digital certificate as a subject alternative name (SAN). In one embodiment, the PKI service embeds the piggybacked virtual network identifier as a msUPN X.509 attribute. A UPN type attribute was selected because it is included in the X.509 attributes and extensions that the open-source FreeRADIUS server makes available for processing. msUPN was specifically selected because it is a proprietary extension that is unlikely to be otherwise used in the environment of this embodiment, making it available for this use. In environments that make other use of the msUPN proprietary extension, an alternative attribute may be selected.

In one embodiment, the PKI service operates a private certificate authority to authenticate the digital certificates that it issues. The certificate authority should not be accessible outside of embodiments of the disclosed system, because certificate signed by the certificate authority would be considered valid for purposes of 802.1X authentication outside of the disclosed system, as well as inside it.

The PKI service returns the signed digital certificate to the PKI agent, which stores the digital certificate, for example, in memory 815, storage 835, or data 840. Processing at process block 625 completes, and processing continues to process block 630.

At process block 630, processor 810 provides the digital certificate to at least one host. This is done to enable the at least one host to instruct the network device to create an isolated connection from the port to the virtual network associated with the computing cluster before the controlled port is opened. In one embodiment, the PKI agent transfers a copy of the digital certificate to each of the one or more hosts of the computing cluster, for example through a metadata distribution service used to configure/provision the one or more hosts. Using the digital certificate, the at least one host may instruct the network device to create an isolated connection as discussed above. Processing at process block 630 completes and processing continues to end block 635, where the process 600 completes.

Periodic Re-Authentication

In one embodiment, currency of authentication is maintained through the use of short-lived digital certificates, and no certificate revocation mechanism is employed. Certificates will be re-generated periodically while the cluster is in operation. The updated digital certificates may be made available by the metadata distribution service. Thus, switch 105 may require periodic reauthentication of the supplicant host. The controlled port will be placed into the unauthorized state and traffic to and from that port (apart from authentication packets) will be dropped if (i) the port operational status changes (for example the connection between the supplicant host and the port is terminated, or (ii) a reauthentication attempt fails. In order to successfully re-authenticate, the host 140 should be configured to periodically fetch updated credentials (such as a current digital certificate) and restart the supplicant authentication process. This fetch of updated credentials may be affirmatively made rather than passively received, as the supplicant may not automatically retrieve credentials in response to an update.

Non-Transitory Computer-Readable Medium Embodiments

Figure 7:
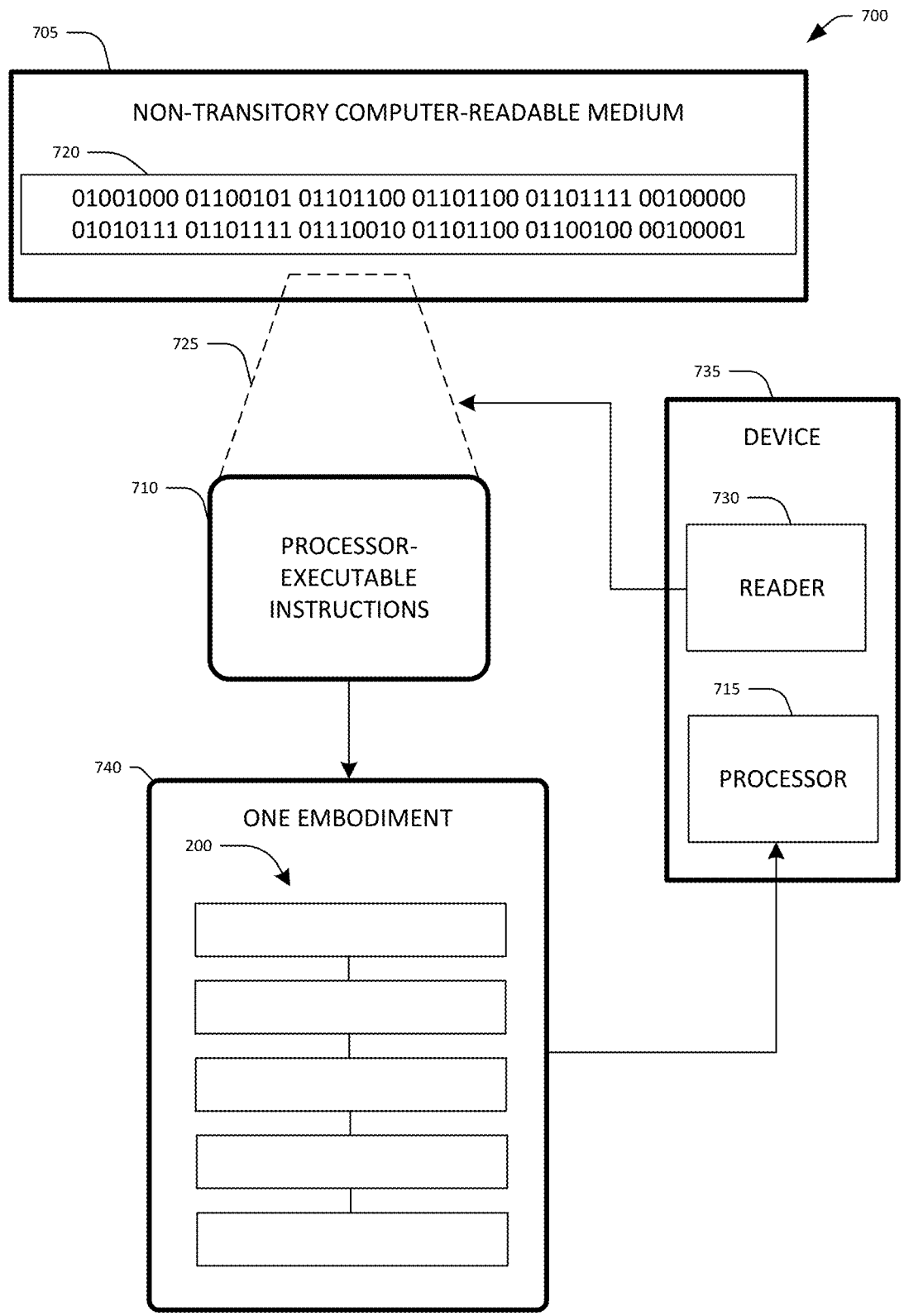
FIG. 7 illustrates an embodiment of a non-transitory computer-readable medium configured with instructions for performing one embodiment of the method disclosed.

FIG. 7 shows a scenario 700 wherein the described methods and/or their equivalents may be implemented using computer-executable instructions stored on an example non-transitory computer-readable medium 705. In one embodiment, one or more of the components described herein are configured as program modules, such as those of system 100 associated with cloud computing cluster isolation with strong authentication and automatic configuration deployment, stored in the non-transitory computer-readable medium 705. The program modules are configured with stored instructions, such as processor-executable instructions 710, that when executed by at least a processor, such as processor 715, (and potentially using other associated components) cause the computing device to perform the corresponding function(s) as described herein. For example, functionality of the system 100 associated with cloud computing cluster isolation with strong authentication and automatic configuration deployment, stored in the non-transitory computer-readable medium 705, may be executed by the processor 715 as the processor-executable instructions 710 to perform an embodiment 740 of the method 200 of FIG. 2 or other methods described herein. In one embodiment, a network switch is implemented with one or more executable algorithms that are configured to perform one or more of the disclosed methods.

The non-transitory computer-readable medium 705 includes the processor-executable instructions 710 and/or data that when executed by a processor 715 cause performance of at least some of the provisions herein. Data may function as processor-executable instructions 710 in some embodiments. The non-transitory machine readable medium 705 includes a memory semiconductor (such as, for example, a semiconductor utilizing static random-access memory (SRAM), dynamic random-access memory (DRAM), and/or synchronous dynamic random-access memory (SDRAM) technologies), a platter of a hard disk drive, a flash memory device, or a magnetic disk, magnetic tape, or other magnetic media, or optical disc (such as a compact disk (CD), a digital versatile disk (DVD)), an application specific integrated circuit (ASIC), a programmable logic device, a read only memory (ROM), a memory chip or card, a memory stick, solid state storage device (SSD), flash drive, or other media from which a computing device can retrieve information. Non-transitory computer-readable media described herein are limited to statutory subject matter under 35 U.S.C § 101. The example non-transitory machine readable medium 705 stores computer-readable data 720 that, when subjected to reading 725 by a reader 730 of a device 735 (e.g., a read head of a hard disk drive, or a read operation invoked on a solid-state storage device), express the processor-executable instructions 710. In some embodiments, the processor-executable instructions 710, when executed cause performance of operations, such as at least some of the method 200 of FIG. 2, for example. In some embodiments, the processor-executable instructions 710 are configured to cause implementation of a system, such as at least some of the system 100 of FIG. 1, for example.

Computing Device Embodiment

FIG. 8 illustrates an example computing device 800 that is specially configured and/or programmed with one or more of the example systems and methods described herein, and/or equivalents. The example computing device may be a computer 805 that includes a hardware processor 810, a memory 815, and input/output ports 820 operably connected by a bus 825. In one example, the computer 805 includes DVMH (dedicated virtual machine host) bare-metal cluster logic 830 configured to facilitate dedicated network authentication and allocation for dedicated virtual machine host clusters, similar to logic, systems, and methods shown in and described with reference to FIGS. 1 through 18. DVMH bare-metal cluster logic 830 includes cluster isolation logic 831 configured to facilitate cloud computing cluster isolation that has strong authentication and automatic configuration deployment. For example, cluster isolation logic 831 is configured to facilitate performance of operations, such as at least some of the methods 200 and 1800 of FIGS. 2 and 18, respectively or to cause implementation of a system, such as at least some of the systems 100, 1000, and 1105 of FIGS. 1, 10, and 11 respectively, or other methods or systems described herein with reference to FIGS. 1 through 18. DVMH bare-metal cluster logic 830 also includes DVMH cluster node logic 832 configured to facilitate launch of DVMH cluster nodes with hypervisor services extended to interact with cluster isolation logic 831, for example as shown and described herein with reference to FIGS. 10 through 14, 17A through 18 or other systems or methods described herein. DVMH bare-metal cluster logic 830 also includes VF allocation logic 833 configured to facilitate extension of a virtual machine dataplane to pass an SR-IOV function to each guest virtual machine on a host, for example as shown and described herein with reference to FIGS. 10 through 11, 15 through 16, and 18 or other systems or methods described herein. In different examples, the logic 830 may be implemented in hardware, a non-transitory computer-readable medium 705 with stored instructions, firmware, and/or combinations thereof. While the logic 830 is illustrated as a hardware component attached to the bus 825, it is to be appreciated that in other embodiments, the logic 830 could be implemented in the processor 810, stored in memory 815, or stored in disk 835. Further, logic 830 or various component portions of the logic may be implemented on one or more computers 805.

In one embodiment, logic 830 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to implement cloud computing cluster isolation with strong authentication and automatic configuration deployment. The means may also be implemented as stored computer executable instructions that are presented to computer 805 as data 840 that are temporarily stored in memory 815 and then executed by processor 810.

Logic 830 may also provide means (e.g., hardware, non-transitory computer-readable medium that stores executable instructions, firmware) for performing cloud computing cluster isolation with strong authentication and automatic configuration deployment.

Generally describing an example configuration of the computer 805, the processor 825 may be a variety of various hardware processors including dual microprocessor and other multi-processor architectures. A memory 815 may include volatile memory and/or non-volatile memory. Non-volatile memory may include, for example, ROM, PROM, EPROM, EEPROM and so on. Volatile memory may include, for example, RAM, SRAM, DRAM, and so on.

Storage 835 may be operably connected to the computer 805 via, for example, an input/output (I/O) interface (e.g., card, device) 845 and an input/output port 820 that are controlled by at least an input/output controller 870. The storage 835 may be, for example, one or more of a magnetic disk drive, a solid state disk drive, a floppy disk drive, a tape drive, a Zip drive, a flash memory card, a memory stick, or other non-transitory computer-readable media. Furthermore, the storage 835 may be a CD-ROM drive, a CD-R drive, a CD-RW drive, a DVD ROM, and so on. The memory 815 can store a process 850 and/or a data 840, for example. The disk storage 835 and/or the memory 815 can store an operating system that controls and allocates resources of the computer 805.

The computer 805 may interact with input/output (I/O) devices using input/output controller 870, the input/output interfaces 845 and the input/output ports 820. Input/output devices may be, for example, a keyboard, a microphone, a pointing and selection device, cameras, video cards, displays, the storage 835, the network devices 855, and so on. The input/output ports 820 may include, for example, serial ports, parallel ports, and USB ports.

The computer 805 can operate in a network environment and thus may be connected to the network devices 855 via the I/O interfaces 845, and/or the I/O ports 820. Through the network devices 855, the computer 805 may interact with a network 860. Through the network 860, the computer 805 may be logically connected to remote computers 865. Networks with which the computer 805 may interact include, but are not limited to, a LAN, a WAN, and other wired and/or wireless networks. The computer 805 may manage data communications to and from the I/O interfaces with I/O controllers 870.

The computer 805 may exchange electronic messages with the remote computers over the network. Such electronic messages may be provided as emails, short message service (SMS) messages or other types of message using Transmission Control Protocol (TCP)/Internet Protocol (IP) or other communication protocols.

Network Device Embodiment

FIG. 9 illustrates an example network device 900 that is specially configured and/or programmed with one or more of the example systems and methods described herein, and/or equivalents. The example network device 900 may be a network switch 905. Network switch 905 may include a hardware processor 910, a memory 915, and input/output ports 920 operably connected by a bus 925, as well as cluster isolation logic 930, storage 935, data 940, input/output (I/O) interface (e.g., card, device) 945, input/output controllers 970. Memory 915 may store, for example, a process 950 or data 940. Each of the foregoing components of the switch has similar functions as the components of the same name described above with reference to FIG. 8.

Network switch 905 additionally includes a switch fabric 975 operably connected by bus 925 to hardware processor 910, memory 915, and input/output ports 920. Switch fabric 975 is further operably connected to network ports 980. Through the network devices 855, the network switch 905 may interact with a network 960. Through the switch fabric 975, the network switch 905 may be logically connected to remote computers 965, and may further control the network 960 or connections between remote computers 965 in the network 960. Networks that the network switch 905 may control or otherwise interact with include, but are not limited to, a LAN, a WAN, and other wired and/or wireless networks.

The network switch 905 may exchange electronic messages with the remote computers over the network. Such electronic messages may be provided as EAP frames compatible with one or more EAP methods, such as EAP-TLS, emails, short message service (SMS) messages or other types of message using Transmission Control Protocol (TCP)/Internet Protocol (IP) or other communication protocols.

Dedicated Virtual Machine Hosting on Bare Metal Cluster Nodes

Systems and methods are described herein that provide dedicated network authentication and allocation for dedicated virtual machine host clusters. In one embodiment, the systems and methods described herein may provide transparent pre-authentication and dynamic allocation of dedicated network for cloud-based virtual machines with ensured traffic isolation between customers. In one embodiment, the systems and methods described herein provide a form of private network access control for dedicated virtual machine hosts. In one embodiment, cloud infrastructure may be implemented in accordance with the systems and methods described herein. For example, cloud infrastructure systems such as Oracle® Cloud Infrastructure may be configured to include the following three features:

(1) High performance computing (HPC) bare metal (BM) compute hardware including, in addition to the network interface card (NIC) used for general cloud networking traffic, a further high-speed NIC connected to switches providing dedicated private network capacity.

(2) Dedicated virtual machine hosting/hosts (DVMH) allocating BM machines to allow user allocation of virtual machines using the existing cloud infrastructure while ensuring that all virtual machines are hosted on compute hardware dedicated to that user.

(3) Cluster networking (CN) allowing a user to create a pool of bare metal machines (individual machines may also be referred to as nodes or hosts) that have been configured and launched identically. For the pool, a unique, dedicated virtual LAN (VLAN) with a unique identification number is allocated for a private back-end network used to segregate the cluster networking traffic of the pool. For example, each node in the cluster network is given a public key infrastructure digital certificate by the cloud infrastructure's identity service. The node uses the digital certificate to authenticate itself to the switch maintaining the list of nodes that are admitted to the dedicated VLAN.

In one embodiment, these features may be combined in a way that (1) extends the cluster networking capability to launch its hosts as dedicated virtual machine hosts instead of bare metal hosts; (2) extends the hypervisor running on the DVMH to present the certificate to the switch to gain admittance to the VLAN; and (3) extends the VM data plane to pass a Single Root Input/Output Virtualization (SR-IOV) Virtual Function (VF) to each guest that is created. In such a system, each guest (virtual machine running on a host) has access to a secure, dedicated, and high-performance private network. The access of a guest to the private network is pre-authenticated invisibly (or transparently) to the guest by the host, and the guest need not take part in network access operations for the private network. These and other features are enabled by the systems and methods described herein, and were not previously possible for the cloud infrastructure.

Combining dedicated virtual machine hosting, SR-IOV-enabled network hardware, and bare-metal cluster networking capability as described herein enables a method for a hypervisor to allocate a pre-authenticated access to a dedicated high-speed network to guest virtual machines running on the dedicated virtual machine hosts. The allocation of access is performed transparently to the guest virtual machines, freeing the guest virtual machines (and the customer) from having to manage authentication or access to the high-speed network.

In one embodiment, cloud infrastructure systems with bare metal cluster networking capabilities enable cloud infrastructure users (or customers) to set up and use a cluster of multiple bare metal hosts across one or more racks in the cloud infrastructure provider's data center. Each of the hosts has access to a high-speed, high-throughput, low-latency (for example, 100 Gigabit or higher) network dedicated to traffic between these bare metal hosts, as well as a general cloud network that is used for administrative traffic of the cloud infrastructure. Thus, the bare metal hosts of the cluster can communicate with each other over the high-speed network, enabling high-performance computing, and the cluster can communicate with cloud services offered by the cloud infrastructure through the general cloud network. In one embodiment, the administrative traffic for the cluster in the general cloud network is contained within a virtual network for the user or customer. In one embodiment, the number of bare metal hosts in a cluster is relatively few machines, for example, 16 or fewer machines, such as 4, 6, 8, or 10 machines, although 16 is not an upper limit on the number of bare metal hosts that can be formed into a cluster.

Such cluster computing systems can be extended beyond high-performance computing applications to dedicated virtual machine hosting. In one embodiment, cloud computing systems implemented on cloud infrastructure include a control plane that manages the high-speed network, allocates virtual networks (such as a VLAN or VXLAN) within the high-speed network to particular clusters, and sets up the virtual network. At the bare metal machine level, an authentication mechanism for the bare metal machine sends its certificate to the switch using EAPOL protocols. Then the switch uses RADIUS to authenticate the certificate and on successful authentication, the switch allows the bare metal machine to be a member of both the high-speed network and a specific virtual network allocated by the control plane. Different bare metal machines may be allocated to different virtual networks by the control plane, for example with one subset of bare metal machines allocated to a first virtual network within the high-speed network and another subset of bare metal machines allocated to a second virtual network within the high-speed network. When the bare metal machines are further configured as dedicated virtual machine hosts, the guest virtual machines spawned on these hosts can each communicate with each other ("east-west" network traffic) through the dedicated high-speed back-end network and avoid using the shared front-end virtual cloud network.

Advantageously, the authentication and access mechanisms for the high-speed network are handled by the host machines in a manner invisible to the guest virtual machines. The host machine authenticates itself to the switch of the high-speed network to gain and maintain access to the high-speed network and virtual network associated with the cluster, and assigns a SR-IOV virtual function simulating the NIC of the host to each guest virtual machine. Thus, each guest virtual machine is given uniquely-addressed access to the host's high-speed NIC (the virtual function), while the high-speed NIC's access to the high-speed switch controlling the high-speed network is maintained by the host using the piggybacked authentication described herein. Each guest virtual machine is therefore provided with apparent direct access to a dedicated high-speed network the high-speed network access with the implementation of that network access remaining completely transparent from the point of view of the guest virtual machines. The guest virtual machines need not "know" that (i) their assigned NIC is a virtual function, and (ii) their network access is authenticated and maintained within a virtual network, nor do the guest virtual machines need to take part in the process of assigning the virtual functions or maintaining access to the network. In effect, the guest virtual machines get their own private network, unshared with other DVMH clusters, and carrying only traffic from their own cluster.

Example Dedicated Virtual Machine Hosting Bare Metal Cluster System

Figure 10:
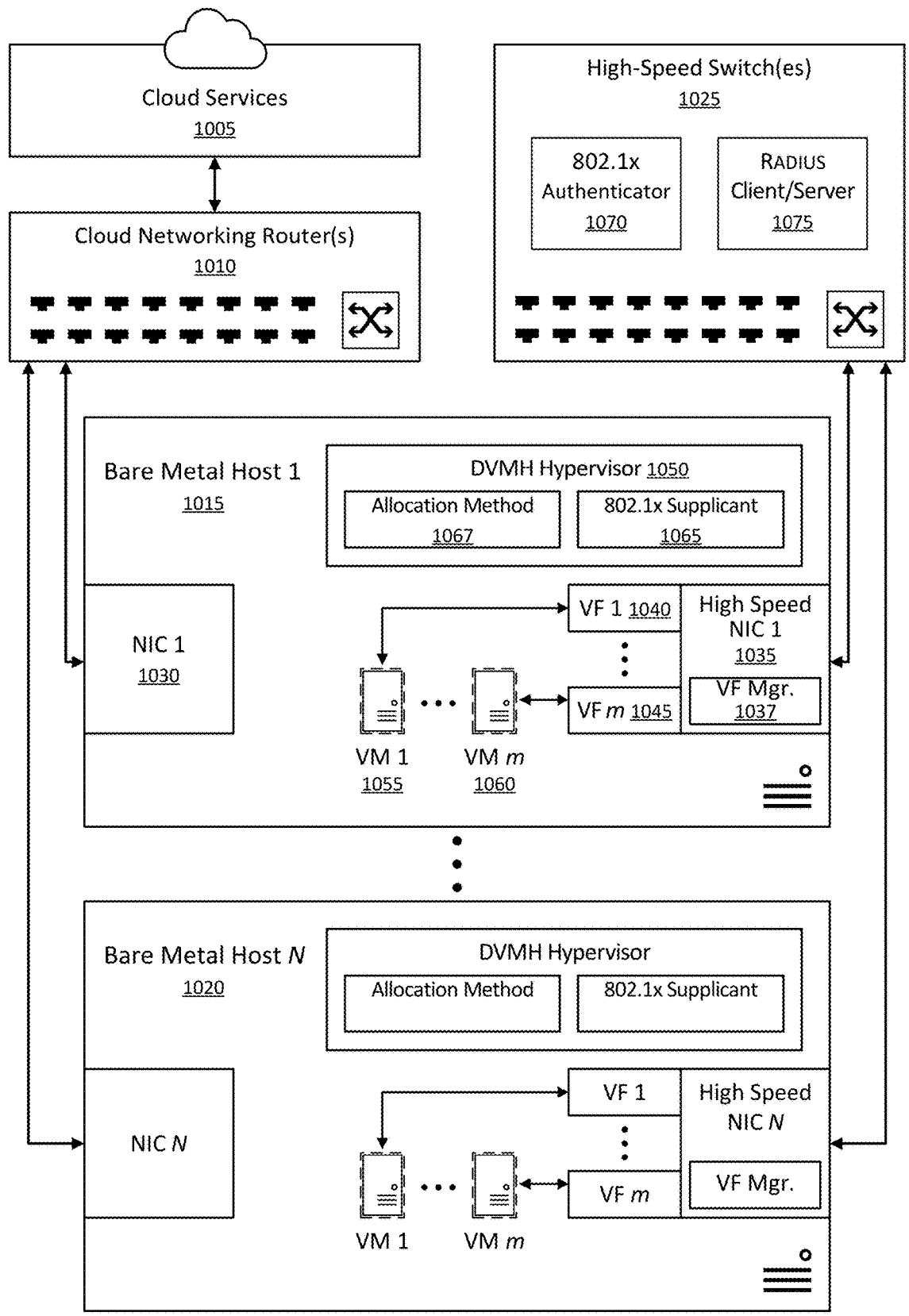
FIG. 10 illustrates one embodiment of an example computing system associated with dedicated network authentication and allocation for dedicated virtual machine host clusters.

FIG. 10 illustrates one embodiment of an example computing system 1000 associated with dedicated network authentication and allocation for dedicated virtual machine host clusters. Computing system 1000 supports dedicated virtual machine hosting by bare metal cluster nodes. In one embodiment, example computing system 1000 is a cloud infrastructure system including cloud services 1005, cloud networking router(s) 1010, one or more bare metal hosts such as bare metal host 1 1015 through bare metal host N 1020, and high-speed router(s) 1025.

Bare metal hosts 1015-1020 are computing hardware shapes including both a general network interface card 1030 and a high-speed network interface card 1035. In one embodiment, the bare metal hosts 1015-1020 are BM.HPC2.36 shapes (bare metal HPC 2.36 shapes). In one embodiment, a BM.HPC2.36 shape is a dual 18-core processor (36 physical cores in total) computing system with 384 gigabytes of RAM, a 6.7 terabyte local solid state drive, a 25 gigabit-per-second (Gbps) NIC for standard network traffic, and a 100 Gbps Remote Direct Memory Access (RDMA) NIC for high-throughput, low-latency network traffic. In one embodiment, the 25 Gbps NIC used as the general network interface card 1030 and the 100 Gbps NIC is used as the high-speed network interface card 1035. In one embodiment, the 100 Gbps NIC is available from Mellanox. In one embodiment, the processors are 18-core Intel Xeon Gold 6154 processors. In one embodiment, the bare metal hosts 1015-1020 are other hardware shapes including two physical network interface cards, such as BM.Standard2.52, BM.Standard.E2.64, and BM.Standard.E3.128 shapes.

General network interface card 1030 is connected to a virtual cloud network through cloud networking routers 1010. In one embodiment, the virtual cloud network is associated with a single customer of the cloud computing system 1000. General network interface card 1030 is configured to handle general virtual cloud network traffic, including interactions with cloud services 1005

The high-speed network interface card 1035 is configured using single root I/O virtualization (SR-IOV) to logically partition the high-speed network interface card 135 into multiple virtual functions VF 1 1040 through VF m 1045. The virtual functions 1040-1045 simulate direct access to the high-speed network interface card 1035, enabling the high-speed network interface card 1035 to appear to the host to be multiple separate physical high-speed network interface cards. These multiple virtual instances of the high-speed network interface card—the virtual functions 1040 through 1045—each operate as a discrete NIC. The virtual functions may be thought of as logical queues (rather than physical queues) for network traffic on a NIC that provide the equivalent of direct hardware access with similar performance. In addition to providing communication to and from other NICs, virtual functions within the same NIC behave as if they are discrete network cards, allowing network traffic to be directed from the outgoing queue of one virtual function to the incoming queue of another virtual function, as if the virtual functions were separate NICs.

The bare metal hosts 1015-1020 may be configured with a DVMH hypervisor 1050 (also known as a virtual machine monitor or virtualizer) configured to create (or spawn) and run virtual machines on a bare metal host. The hypervisor 1050 is configured to launch and operate one or more virtual machines, such as VM 1 1055 through VM m 1060. Hypervisor 1050 is configured to assign a virtual function to handle network traffic of each virtual machine. In one embodiment, each virtual machine is uniquely assigned a virtual function in a one-to-one relationship. In one embodiment, hypervisor 1050 is executed by an operating system installed on the bare metal host, such as Oracle Linux, configured to operate the bare metal host as a DVMH. In one embodiment, where the bare metal host is a BM.HPC2.36 hardware shape, hypervisor 1050 can concurrently operate up to 32 guest virtual machines (m<=32). For example, if there are 10 bare metal hosts of this BM.HPC2.36 hardware shape, there could be up to 320 guest virtual machines operating on the high-speed network. In one embodiment, where the bare metal host is a BM.Standard2.52 hardware shape, hypervisor 1050 can concurrently operate up to 48 guest virtual machines (m<=48). In one embodiment, when the bare metal host is configured to operates as a DVMH, the guest virtual machines can be concentrated in dedicated hosts, rather than spread across multiple non-dedicated hosts.

The hypervisor 1050 is also configured with an 802.1x supplicant 1065. 802.1x supplicant 1065 may be configured as a supplicant module such as supplicant module 160 as described elsewhere herein. High-speed router 1020 is configured with an 802.1x authenticator 1070 and a RADIUS client/server 1075. 802.1x supplicant 1065 is configured to negotiate authentication and opening of controlled ports of high-speed router 1020 with 802.1x authenticator 1070 and RADIUS client/server 1075. 802.1x authenticator 1070 may be configured as an authenticator module such as authenticator module 120 as described elsewhere herein. RADIUS client/server 1075 may be configured as a combined authentication client and authentication service module, such as a combination of authentication client module 125 and authentication service module 130 as described elsewhere herein, combined to execute the functions of both authentication client module 125 and authentication service module 130 module within a single device such as high-speed router 1020.

Example Environment

Figure 11:
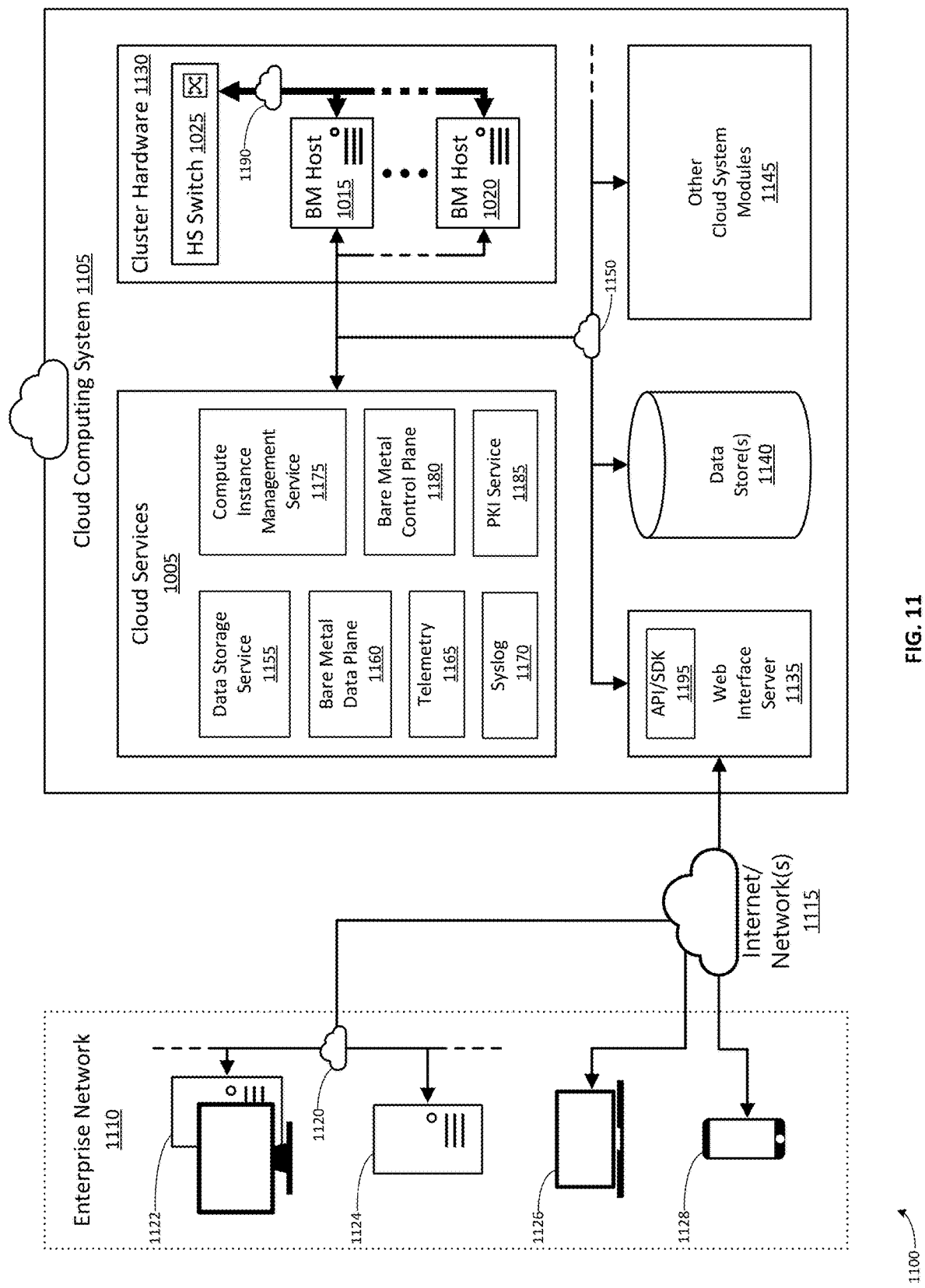
FIG. 11 illustrates one embodiment of an example computing environment associated with dedicated network authentication and allocation for dedicated virtual machine host clusters.

FIG. 11 illustrates one embodiment of an example computing environment 1100 associated with dedicated network authentication and allocation for dedicated virtual machine host clusters. In one embodiment, computing environment 1100 includes cloud computing system 1105 and enterprise network 1110. In one embodiment, cloud computing system 1105 is connected to enterprise network 1110 by one or more networks 1115 such as the Internet.

In one embodiment, cloud computing system 1105 is configured to offer on-demand computing resources, such as access to servers of the cloud computing system 1105 to authorized clients in enterprise network 1110. Generally, a server is a physical computer dedicated to providing data storage and an execution environment for one or more software applications or services intended to process and respond to (or 'serve') requests received from other computers that are in data communication with the server, for instance through a network such as network 1115. The server, and the services it provides, may be referred to as the "host" and the remote computers, and the software applications running on the remote computers, being served may be referred to as "clients." In one embodiment, enterprise network 1110 may be associated with a business entity that is a customer of the computing resources of cloud computing system 1110. In one embodiment, the hosts of cloud computing system 1105 are configured to execute software in response to requests received from clients in enterprise network 1110. In one embodiment, the hosts of cloud computing system 1105 are configured to support requests from clients in multiple enterprise networks 1110, each of which enterprise networks 1110 is associated with a distinct business enterprise.

In one embodiment, network(s) 1115 may include electronic communication networks utilizing wired and/or wireless communication technologies and networks operating in accordance with any suitable networking and/or communication protocol (e.g., the Internet).

In one embodiment, enterprise network 1110 may include various client devices configured to execute client applications that interact with cloud computing system 1105. For example, enterprise network 1110 may include an on-site, wired or wireless local area network (LAN) 1120 to which client devices such as one or more computers 1122 (such as a personal, workstation, notebook, laptop, or tablet computer; personal digital assistant (PDA); or smart phone) and/or server computers 1124 are operably connected. Also, enterprise network 1110 may include client devices such as one or more remote computers 1126 (such as a personal, workstation, notebook, laptop, or tablet computer; server computer; PDA; or smart phone) operably connected to enterprise network 1110 through network(s) 1115. Also, enterprise network 1110 may include client devices such as one or more cellular/mobile devices 1128 (such as a smart phone, tablet computer, or notebook/laptop computer including cellular/mobile data connection hardware) that are connected to the enterprise network 1110 through network 1115 and cellular/mobile communications networks. Cellular/mobile devices 1128 may be configured with a mobile applications that interact with cloud computing system 1105 that are specifically adapted to the hardware and/or software features of cellular/mobile devices 1128, as compared with computers 1122, 1124, 1126.

In one embodiment, cloud computing system includes cloud services 1005, cluster hardware 1130, web interface server 1135, data stores 1140, and other cloud system modules 1145 each interconnected by virtual cloud network 1150 over network infrastructure of the cloud computing system. In one embodiment, cloud services 1005 include a data storage service module 1155, a bare metal data plane module 1160, a telemetry module 1165, a syslog (or system log) module 1170, a compute instance management service module 1175, a bare metal control plane module 1180, and a public key infrastructure (PKI) service module 1185. Each of these services are accessible to the bare metal hosts of the cluster hardware 1130 through virtual cloud network 1150. In one embodiment, cluster hardware 1130 includes bare metal host 1 1015 through bare metal host N 1020, each connected to virtual cloud network 1150. Cluster hardware 1130 also includes high-speed router 1025. Each bare metal host 1015 through 1020 is connected to high-speed router 1025 through high-speed dedicated network 1190. In one embodiment, high-speed dedicated network is a private, back-end network accessible to the bare metal host only through a secondary NIC such as high speed NIC 1 1035.

In one embodiment, client computing systems (such as those of enterprise network 1110) may access information or applications provided by cloud computing system 1105 through web interface server 1135. For example, the client computing systems may initiate, accept, or provide inputs to, perform portions of, or receive results from operation of the systems and methods described herein. In one example, web interface server 1135 includes a web server. A web server may be a combination of hardware and the software that delivers content, commonly by hosting a website, to client web browsers that access the web server via the Internet. In one embodiment, the remote computing system may send requests to and receive responses from web interface server 1135. In one example, access to the information or applications may be effected through use of a web browser configured to access cloud computing system 1105 executing on a client computing system. In one example, access to the information or applications may be effected through use of dedicated client software configured to access the cloud computing system 1105 executing on a client computing system. In one example, communications between web interface server 1135 and the client devices of enterprise network 1110 may take the form of remote representational state transfer (REST) requests to and from application programming interface or software development kit (API/SDK) 1195 using JavaScript object notation (JSON) as the data interchange format. In one embodiment, API/SDK 1195 is a standardized, formalized interface to control planes and other software modules used to operate the system.

In one embodiment, data stores 1140 are configured to provide a repository for persistently storing and managing collections of data generated, accessed, and/or used by cloud computing system 1105. In one embodiment, data stores 1140 are operated by a database server, data storage server, or file server. In one embodiment, data stores 1140 may be implemented using a network-attached storage (NAS) device or other dedicated server device. Data stores may be implemented with any suitable data storage technology, including structured query language (SQL)-based relational database management systems (RDBMS). In one embodiment, the data stores 1140 may include a discrete, dedicated data store for operation of cluster hardware 1130, the cloud services 1005, the other cloud system modules 1145, and the web interface server 1135, as well as a discrete, dedicated data store for administration of the cloud system 1105.

General Workflow

In one embodiment, the system executes operations (i) to create an instance configuration describing a cluster node, (ii) to create DVMHs using the instance configuration, and (iii) to create an instance pool of the number of hosts in the cluster. These may be executed in response to API/SDK calls.

Figure 12:
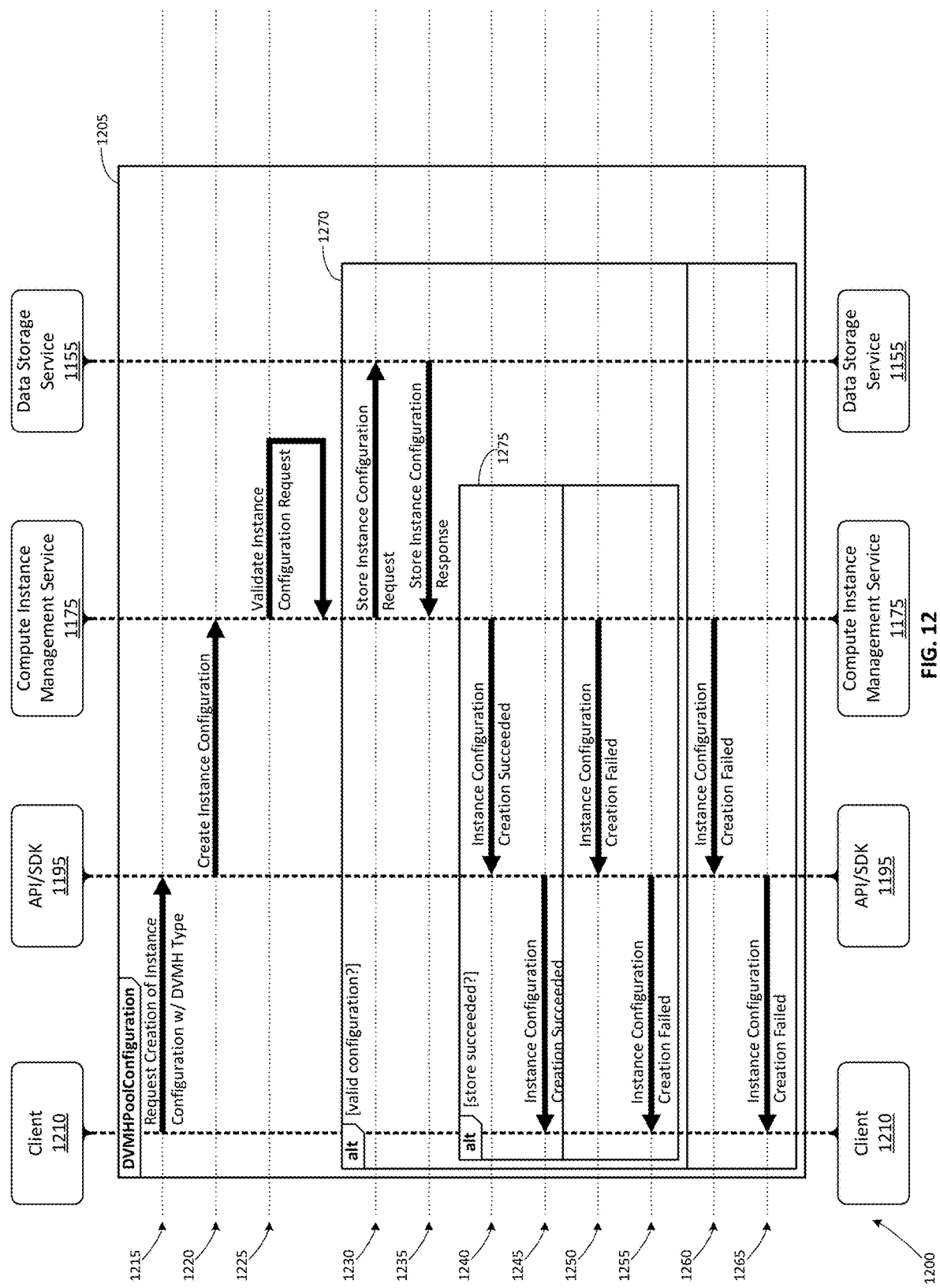
FIG. 12 illustrates a sequence diagram showing one embodiment of a compute cluster configuration process associated with dedicated network authentication and allocation for dedicated virtual machine host clusters.

FIG. 12 illustrates a sequence diagram 1200 showing one embodiment of a compute cluster configuration process 1205 (DVMHPoolConfiguration) associated with dedicated network authentication and allocation for dedicated virtual machine host clusters. The sequence diagram 1200 shows interactions between a client 1210 device (such as one of client devices 1122-1128 in enterprise network 1110), API/SDK 1195, compute instance management service 1175, and data storage service 1155. The order of interactions between client 1210, API/SDK 1195, compute instance management service 1175, and data storage service 1155 is indicated by references 1215-1265. In one embodiment, interactions between client 1210 and API/SDK 1195 are sent over network 1115 and through web interface server 1135. In one embodiment, interactions between API/SDK 1195 and compute instance management service 1175 are sent over virtual cloud network 1150. Although shown grouped together in cloud services 1005, in one embodiment, interactions between compute instance management service 1175 and data storage service 1155 (and other cloud services 1005 modules) are also sent over virtual cloud network 1150. In one embodiment, each of API/SDK 1195, compute instance management service 1175, and data storage service 1155 (and other cloud services 1005) modules may be executing on a single computing device, and intercommunication between these modules occurs within the single computing device, rather than over virtual cloud network 1150.

At reference 1215, client 1210 requests creation of an instance configuration with a dedicated virtual machine host type through API/SDK 1195. API/SDK 1195 exposes functions for managing cluster hardware, including a function to create an instance configuration. In one embodiment, client 1210 interacts with API/SDK 1195 by transmitting and receiving messages (such as REST requests) over network 1115 with to web interface server 1135. In one embodiment, client 1210 generates and transmits a request for creation of an instance configuration with DVMH-type to web interface server 1135. The request may be initiated automatically by client 1210 in response to a condition of software being executed by client 1210 or in response to an action by a user of client 1210. The request includes a call to the function to create an instance configuration with appropriate parameters. The parameters may include an indication that the instance configuration should be a dedicated virtual machine host and a number (or quantity) of such hosts requested. Web interface server 1135 parses the request and identifies the function call and parameters, and executes them using API/SDK 1195. For example, the request from client 1210 may indicate that client 1210 wants to set up a cluster of 8 DVMH machines.

At reference 1220, API/SDK 1195 instructs compute instance management service 1175 to create the requested instance configuration. In one embodiment, the instance configuration may be considered to be a template for how to start up the hosts of a cluster. For example, in an instance configuration for a DVMH, each host is started at approximately the same time, each host is started with the same image including the DVMH hypervisor 1050, and each host is informed that it is part of a cluster, prompting the DVMH hypervisor 1050 of the host to seek an instance principal certificate from PKI service 1185 and begin the authentication process to join the cluster network.

At reference 1225, compute instance management service 1175 validates the instance configuration request. In one embodiment, compute instance management service 1175 determines whether the requested instance configuration is possible for cloud computing system 1105, for example by determining whether there is a sufficient number of available hosts within cluster hardware 1130 sufficiently conveniently located within high-speed network 1190 to effectively form a cluster. For example, the requested quantity of hosts should be available in the same or network-adjacent racks in the same datacenter. If the requested instance configuration is possible for cloud computing system 1105, the validation at reference 1225 succeeds. If the requested instance configuration is not possible for cloud computing system 1105, the validation at reference 1225 fails.

In one embodiment, compute instance management service 1175 maintains a list of available and in-use hosts and their locations within cloud network topology as a data structure in data storage service 1155. In one embodiment, in response to the instance validation request, compute instance management service 1175 retrieves the list of available hosts from data storage service 1155, and compares the features of the available hosts to the requested DVMH instance configuration. If there are not sufficient hosts available, the request is invalid. Additionally, these available bare metal hosts may be required to each be attached to the same high-speed switch, or to high-speed switches that are interconnected with low communications latency, in order to ensure satisfactory cluster performance. Where such low-latency topology is required, if the available hosts are not interconnected in a topology of sufficiently low latency, the request is invalid. Where the DVMH cluster network creation request satisfies all conditions for validity, the request is valid. Where the DVMH cluster network creation request fails any condition for validity, the request is invalid.

The interactions described at references 1230-1255 are performed conditionally when the requested instance configuration is confirmed to be valid, while the interactions described at references 1260-1265 are performed conditionally when the requested instance configuration is not confirmed to be valid, or is confirmed to be invalid, as shown by alt enclosure 1270 (alt [valid configuration?]).

At reference 1230, the compute instance management service 1175 generates and sends a store instance configuration request message to the data storage service 1155 that instructs the data storage service 1155 to store the requested instance configuration. In one embodiment, compute instance management service 1175 selects available hosts satisfying the request criteria from the list of available hosts maintained in data storage service 1155. Data storage service 1155 stores the selected hosts as an instance configuration, for example as a data structure in data store 1140. Compute instance management service 1175 also updates the list of available and in-use hosts in data storage service 1155 to mark the hosts selected for the instance configuration to be in use. (This process is reversed when the instance configuration is released from use.) At reference 1235, data storage service 1155 generates and sends a store instance configuration response message to the compute instance management service 1175 indicating whether the requested instance configuration was successfully stored, or not. Where the requested instance configuration was successfully stored, the store instance configuration response message indicates the storage location where the configuration is stored, so that the instance configuration can be retrieved and used to implement a DVMH cluster.

The interactions described at references 1240-1245 are performed conditionally when the instance configuration request is successfully stored, while the interactions described at references 1250-1255 are performed conditionally when the instance configuration request is not successfully stored (storage failed), as shown by alt enclosure 1275 (alt [store succeeded?]).

Where the instance configuration request was successfully stored by data storage service 1155, at reference 1240, compute instance management service 1175 generates and sends a message to API/SDK 1195 indicating that the instance configuration creation has succeeded. At reference 1245, API/SDK 1195 sends a message indicating that the instance configuration creation has succeeded to client 1210. In one embodiment, API/SDK 1195 generates a new message in response to receiving the message received at reference 1240. In one embodiment, web interface server 1135 and API/SDK 1195 generate a request (such as a REST request) indicating the successful instance configuration creation, and sends it through network 1115 to client 1210.

Regardless of whether a failure to create an instance configuration is due to a validation failure at reference 1225 or a failure to store the configuration request at references 1230-1235, failure notification is returned to client 1210. Where the instance configuration request was not successfully stored by data storage service 1155, at reference 1150, compute instance management service 1175 generates and sends a message to API/SDK 1195 indicating that the instance configuration creation has failed. At reference 1255, API/SDK 1195 sends a message indicating that the instance configuration creation has failed to client 1210. Where the instance configuration request was determined to be not valid by compute instance management service 1175 at reference 1225, at reference 1260, compute instance management service 1175 generates and sends a message to API/SDK 1195 indicating that the instance configuration creation has failed. At reference 1265, API/SDK 1195 sends a message indicating that the instance configuration creation has failed to client 1210. In either case, in one embodiment, API/SDK 1195 generates a new message in response to receiving the message received at reference 1250 or reference 1260. In one embodiment, web interface server 1135 and API/SDK 1195 generate a request (such as a REST request) indicating the unsuccessful (failed) instance configuration creation, and sends it through network 1115 to client 1210.

Figure 13:
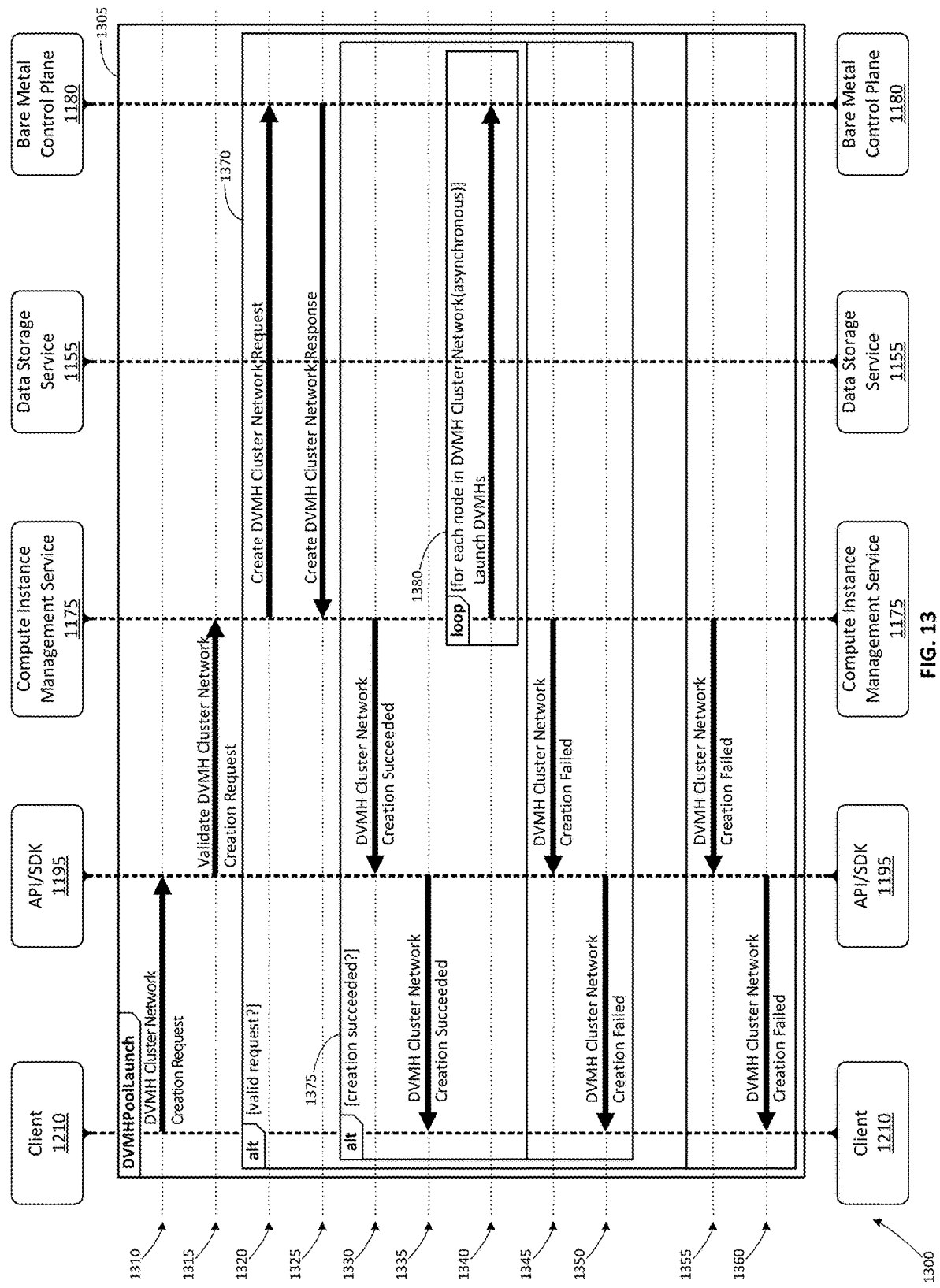
FIG. 13 illustrates a sequence diagram showing one embodiment of a compute cluster launch process associated with dedicated network authentication and allocation for dedicated virtual machine host clusters.

FIG. 13 illustrates a sequence diagram 1300 showing one embodiment of a compute cluster launch process 1305 (DVMHPoolLaunch) associated with dedicated network authentication and allocation for dedicated virtual machine host clusters. The sequence diagram 1300 shows interactions between client 1210, API/SDK 1195, compute instance management service 1175, data storage service 1155, and bare metal control plane 1180. The order of interactions between client 1110, API/SDK 295, compute instance management service 1175, data storage service 1155, and bare metal control plane 1180 is indicated by references 1310-

1365. Note that interactions for authentication and authorization are excluded from this workflow.

At reference 1310, client 1210 generates a request that the cloud computing system 1105 create a dedicated virtual machine host cluster network, and transmits it over network 1115 to web interface server 1135. In one embodiment, the request indicates the number of dedicated virtual machine hosts in the cluster. Web interface server 1135 executes the request against API/SDK 1195.

At reference 1315, API/SDK 1195 validates the dedicated virtual machine cluster network request against compute instance management service 1175. Validity or invalidity of the DVMH cluster network creation request may be evaluated by compute instance management service 1175 based on various factors including hardware availability and user subscription authorizations.

In one embodiment, optionally, compute instance management service 1175 may compare the rights of the user (or organization) associated with client 1210 to create a cluster having the number of hosts specified in the DVMH cluster network creation request at reference 1310. If the rights are not sufficient, for example because the request causes the number of hosts to exceed the number allowed by the user's subscription, the request is invalid.

The interactions described at references 1320-1350 are performed conditionally when the requested DVMH cluster network creation is confirmed to be valid, while the interactions described at references 1355-1360 are performed conditionally when the requested DVMH cluster network creation is not confirmed to be valid, or is confirmed to be invalid, as shown by alt enclosure 1370 (alt [valid request?]).

At reference 1320, compute instance management service 1175 requests bare metal control plane 1180 to create a DVMH cluster network. In one embodiment, bare metal control plane 1180 manages the bare metal host hardware selection from among the available bare metal machines and manages the launch of the selected hosts. In response to receiving to create a DVMH cluster network at reference 1320, bare metal control plane 1180 performs a DVMH cluster network launch procedure to establish a cluster network. In one embodiment, bare metal control plane 1180 maintains a list of all existing cluster networks as a data structure in data store(s) 1140. This list associates client 1210 with a unique cluster network identifier (or other information that distinctly identifies the cluster network), and also associates a virtual network ID with the cluster network identifier. PKI service 1185 retrieves the virtual network ID and inserts it as piggybacked network configure information when generating an instance principal certificate for a host belonging to the cluster network. In one sense, the instance principal certificate can be thought of as a host's "ticket" onto the virtual network indicated by the piggybacked virtual network ID.

In one embodiment, at the completion of the DVMH cluster network launch, at reference 1325, bare metal control plane 1180 responds to compute instance management service 1175 indicating whether the create DVMH cluster network request at reference 1320 has succeeded or not. In one embodiment, where the launch is successfully completed, a message indicating the success and including a cluster network identifier for the newly created DVMH cluster network is generated by bare metal control plane 1180 and sent to compute instance management service 1175. In one embodiment, where the launch is not successfully completed, a simple message indicating the failure, and optionally error information is generated by bare metal control plane 1180 and sent to compute instance management service 1175.

The interactions described at references 1330-1340 are performed conditionally when the requested DVMH cluster network is successfully created, while the interactions described at references 1345-1350 are performed conditionally when the requested DVMH cluster network creation is not successfully created, as shown by alt enclosure 1370 (alt [valid request?]). Success or failure of the requested DVMH cluster network creation is evaluated by compute instance management service 1175 based on the indication of success or failure in the create DVMH cluster network response received by compute instance management service 1175 at reference 1325.

Where the DVMH cluster network creation request was successful, at reference 1330, compute instance management service 1175 generates and sends a message to API/SDK 1195 indicating that DVMH cluster network creation has succeeded. At reference 1335, API/SDK 1195 generates and sends a message indicating that DVMH cluster network creation has succeeded to client 1210. In one embodiment, API/SDK 1195 generates a new message in response to receiving the message received at reference 1330. In one embodiment, web interface server 1135 and API/SDK 1195 generate a request (such as a REST request) indicating the successful instance configuration creation, and sends it through network 1115 to client 1210. Client 1210 thus receives confirmation that the creation of the cluster has succeeded. In one embodiment, the create DVMH cluster network response received by compute instance management service at reference 1325 includes information describing the newly created DVMH cluster, including access information. This access information may be included in the messages passed at references 1330 and 1335, delivering access information to client 1210 so that client 1210 can access and use the newly created DVMH cluster.

The interactions described at reference 1340 are repeated for each node in the DVMH cluster network, as shown by loop enclosure 1380 ([loop for each node in DVMH Cluster Network(asynchronous)]). At reference 1340 compute instance management service 1175 instructs bare metal control plane 1180 to launch one node as a DVMH. In response, bare metal control plane 1180 provisions one node with a hypervisor (such as DVMH hypervisor 1050) configured (i) with an allocation method to allocate virtual functions of an SR-IOV-enabled NIC to hosted virtual machines (such as allocation method 1067), and (ii) a port-based network access control supplicant (such as 802.1x supplicant 1065). Compute instance management service 1175 repeats this message to bare metal control plane 1180 for each of the bare metal hosts (nodes) in the cluster network. The launches may be performed asynchronously, such that the launch of each node need not be begun or completed at the same time.

DVMH cluster network creation may fail either because the DVMH cluster network creation request is found to be invalid at reference 1315, or because the creation request at reference 1320 fails. Failure notification is then returned to client 1210 Where the creation request at reference 1320 fails (as may be indicated by the response at reference 1325), at reference 1345 compute instance management service 1175 generates and sends a message to API/SDK 1195 indicating that the DVMH cluster network creation has failed. At reference 1350, API/SDK 1195 sends a message indicating that the DVMH cluster network creation has failed to client 1210. Where the DVMH cluster network creation request is not valid (as may be determined by compute instance 1175 at reference 1315), at reference 1355 compute instance management service 1175 generates and sends a message to API/SDK 1195 indicating that the DVMH cluster network creation has failed. At reference 1360, API/SDK 1195 sends a message indicating that the DVMH cluster network creation has failed to client 1210.

Figure 14:
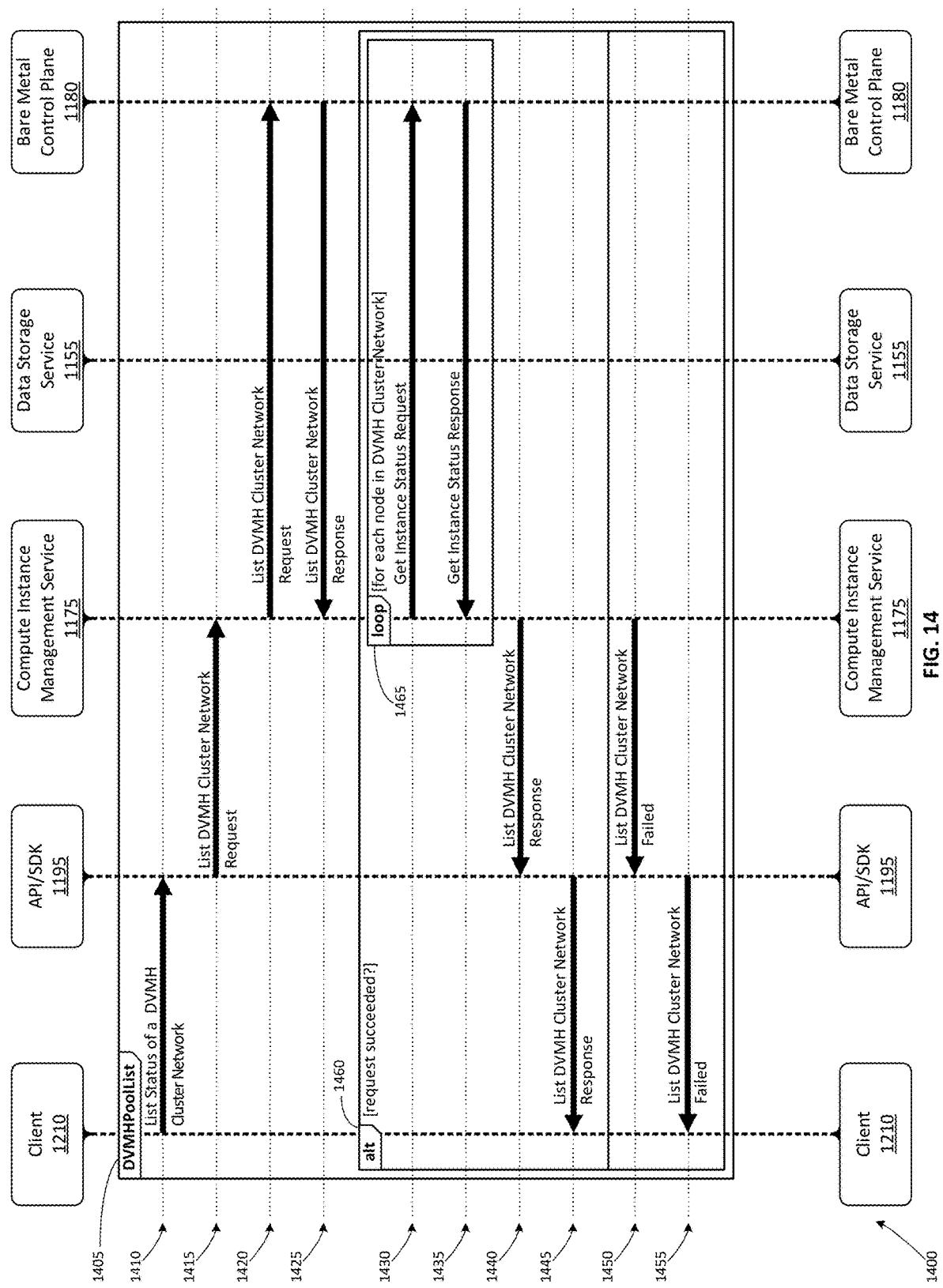
FIG. 14 illustrates a sequence diagram showing one embodiment of a compute cluster monitoring process associated with dedicated network authentication and allocation for dedicated virtual machine host clusters.

FIG. 14 illustrates a sequence diagram 1400 showing one embodiment of a compute cluster monitoring process 1405 (DVMHPoolList) associated with dedicated network authentication and allocation for dedicated virtual machine host clusters. The sequence diagram 1400 shows interactions between client 1210, API/SDK 1195, compute instance management service 1175, data storage service 1155, and bare metal control plane 1180. The order of interactions between client 1110, API/SDK 295, compute instance management service 1175, data storage service 1155, and bare metal control plane 1180 is indicated by references 1410-1455.

At reference 1410 client 1210 sends a request to API/SDK 1195 to list the status of a DVMH cluster network. In one embodiment, client 1210 generates the request and transmits it over network 1115 to web interface server 1135. Web interface server 1135 executes the request against API/SDK 1195. In one embodiment, the client 1210 specifies the DVMH cluster network for which the status is requested in the request. In one embodiment, where the client 1210 is associated with only one DVMH cluster network, the request is presumed to be for the status of that DVMH cluster network.

In response to the request to list the status of a DVMH cluster network, at reference 1415 the API/SDK 1195 instructs compute instance management service 1175 to list the DVMH cluster network. In response to the instruction from API/SDK 1195, at reference 1420, compute instance management service 1175 requests bare metal control plane 1180 to provide a list of all nodes (hosts) in the DVMH cluster network. Bare metal control plane 1180 attempts to determine the list of hosts belonging to (participating in) the DVMH cluster network. If successful, at reference 1425 bare metal control plane 1180 returns a message indicating the success and the list of hosts belonging to the DVMH cluster network to compute instance management service 1175. If the attempt to determine the list of hosts is not successful, at reference 1425 bare metal control plane 1180 returns a message indicating the failure to compute instance management service 1175. Compute instance management service 1175 parses the list DVMH cluster network response received at reference 1425 and determines whether the list DVMH cluster network request made at reference 1420 was successful.

The interactions described at references 1430-1445 are performed conditionally when bare metal control plane 1180 successfully provides the list of hosts in the DVMH cluster network at reference 1425, while the interactions described at references 1450-1455 are performed conditionally when bare metal control plane 1180 fails to return the list of hosts in the DVMH cluster network, as shown by alt enclosure 1460 (alt [request succeeded?]).

Where the list DVMH cluster network request successfully returns a list of hosts in the cluster network, the status of each individual node is retrieved. Accordingly, the interactions described at references 1430-1435 are repeated for each node in the DVMH cluster network, as shown by loop enclosure 1465 ([loop for each node in DVMH Cluster Network]). At reference 1430 compute instance management service 1175 sends a get instance status request to bare metal control plane 1180. In one embodiment, compute instance management service 1175 sends a message to the bare metal control plane 1180 requesting the instance status of the next unpolled host (that is, the next host in the list that has not already returned an instance status in loop 1465) in the list of hosts in the DVMH cluster network. The bare metal control plane 1180 retrieves the status information of the host. At reference 1435, bare metal control plane 1180 sends a get instance status response to compute instance management service. In one embodiment, the bare metal control plane 1180 sends a message to the compute instance management service including the retrieved status information about the host. Compute instance management service appends the returned status information to a report of the statuses of all the hosts in the list. The report may be stored by data storage service 1155 as a data structure in data stores 1140. Loop 1465 then repeats from reference 1430 until there are no more unpolled hosts in the DMVH cluster network. The report of the statuses then contains the statuses of all hosts in the DMVH cluster network. At reference 1440, compute instance management service 1175 returns a response to the list DVMH cluster network request of reference 1415 to API/SDK 1195. In one embodiment, compute instance management service 1175 generates and sends a message to API/SDK 1195 indicating the success of the request and including either the report of the statuses or a reference to a location in storage where the report data structure can be found. At reference 1445, API/SDK 1195 generates sends a message to client 1210 indicating the success of the request and including the report. Client 1210 is thereby provided with a report of the statuses of all nodes in the DVMH cluster network.

Or, where the request to list the DVMH cluster network at reference 1420 fails, and no list of nodes in the cluster network is returned to the compute instance management service 1175 at reference 1425, at reference 1450 compute instance management service 1475 generates and sends a message to API/SDK 1195 indicating the failure of the request. In response to receiving this message, at reference 1455 API/SDK 1195 generates and sends a message to client 1210 indicating the failure of the request.

Hypervisor

Dedicated virtual machine hosts may be launched with a hypervisor image, such as DVMH hypervisor 1050, for creating or running virtual machines on the host. In one embodiment, DVMHs are launched with the hypervisor image used by the virtual machine dataplane (VMDP) group to manage virtual machines for customers launching virtual machines on the cloud. In one embodiment, the hypervisor launch workflow is extended in two places to provide the host with isolated access to a secondary, dedicated high-speed network.

In one embodiment, the host may be configured with two additional software packages: (1) software to support single root input/output virtualization (SR-IOV), for example a copy of the Mellanox CX-5 kernel that is configured to support SR-IOV; and (2) WPA supplicant software package that supports the extensible authentication protocol, which is used to present an instance principal certificate to a switch (a secondary switch) of the secondary (high-speed) network. These two packages are configured separately using startup mechanisms available in a system and service manager such as the systemd software suite or other init-type daemons. In one embodiment, the systemd components are executed as part of cloud services 1005.

In one embodiment, the virtual machine data plane is configured to support the use of virtual functions (such as VF 1 1040-VF m 1045) of a high-speed NIC (such as High-speed NIC 1) of the host. The virtual machine data plane is configured to support allocation and deallocation of the virtual functions to guest virtual machines executing on the host. On virtual machine launch, a pre-authenticated SR-IOV virtual function is allocated and passed into the guest. Note that the pool of available virtual functions for a NIC is not unlimited. On virtual machine teardown, the virtual function is deallocated and returned to the pool of available virtual functions for future launches of guest virtual machines.

In one embodiment, counters for successful operations are optional. In one embodiment, counters for failed operations are mandatory to enable on-call staff to quickly determine the type of failure that is occurring. In one embodiment, logging on all interactions is mandatory with LOG_INFO used for successful operations and with LOG_ERROR used for failed operations.

Figure 15:
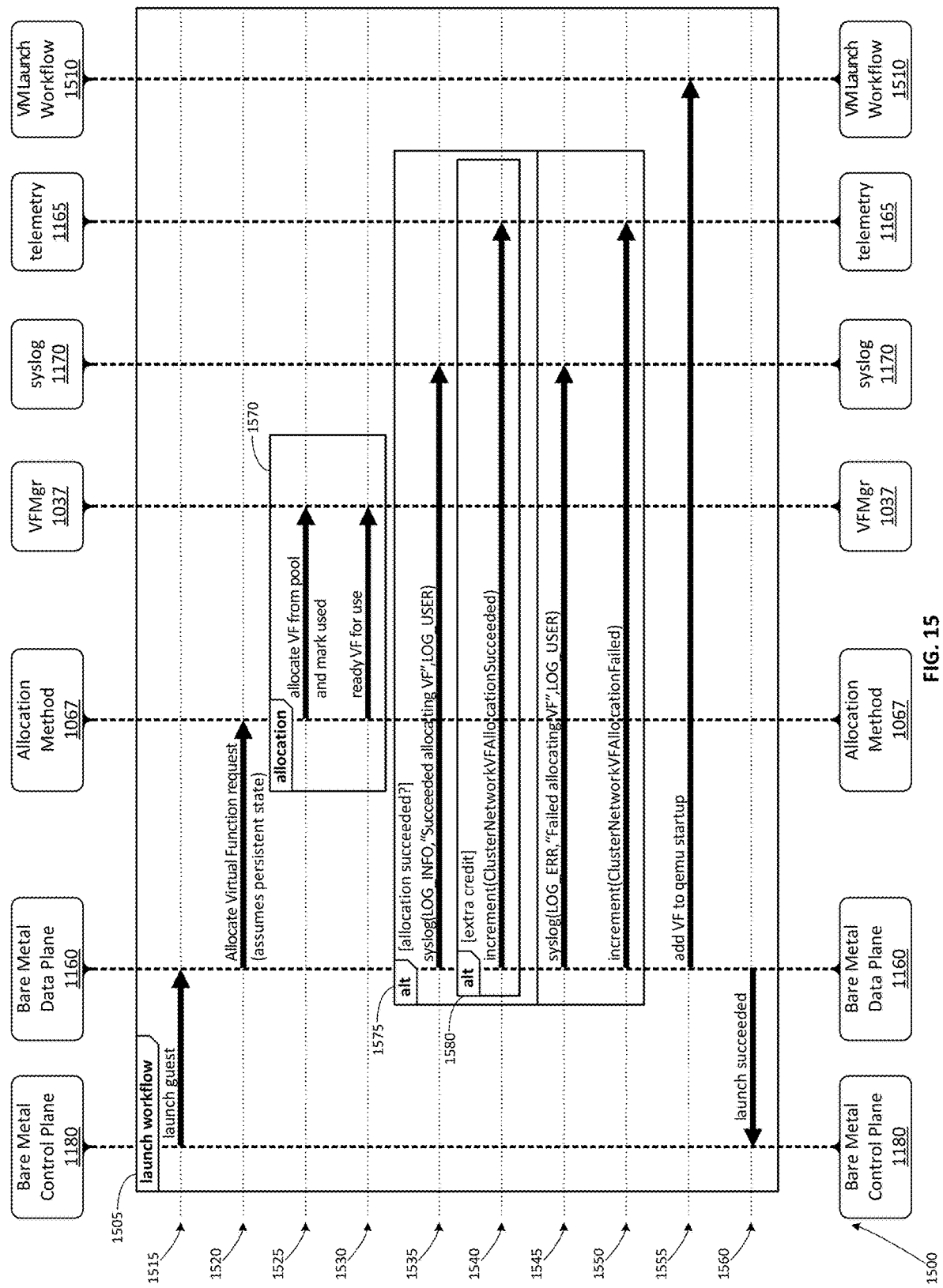
FIG. 15 illustrates a sequence diagram showing an embodiment of a guest VM launch process for assignment of a SR-IOV virtual function to the guest VM associated with dedicated network authentication and allocation for dedicated virtual machine host clusters.

FIG. 15 illustrates a sequence diagram 1500 showing an embodiment of a guest VM launch process 1505 for assignment of a SR-IOV virtual function to the guest VM associated with dedicated network authentication and allocation for dedicated virtual machine host clusters. In sequence diagram 1500, bare metal control plane 1180 has launched a hypervisor, which allocates a virtual function of the high-speed NIC for a new guest VM, and then launches the new guest VM. The sequence diagram 1500 shows interactions between bare metal control plane 1180, bare metal data plane 1160, allocation method 1067, virtual function manager (VFMgr) 1037, system log (syslog) 1170, telemetry 1165, and general virtual machine launch workflow 1510. The order of interactions between bare metal control plane 1180, bare metal data plane 1160, allocation method 1067, virtual function manager (VFMgr) 1037, system log (syslog) 1170, telemetry 1165, and general virtual machine launch workflow 1510 is indicated by references 1515-1560.

Figure 16:
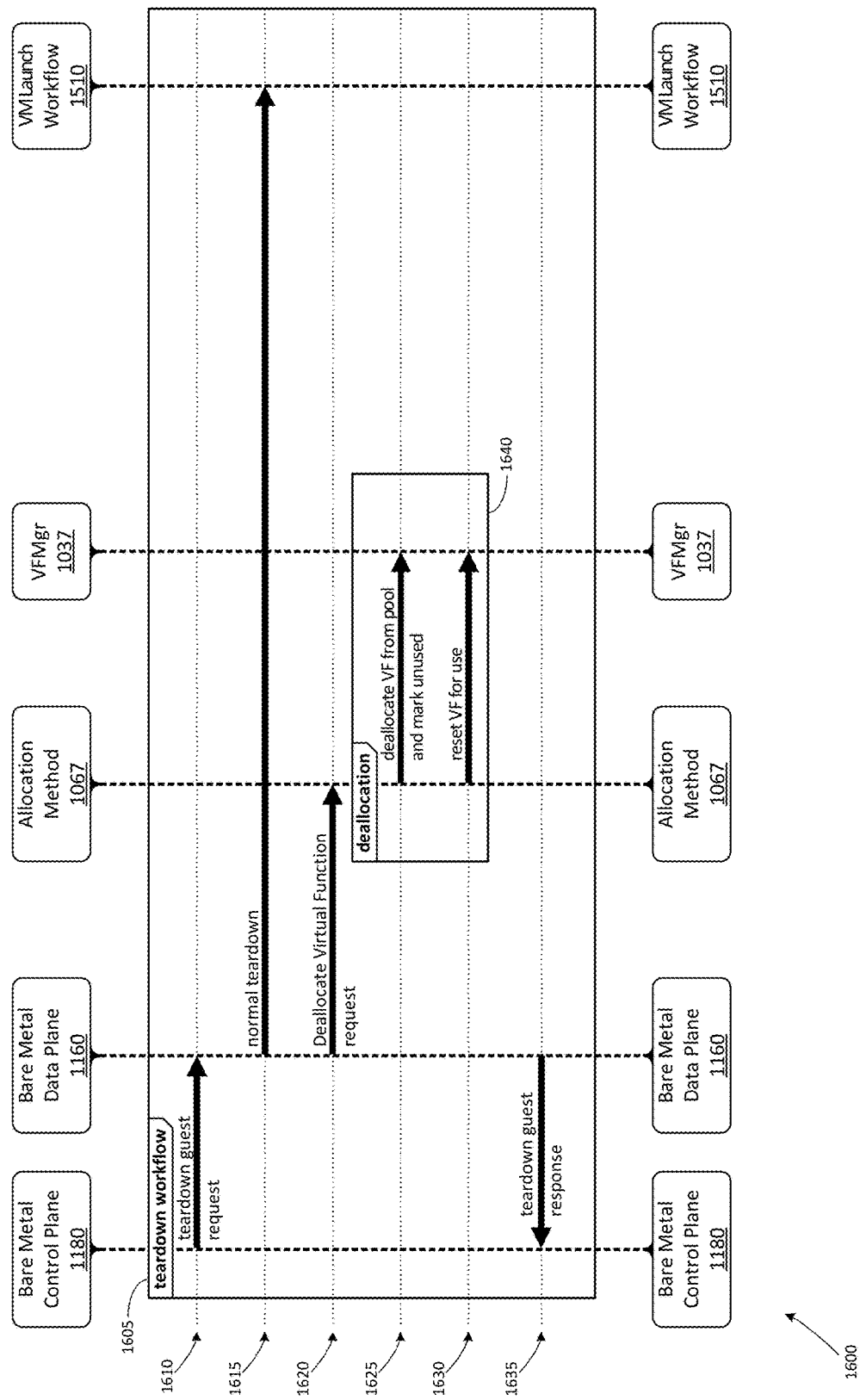
FIG. 16 illustrates a sequence diagram showing an embodiment of a guest VM teardown process for recovery of a SR-IOV virtual function assigned to the guest VM associated with dedicated network authentication and allocation for dedicated virtual machine host clusters.

At reference 1515, bare metal control plane 1180 sends an instruction to launch a new guest VM to bare metal data plane 1160. In response to the instruction to launch a new guest VM, at reference 1520, bare metal data plane 1160 sends a request to allocate a virtual function to virtual function allocation method 1067. In one embodiment, the request to allocate a virtual function assumes a persistent state for the allocation—once a virtual function is allocated to a guest, that allocation remains in place until that virtual function is de-allocated (as shown in FIG. 16). Virtual functions are typically a limited resource of the SR-IOV-enabled high-speed NIC. For example, a high-speed NIC may have a maximum of 64 virtual functions (or queues) that may be allocated to virtual machines. In one embodiment, the number of available virtual functions should be no fewer than the maximum number of guest VMs that can be hosted by bare metal host hardware shape. Accordingly, when the virtual functions are handed out to guest VMs when the guest VMs are launched, the assignment of the virtual function to the VM is tracked, and the allocated virtual function is recovered from the VM when the VM is torn down. This tracking and management of the allocation of virtual functions is handled by the hypervisor of each host, for example by allocation method 1067.

References 1525-1530 describe steps that allocate a virtual function, as indicated by allocation enclosure 1570. At reference 1525, the allocation method 1067 instructs the virtual function manager 1037 to allocate a virtual function from a pool of available virtual functions, and mark it as used (in use by a guest VM). In one embodiment, virtual function manager 1037 maintains a VF pool list of the available virtual functions of the SR-IOV-enabled NIC (for example, high-speed NIC 1035) as a data structure in local storage of the bare metal host. The VF pool list includes a unique identifier (such as an alternate MAC address) for each of the virtual functions of the NIC as well as a flag indicating whether or not the virtual function is currently assigned to a guest VM. In one embodiment, allocation method 1067 parses through the VF pool list to identify a virtual function that is indicated to be unassigned (that is, not currently assigned to a guest VM). For example, allocation method 1067 may select the first unassigned virtual function that it encounters in the VF pool list. Allocation method 1067 stores the identifier for the unassigned virtual function that it has selected as a data structure in local storage of the bare metal host for later reference when readying the VF for use and when launching a new guest VM. Allocation method 1067 changes the flag for the selected virtual function from unassigned status to assigned status in the VF pool list, thus marking the selected virtual function as used. The selected virtual function is thus allocated for use. At reference 1530, the allocation method 1067 instructs the virtual function manager 1037 to ready the allocated virtual function for use.

The interactions described at references 1535-1540 are performed conditionally when the allocation has succeeded, while the interactions described at references 1545-1550 are performed conditionally when the allocation has failed, as shown by alt enclosure 1575 (alt [allocation succeeded?]).

Where the allocation of the virtual function has succeeded, at reference 1535, bare metal data plane 1160 records the success of the allocation in syslog 1170. In one embodiment, bare metal data plane 1160 generates a command to create a new entry in syslog 1170. The command writes an informational message ("LOG_INFO") "Succeeded allocating VF" as a user-level message ("LOG_USER") in syslog 1170. Further, if telemetry reporting is enabled for successes (as shown by alt enclosure 1580 [extra credit]) in addition to required reporting for failures, at reference 1540 bare metal data plane 1160 also increments a count of successful allocations of virtual functions by one, ClusterNetworkVFAllocationSucceeded, in telemetry module 1165. Where the allocation of the virtual function has failed, at reference 1545, bare metal data plane 1160 records the failure of the allocation in syslog 1170. In one embodiment, bare metal data plane 1160 generates a command to create a new entry in syslog 1170. The command writes an error conditions record ("LOG_ERR") "Failed allocating VF" as a user-level message ("LOG_USER") in syslog 1170. Further, at reference 1550 bare metal data plane 1160 also increments a count of successful allocations of virtual functions, ClusterNetworkVFAllocationSucceeded, in telemetry module 1165. In one embodiment, the attempt to allocate a virtual function is repeated until the allocation succeeds, or until a cutoff threshold number of failed attempts is reached.

If the allocation of the virtual function is successful, at reference 1555, the unique identifier of the allocated virtual function is provided to virtual machine launch workflow 1510 executed by the hypervisor (for example, a QEMU hypervisor). In one embodiment, the unique identifier of the allocated virtual function (such as an alternate MAC address for the SR-IOV enabled NIC, where the alternate MAC address is associated with the allocated VF, or a PCI device address associated with the allocated VF) is supplied as the network interface card information for a new guest virtual machine launched by the workflow 1510. In one embodiment, the –device option in the QEMU launch workflow can be used to provide the virtual function to the guest virtual machine. The parameters of the –device option includes device name, MAC address for the device, a network identifier for a network to attach the device to, and optionally additional device options supported by the virtual function. In one embodiment, the unique identifier of the allocated virtual function is stored associated in a one-to-one relationship with a unique identifier for the new guest virtual machine in a data structure in local storage on the bare metal host. In one embodiment, a virtual network interface card is also supplied to the virtual machine launch workflow 1510 to enable the new guest virtual machine to interact with the virtual cloud network 1150.

Note that advantageously, in one embodiment, the virtual machine launch workflow 1510 is a typical virtual machine launch workflow, and requires no special modification to operate in the DVMH cluster described herein. The particular features of the DVMH cluster associated with dedicated network authentication and allocation for dedicated virtual machine host clusters enable virtual machine launch workflow 1510 to operate without modification from the operation of a typical launch workflow. Instead, the normal or typical launch workflow (such as a QEMU launch workflow) is provided with the virtual function, and the high-speed network authentication and isolation is handled by the host.

At reference 1560, bare metal data plane 1160 sends a message to bare metal control plane 1180 indicating that the launch of a new guest virtual machine has succeeded. The message includes addressing information for the new guest virtual machine. Bare metal control plane 1180 can therefore interact with the newly created guest.

Thus, virtual function allocation at guest virtual machine launch is handled at the hypervisor level. The guest virtual machine takes no part in the allocation of the virtual function, rendering the allocation invisible or transparent to the guest virtual machine. This improves over systems in which the guest virtual machine must include configuration overhead in order to manage network access.

FIG. 16 illustrates a sequence diagram 1600 showing an embodiment of a guest VM teardown process 1605 for recovery of a SR-IOV virtual function assigned to the guest VM associated with dedicated network authentication and allocation for dedicated virtual machine host clusters. The sequence diagram 1600 shows interactions between bare metal control plane 1180, bare metal data plane 1160, allocation method 1067, virtual function manager (VFMgr) 1037, system log (syslog) 1170, telemetry 1165, and general virtual machine launch workflow 1510. The order of interactions between bare metal control plane 1180, bare metal data plane 1160, allocation method 1067, virtual function manager (VFMgr) 1037, system log (syslog) 1170, telemetry 1165, and general virtual machine launch workflow 1510 is indicated by references 1610-1635. Error handling for the teardown process is not shown in sequence diagram 1600.

At reference 1610, bare metal control plane 1180 sends an instruction to teardown a guest VM to bare metal data plane 1160. In response, at reference 1615, bare metal data plane 1160 instructs general virtual machine launch workflow 1510 to execute its normal teardown process for the guest VM. When completed, the teardown process terminates the operation of the guest VM. At reference 1620, bare metal data plane requests that allocation method 1067 deallocate the virtual function that is assigned to the guest VM that was torn down at reference 1615. References 1625-1630 describe steps that deallocate a virtual function, as indicated by deallocation enclosure 1640. At reference 1625, the allocation method 1067 instructs the virtual function manager 1037 to deallocate the virtual function that was assigned to the guest VM, returning it to the pool of available virtual functions, and marking it as unused (not in use by a guest VM). In one embodiment, the unique identifier of the virtual function allocated to the guest VM that was torn down is retrieved from local storage (for example, by looking up the identifier of the virtual function associated with the identifier of the guest VM that was torn down) by allocation method 1067. Allocation method 1067 then searches the VF pool list maintained by VFMgr 1037 and marks it unused, for example by changing the flag for the virtual function that was assigned to the torn-down VM from assigned status to unassigned status in the VF pool list. At reference 1630, the allocation method 1067 instructs the virtual function manager 1037 to reset the deallocated virtual function for use. At reference 1635, bare metal data plane 1160 sends a message to bare metal control plane 1180 indicating that the requested teardown of the guest virtual machine has succeeded.

Thus, virtual function deallocation at guest virtual machine teardown is handled at the hypervisor level. The guest virtual machine takes no part in the deallocation of the virtual function, rendering the deallocation invisible or transparent to the guest virtual machine. This improves over systems in which the guest virtual machine must include configuration overhead in order to manage network access.

Cluster Network Dedicated Switch Interaction

Figure 17A:
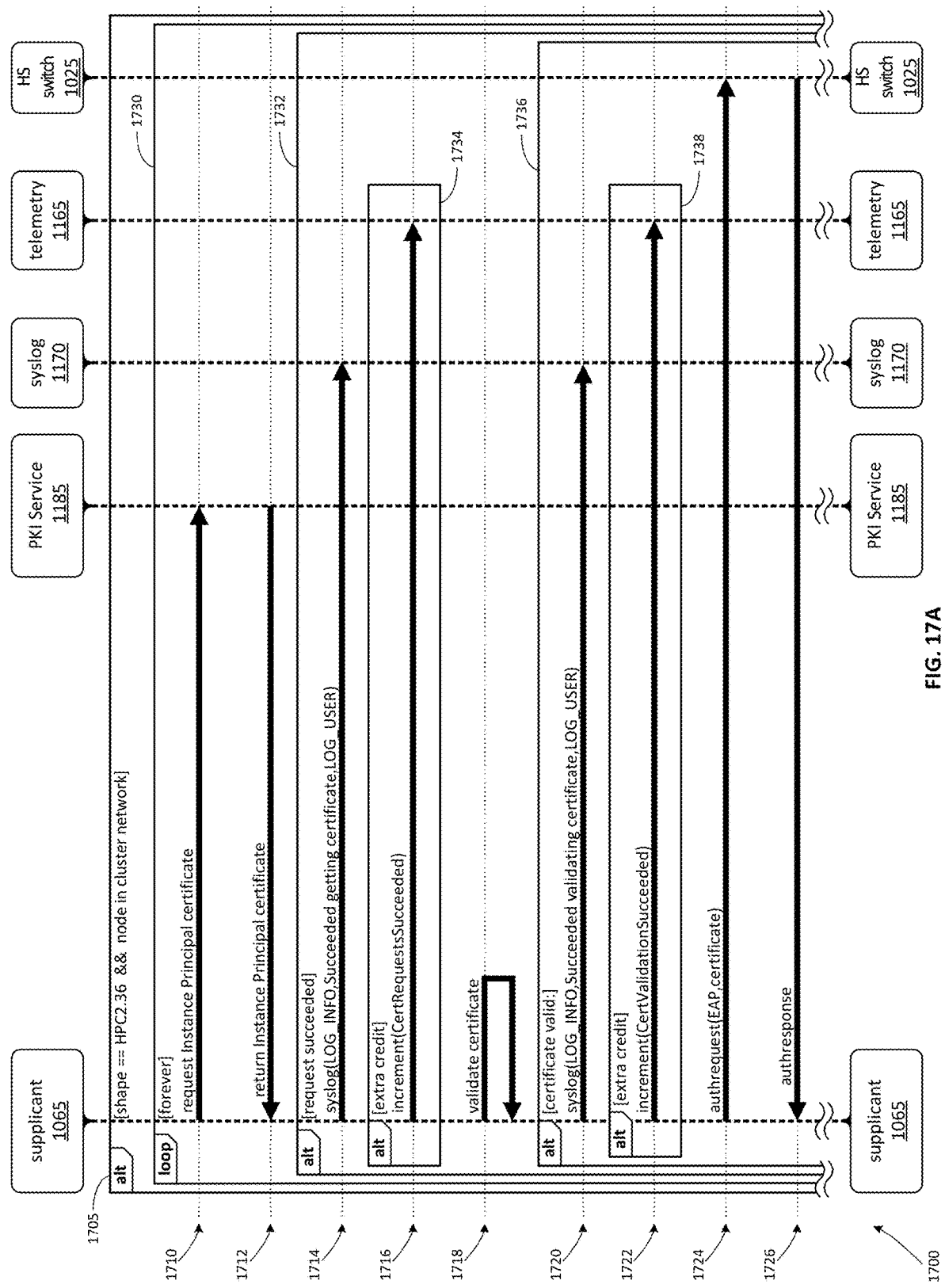
FIG. 17A illustrates a beginning portion of a sequence diagram showing an embodiment of a cluster node network membership maintenance process associated with dedicated network authentication and allocation for dedicated virtual machine host clusters.
Figure 17B:
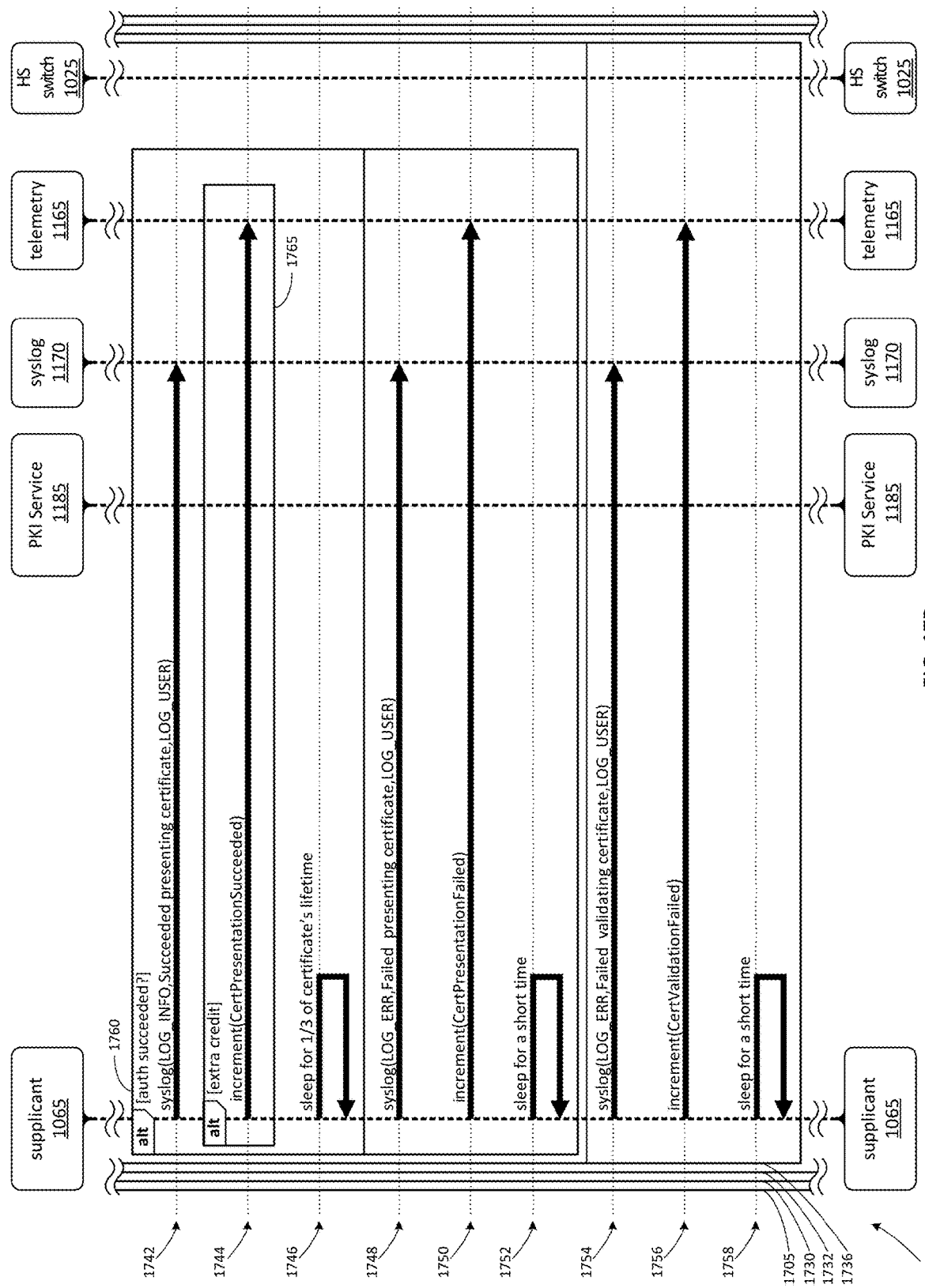
FIG. 17B illustrates a middle portion of a sequence diagram showing an embodiment of a cluster node network membership maintenance process associated with dedicated network authentication and allocation for dedicated virtual machine host clusters.
Figure 17C:
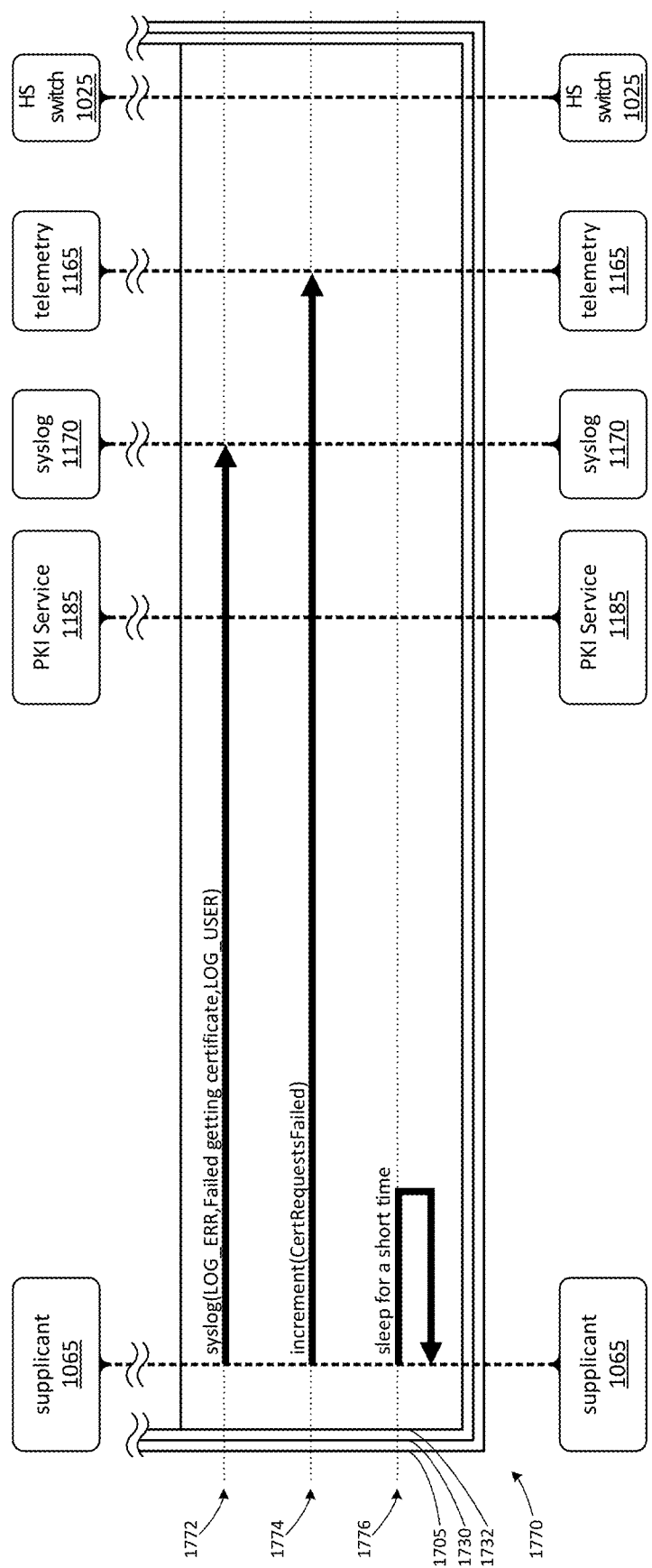
FIG. 17C illustrates an end portion of a sequence diagram showing an embodiment of a cluster node network membership maintenance process associated with dedicated network authentication and allocation for dedicated virtual machine host clusters.

FIGS. 17A-17C illustrate a sequence diagram showing an embodiment of a cluster node membership maintenance process associated with dedicated network authentication and allocation for dedicated virtual machine host clusters. The cluster node membership maintenance process shows how the hypervisor gains admittance for the host to the high-speed network and dedicated virtual network for the cluster, and maintains this access. Advantageously, the cluster node membership maintenance process is performed by the hypervisor of the host, and not the guest VMs. The cluster node membership maintenance process is performed independently by each bare metal host of the cluster. FIG. 17A illustrates a beginning portion of the sequence diagram 1700 showing an embodiment of the cluster node network membership maintenance process 1705. The sequence diagram 1700 shows interactions between supplicant 1065, PKI service 1185, system log (syslog) 1170, telemetry 1165, and high-speed switch 1025. The order of interactions between supplicant 1065, PKI service 1185, system log (syslog) 1170, telemetry 1165, and high-speed switch 1025 in the beginning portion of the sequence diagram 1700 is indicated by references 1710-1726.

In one embodiment, cluster node network membership maintenance process 1705 is launched when both (i) a compute shape (or compute hardware configuration) selected for launch of a host is a pre-selected high-performance computing shape and (ii) the host is to be a node in a cluster network. This condition is indicated by the alt enclosure for the cluster node network membership maintenance process 1705 ([shape==HPC2.36 && node in cluster network]). In one example, the high-performance computing shape is an HPC2.36 bare metal host. In one example, other bare metal high-performance computing shapes may be used instead of the HPC2.36 shape.

In the cluster node network membership maintenance process 1705, the steps are repeated until the node is shut down, as indicated by loop enclosure 1730.

At reference 1710, supplicant 1065 of the host requests an instance principal certificate from PKI service 1185. In one embodiment, the instance principal certificate is a digital certificate that includes piggybacked virtual network identifiers associated with a computing cluster, such as digital certificate 165, as described herein. In one embodiment, supplicant 1065 of the host sends a message to PKI service 1185 requesting an instance principal certificate and including the unique cluster network identifier of the cluster network to which the host is assigned. PKI service 1185 retrieves the virtual network identifier associated with the unique cluster network identifier included in the request for the instance principal certificate in the list of all existing cluster networks. PKI service 1185 then generates an instance principal certificate and includes the retrieved virtual network identifier as piggybacked network configuration information in the certificate (for example as an encrypted blob within an X.509 attribute of the instance principal certificate). At reference 1712, PKI service 1185 returns the requested instance certificate generated by PKI service 1185 to supplicant 1065.

The interactions described within alt enclosure 1732 (alt [request succeeded]), including references 1714-1726 in FIG. 17A and additional references in FIGS. 17B and 17C are performed conditionally when the request for the instance principal certificate has succeeded, and an instance principal certificate is returned from PKI service 1185 at reference 1712. If the request for the instance principal certificate does not succeed, and no instance principal certificate is returned from PKI service 1185 at reference 1712, loop 1730 repeats from the request for an instance principal certificate at 1710.

Once the request for the instance principal certificate has succeeded and an instance principal certificate provided at reference 1712, at reference 1714, supplicant 1065 records the success of the instance principal certificate request in syslog 1170. In one embodiment, supplicant 1065 generates a command to create a new entry in syslog 1170. The command writes an informational message ("LOG_INFO") "Succeeded getting certificate" as a user-level message ("LOG_USER") in syslog 1170. Further, if telemetry reporting is enabled for successes (as indicated by alt enclosure 1734 (alt [extra credit])) in addition to required reporting for failures, at reference 1716 supplicant 1065 increments a count of successful requests for instance principal certificates by one, CertRequestsSucceeded, in telemetry module 1165.

At reference 1718, supplicant 1065 attempts to validate the instance principal certificate. In one embodiment, validation includes determining that the instance principal certificate is (i) currently active and has not expired, (ii) that the certificate has integrity and has not been altered or tampered with, and (iii) that the certificate has not been revoked by PKI service 1185. Additional validation conditions may also be evaluated. Where the instance principal certificate fails to satisfy all of these criteria, the validation fails. Where the instance principal certificate satisfies all of these criteria, the instance principal certificate is successfully validated. The supplicant 1065 records the success or failure of the validation. Note, in one embodiment, the instance principal certificate may be revoked when the DMVH cluster network for which the certificate is issued is terminated.

The interactions described within alt enclosure 1736 (alt [request succeeded]), including references 1720-1726 in FIG. 17A and additional interactions references in FIG. 17B are performed conditionally when the instance principal certificate is successfully validated, that is, confirmed to be valid at reference 1718. If the instance principal certificate is not successfully validated at reference 1718, additional interactions in FIG. 17B (references 1754-1758) are performed.

Once the validation of the instance principal certificate has succeeded at reference 1718, at reference 1720, supplicant 1065 records the success of the instance principal certificate request in syslog 1170. In one embodiment, supplicant 1065 generates a command to create a new entry in syslog 1170. The command writes an informational message ("LOG_INFO") "Succeeded validating certificate" as a user-level message ("LOG_USER") in syslog 1170. Further, if telemetry reporting is enabled for successes (as shown by alt enclosure 1738 (alt [extra credit])) in addition to required reporting for failures, at reference 1722 supplicant 1065 increments a count of successful validations of the instance principal certificates by one, CertValidationSucceeded, in telemetry module 1165.

At reference 1724, supplicant 1065 requests authentication from high-speed switch 1025. In one embodiment, supplicant 1065 of the host generates an authentication request using EAP and including the instance principal certificate and submits it to the 802.1x authenticator 1070 of high-speed switch 1025. In one embodiment, the authentication request is submitted through an 802.1x authenticator 1070 to which the host 1015 is connected, as described elsewhere herein. In one embodiment, on the first submission of the authentication request at reference 1724, the controlled logical port of the physical port is closed to general traffic, and the submission of the authentication request transfers the network configuration to the switch by piggyback in the instance principal certificate and negotiates the opening of the controlled port to a virtual network indicated by the network configuration information. In subsequent repetitions of the loop 1730, the subsequent submissions of a valid certificate act to maintain access of host 1015 access to the virtual network by renewing authentication. In both the case of initial and subsequent authentications, the instance principal certificate is extracted from the authentication request by authenticator 1070, and submitted to radius client/server 1075 for further processing to (i) verify the credentials carried by the instance principal certificate and (ii) manage access to the virtual network(s) operated by high-speed switch 1025 for the host based on network configuration information included in the instance principal certificate (as described elsewhere herein in greater detail).

At reference 1726, high-speed switch 1025 sends a response to the authentication request to supplicant 1065. In one embodiment, radius client/server 1075 in high-speed switch 1025 successfully extracts a VLAN id (network configuration information) from the instance principal certificate, and communicates the VLAN ID to 802.1x authenticator 1070 of high-speed switch 1025. In response, 802.1x authenticator 1070 configures high-speed switch 1025 to route traffic arriving at the controlled logical port of the physical port to which host 1015 is connected into the virtual network indicated by the VLAN ID (and to open the controlled port to traffic, if it is not already open). 802.1x authenticator 1070 of high-speed switch 1025 then generates and sends an authentication message (such as an EAP-success frame) to supplicant 1065 of host 1015 indicating that access is granted. Alternatively, where authentication of the instance principal certificate by RADIUS client/server 1075 fails, RADIUS client/server 1075 communicates the failure to 802.1x authenticator 1070 of high-speed switch 1025. In response, 802.1x authenticator 1070 configures high-speed switch 1025 to close the controlled logical port of the physical port to which host 1015 is connected (if the controlled port is not already closed) to prevent general network traffic from entering the high-speed switch 1025 from host 1015 or exiting the high-speed switch 1025 to host 1015. 802.1x authenticator 1070 of high-speed switch 1025 then generates and sends an authentication message (such as an EAP-failure frame) through the uncontrolled logical port to supplicant 1065 of host 1015 indicating that access to the high-speed switch (and consequently, to the dedicated high-speed network for the cluster) is not granted.

The cluster node network membership maintenance process 1705 continues in FIG. 17B. FIG. 17B illustrates a middle portion of the sequence diagram 1740 showing an embodiment of the cluster node network membership maintenance process. The sequence diagram 1740 shows further interactions between supplicant 1065, PKI service 1185, system log (syslog) 1170, telemetry 1165, and high-speed switch 1025 in the middle portion of the sequence diagram 1740. The order of these interactions is indicated by references 1742-1758.

The interactions described at references 1742-1746 are performed conditionally when the authentication has succeeded, while the interactions described at references 1748-1752 are performed conditionally when the authentication has failed, as shown by alt enclosure 1760 (alt [auth succeeded?]).

Where the supplicant receives an authentication response indicating success at reference 1726, such as an EAP-success frame, at reference 1742, supplicant 1065 records the success of the instance principal certificate authentication in syslog 1170. In one embodiment, supplicant 1065 detects the EAP-success frame, and in response generates a command to create a new entry in syslog 1170. The command writes an informational message ("LOG_INFO") "Succeeded presenting certificate" as a user-level message ("LOG_USER") in syslog 1170. Further, if telemetry reporting is enabled for successes (as shown by alt enclosure 1765 (alt [extra credit])) in addition to required reporting for failures, at reference 1744 supplicant 1065 increments a count of successful authentications of the instance principal certificates by one, CertPresentationSucceeded, in telemetry module 1165. Supplicant 1065 then pauses the cluster node network membership maintenance process 1705 or causes it to sleep for a time, for example one third of the instance principal certificate's lifetime (or period for which the instance principal certificate is valid) as shown at reference 1752. In one embodiment, the instance principal certificate is valid for 2 hours, and so the sleep period may be approximately 40 minutes. This allows reauthentication to fail multiple times before the host is dropped from the cluster network. In one embodiment, the sleep period may be approximately 20 minutes.

In one embodiment where no failures of instance principal certificate retrieval or authentication occur, an instance principal certificate is re-retrieved by the supplicant 1065 of the host at references 1710-1712 and supplicant 1065 of the host re-authenticates against HS switch 1025 with the newly retrieved instance principal certificate once every 20-30 minutes. In one embodiment, this process is repeated (indicated by loop 1730) once every 25 minutes. If the certificate is not updated and reauthenticated regularly, the host will no longer be authenticated and will lose access to the high-speed network and dedicated virtual network once its instance principal certificate expires.

Where the supplicant receives an authentication response indicating failure at reference 1726, such as an EAP-failure frame, at reference 1748, supplicant 1065 records the failure of the instance principal certificate authentication in syslog 1170. In one embodiment, supplicant 1065 detects the EAP-failure frame, and in response generates a command to create a new entry in syslog 1170. The command writes an error conditions record ("LOG_ERR") "Failed presenting certificate" as a user-level message ("LOG_USER") in syslog 1170. Further, at reference 1750 supplicant 1065 increments a count of unsuccessful authentications of the instance principal certificates by one, CertPresentationFailed, in telemetry module 1165. At reference 1752, supplicant 1065 then pauses the cluster node network membership maintenance process 1705 or causes it to sleep for a relatively short time compared to the sleep period above for successfully authenticated certificates, for example a few milliseconds to a few minutes, such as 1 millisecond to 5 minutes. The short sleep period here can be set to maintain an appropriate polling load on 802.1x authenticator 1070 and RADIUS client/server 1075 of high-speed switch 1025. In one embodiment, the short sleep period is generally not smaller than the time expected for the switch 1025 to accept an authentication request and return an authentication response (for example, and EAP-success or EAP-failure frame).

References 1754-1758 are interactions within alt enclosure 1736 (alt [certificate valid:]) performed conditionally when the instance principal certificate is not successfully validated or fails. At reference 1754, where instance principal certificate validation has failed at reference 1718, supplicant 1065 records the failure of the instance principal certificate validation in syslog 1170. In one embodiment, supplicant 1065 detects the validation failure, and in response generates a command to create a new entry in syslog 1170. The command writes an error conditions record ("LOG_ERR") "Failed validating certificate" as a user-level message ("LOG_USER") in syslog 1170. Further, at reference 1756 supplicant 1065 increments a count of unsuccessful validations of the instance principal certificates by one, CertValidationFailed, in telemetry module 1165. At reference 1758, supplicant 1065 then pauses the cluster node network membership maintenance process 1705 or causes it to sleep for a relatively short time compared to the sleep period above for successfully authenticated certificates, for example a few milliseconds to a few minutes, such as 1 millisecond to 5 minutes. The short sleep period here can be set to maintain an appropriate polling load on PKI service 1185. In one embodiment, the short sleep period is generally not smaller than the time expected for the PKI service 1185 to accept a certificate request and return a certificate.

The cluster node network membership maintenance process 1705 continues in FIG. 17C. FIG. 17C illustrates an end portion of the sequence diagram 1770 showing an embodiment of the cluster node network membership maintenance process 1705. The sequence diagram 1770 shows further interactions between supplicant 1065, PKI service 1185, system log (syslog) 1170, telemetry 1165, and high-speed switch 1025 in the end portion of the sequence diagram 1740. The order of these interactions is indicated by references 1772-1776.

References 1772-1776 are interactions within alt enclosure 1732 (alt [request succeeded]) performed conditionally when the request for an instance principal certificate at reference 1710 is not successful or fails to be received at reference 1712. At reference 1772, where instance principal certificate has not been successfully obtained at reference 1712, supplicant 1065 records the failure to receive the instance principal certificate in syslog 1170. In one embodiment, supplicant 1065 detects the absence of a current instance principal certificate, for example by examining the expiration time of the current instance principal certificate held in memory, if any, to confirm that the certificate is unexpired. Or, for example, supplicant 1065 may detect that there is no instance principal certificate held in memory at all. In response to detecting the absence of a current instance certificate, supplicant 1065 generates a command to create a new entry in syslog 1170. The command writes an error conditions record ("LOG_ERR") "Failed getting certificate" as a user-level message ("LOG_USER") in syslog 1170. Further, at reference 1774 supplicant 1065 increments a count of unsuccessful requests for an instance principal certificate by one, CertRequestsFailed, in telemetry module 1165. At reference 1776, supplicant 1065 then pauses the cluster node network membership maintenance process 1705 or causes it to sleep for a relatively short time compared to the sleep period above for successfully authenticated certificates, for example a similar period of time to maintain an appropriate polling load on PKI service 1185.

Regardless of the reason for reaching a sleep period—successful certificate request, validation, and authentication (references 1714-1726 and 1742-1746); certificate request failure (references 1772-1776); certificate validation failure (references 1754-1758); or certificate authentication failure (references 1748-1752)—after the sleep period, cluster node network membership maintenance process 1705 then repeats from reference 1710 in loop 1730. Loop 1730 continues indefinitely until the DVMH cluster node (host) is terminated.

Note that cluster node network membership maintenance process 1705 is generally run only as necessary—to join a host (such as host 1015) to cluster node network (such as high-speed dedicated network 1190), or to maintain the host's membership in the cluster node network. Cluster node network membership is static after creation (while the instance principal certificate remains valid), so there is no need to continuously check for membership. Because instance principal certificates expire after a certain amount of time (for example, after 2 hours), the supplicant (such as 802.1x supplicant 1065) must present its certificate to the switch (such as switch 1025) at some fraction of that amount of time. Using a refresh interval of one third of the expiration time of the instance principal certificate as discussed above mimics an interval that has been found to be acceptable when used for monitoring systems in load balancers—three tries before failing.

An identity failure can cause the instance principal certificate to be missing or invalid. Since the PKI service (for example, a Cavium PKI service) is dedicated in this system, the PKI service can be polled aggressively to recover the certificate. This is reflected in the short sleep periods following certificate request and validation failures.

In the event that an instance principal certificate is not generated, it is important to make the error visible so an alarm can be raised. Accordingly, such failures are promptly reported in the system log 1170 and in telemetry 1165 so that software monitoring these logs for such errors will have rapid notice of the problem, and can send an alert message to administrators indicating the failure. In one embodiment, all operations are logged, with failed operations having fine-grained counters.

In one embodiment, for each of the processes described in FIGS. 12-17C, logging in syslog 1170 on all interactions is mandatory, with LOG_INFO used for successful operations and with LOG_ERROR used for failed operations, with fine-grained counters (in telemetry 1165) for failed operations. Fine grained counters for successful operations may also be optionally enabled as an "extra credit" metric.

Also, because certificate expiration is time-based, network time protocol (NTP)—a networking protocol for clock synchronization between computer systems over packet-switched, variable-latency data networks—is configured and operating in the system in order to ensure that the host perceives current certificates to be valid.

Because cluster node network membership maintenance process 1705 is performed by the DVMH hypervisor 1050 on the bare-metal host 1015, the access to the high-speed secondary network for cluster computing is completely transparent to virtual machines hosted in the cluster. Thus, the dedicated high-speed cluster network appears simply as an available network exclusively available to virtual machines of the cluster, without any network membership operations being performed by the virtual machines of the cluster.

The authentication and access to the high-speed switch and virtual network associated with the cluster is port-based, as discussed above. In one embodiment, each virtual function of the host's NIC that is attached to the high-speed switch is given its own IP address. Therefore, advantageously, the authentication and access is performed only as often as necessary for the host's NIC, and need not be performed repeatedly to authenticate and grant access to each of the virtual functions. Further, teardown of virtual machines in the host and reassignment of their virtual functions to newly launched virtual machines does not affect the authentication and access operations of the cluster node membership maintenance process. These features reduce processing overhead in the hosts of the cluster. These features also streamline the use of the DMVH cluster because no cluster management software is required to be included in the virtual machine images, and the customer need not perform any cluster management activity in order to gain the performance benefits of the cluster for DVMHs.

Example Dedicated Virtual Machine Bare-Metal High-Performance Cluster Hosting Method In one embodiment, each step of computer-implemented methods described herein may be performed by a processor (such as processors 810 and 910 as shown and described with reference to FIGS. 8 and 9) of one or more computing devices or switches (i) accessing memory (such as memory 815 or 915 and/or other computing device components shown and described with reference to FIGS. 1, 3-5, and 7-11) and (ii) configured with logic to cause the system to execute the step of the method (such as DVMH bare-metal cluster logic 830 shown and described with reference to FIG. 8). For example, the processor accesses and reads from or writes to the memory to perform the steps of the computer-implemented methods described herein. These steps may include (i) retrieving any necessary information, (ii) calculating, determining, generating, classifying, or otherwise creating any data, and (iii) storing any data calculated, determined, generated, classified, or otherwise created. References to storage or storing indicate storage as a data structure in memory or storage/disks of a computing device (such as memory 815, or storage/disks 835 of computing device 805 or remote computers 865 shown and described with reference to FIG. 8).

In one embodiment, each subsequent step of a method commences in response to parsing a signal received or stored data retrieved indicating that the previous step has been performed at least to the extent necessary for the subsequent step to commence. Generally, the signal received or the stored data retrieved indicates completion of the previous step.

Figure 18:
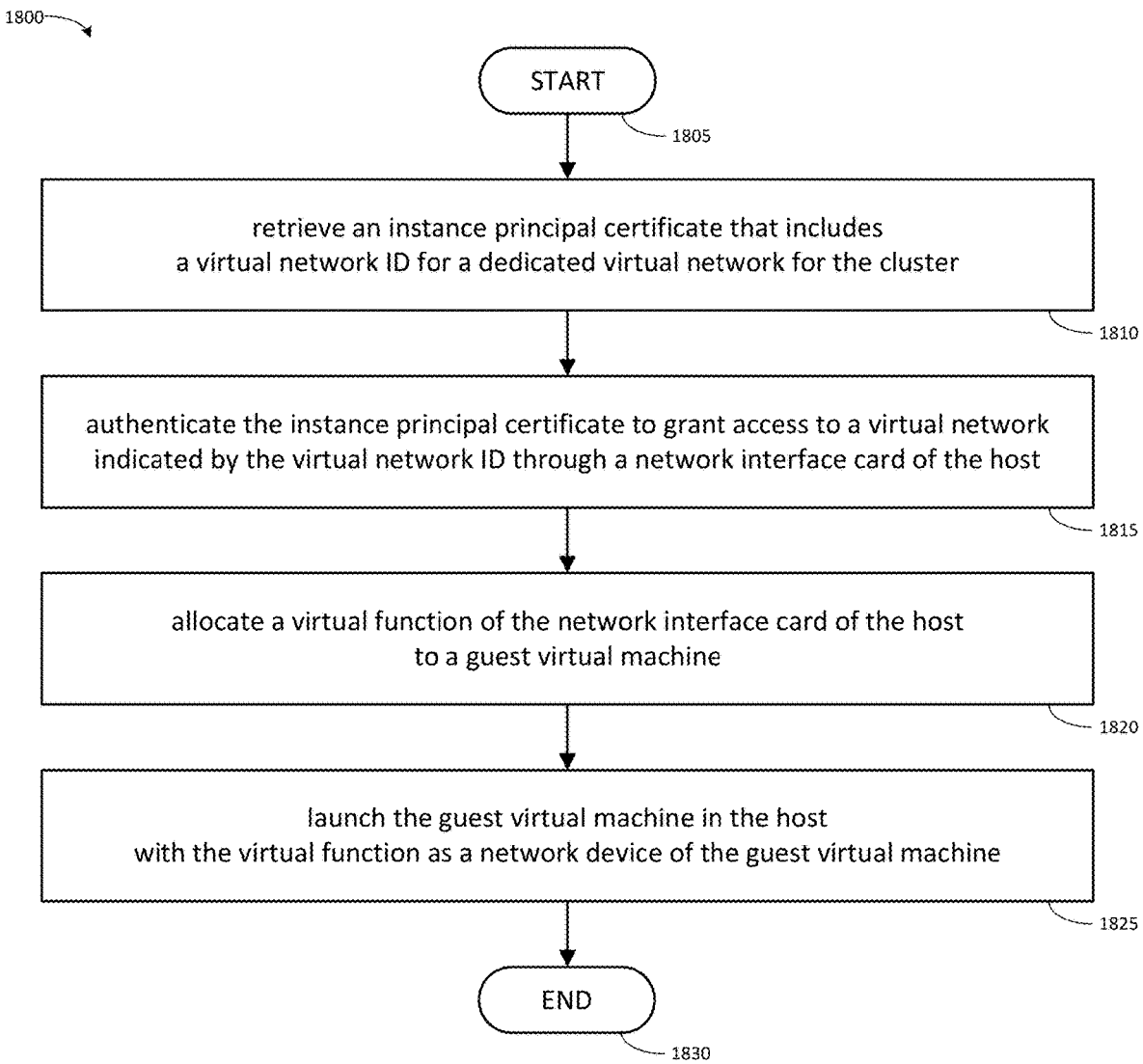
FIG. 18 illustrates an embodiment of a method for operating a dedicated virtual machine host cluster in a cloud computing infrastructure system associated with dedicated network authentication and allocation for dedicated virtual machine host clusters.

FIG. 18 illustrates an embodiment of a method 1800 for operating a dedicated virtual machine host cluster in a cloud computing infrastructure system associated with dedicated network authentication and allocation for dedicated virtual machine host clusters. In one embodiment, the steps of method 1800 are performed by components of cloud computing system 1105 (as shown and described with reference to FIG. 11). In one embodiment, cloud computing system 1105 is a set of one or more special purpose computing devices and other computing devices (such as computing device 1105) configured with DVMH bare-metal cluster logic 830, and interconnected by special purpose network equipment such as high-speed switch 1025 configured with cluster isolation logic 930. In one embodiment, the steps of method 1800 are performed at least in part by modules of a hypervisor such as DVMH hypervisor 1050 executing on a bare metal host computing device such as bare metal host 1 1015, in conjunction with a switch such as high-speed switch 1025 and other network-accessible computing hosts of various modules (such as cloud services 1005 and other cloud system modules 1145) accessed by the hypervisor and switch.

The method 1800 may be initiated based on various triggers, such as receiving a signal over a network or parsing stored data indicating that (i) a user (or customer or administrator) of cloud computing system 1105 has initiated method 1800, for example in response to a request from a client in enterprise network 1100 to initiate a DVMH cluster, or (ii) that that method 1800 is scheduled to be initiated at defined times or time intervals, for example where DVMH cluster capacity is supposed to be initiated and made available to clients on a set schedule. The method 1800 initiates at START block 1805 in response to parsing a signal received or stored data retrieved and determining that the signal or stored data indicates that the method 1800 should begin. Processing continues to process block 1810.

At process block 1810, the processor retrieves an instance principal certificate that includes a virtual network identifier for a dedicated virtual network for the cluster by a host computing device. In one embodiment, before the retrieval of the instance principal certificate, the virtual network identifier is assigned to cluster and the virtual network identifier (and therefore, also, the cluster) is associated with a customer entity. The instance principal certificate is then generated by a PKI service that is configured to retrieve the assigned virtual network identifier and include it in the instance principal certificate, for example as an attribute of the certificate. The generated instance principal certificate is stored, and transmitted automatically to host computing devices by the PKI service in response to receiving a request for the instance principal certificate from the host. In one embodiment, the request indicates that the host is associated with the cluster or customer entity, which indicates to the PKI service which instance principal certificate to provide from among certificates for multiple clusters. In one embodiment, PKI service is dedicated to the customer entity and/or cluster, and provides only certificates for the cluster.

Once the processor has thus completed retrieving an instance principal certificate that includes a virtual network identifier for a dedicated virtual network for the cluster by a host computing device, processing at process block 1810 completes, and processing continues to process block 1815. Further features and embodiments of instance principal certificate retrieval are discussed elsewhere in this document, for example with reference to FIGS. 1, 6, 10-11, and 17A-17C.

At process block 1815, the processor authenticates the instance principal certificate by the host against a switch to grant access of the host to a virtual network indicated by the virtual network identifier through a network interface card of the host. In one embodiment, the instance principal certificate is passed within an authentication by the host through a logical uncontrolled port of a physical switch port. The logical uncontrolled port is configured to accept only authentication traffic. In response to receiving the instance principal certificate, the switch automatically extracts the virtual network identifier from the instance principal certificate, for example as part of a custom certificate authentication procedure configured to detect and separate the virtual network identifier from the attributes of the instance principal certificate. In response to authenticating the instance principal certificate and obtaining the virtual network identifier, the switch automatically creates a virtual network identified by the virtual network identifier if one does not already exist, automatically opens the logical controlled port of the physical switch port if it is not already opened, and automatically directs all network traffic arriving at the logical controlled port of the physical switch port into the virtual network indicated by the virtual network identifier while the instance principal certificate remains unexpired. Note that once the instance principal certificate expires, and if no new certificate having the same virtual network identifier and having a later expiration has been provided, the switch may terminate the virtual network identified by the virtual network identifier and close the logical controlled port.

Once the processor has thus completed authenticating the instance principal certificate by the host against a switch to grant access of the host to a virtual network indicated by the virtual network identifier through a network interface card of the host, processing at process block 1815 completes, and processing continues to process block 1820. Further features and embodiments of instance principal certificate authentication are discussed elsewhere in this document, for example with reference to FIGS. 1-6, 10-11, and 17A-17C.

At process block 1820, the processor allocates a virtual function of the network interface card of the host to a guest virtual machine. In one embodiment, during the allocation of the virtual function to the guest virtual machine, a device identifier of an unassigned virtual function is retrieved from a virtual function pool list of virtual functions of the network interface card. That virtual function is marked to be assigned to the guest virtual machine. That virtual function is also marked as in-use or allocated. The virtual functions are allocated in a one-to-one relationship with guest virtual machines. In one embodiment, the virtual function is automatically allocated in response to a request to launch a virtual machine within the host.

Once the processor has thus completed allocating a virtual function of the network interface card of the host to a guest virtual machine, processing at process block 1820 completes, and processing continues to process block 1825. Further features and embodiments of virtual function allocation are discussed elsewhere in this document, for example with reference to FIGS. 10-11 and 15-16.

At process block 1825, the processor launches the guest virtual machine in the host with the virtual function as a network device of the guest virtual machine. In one embodiment, during the launch of the guest virtual machine, the device identifier for the allocated virtual function is provided as a network device parameter for the guest virtual machine in the virtual machine launch workflow to cause the virtual function to be assigned as the network device of the guest virtual machine.

Once the processor has thus completed launching the guest virtual machine in the host with the virtual function as a network device of the guest virtual machine, processing at process block 1825 completes, and processing continues to END block 1830, where process 1800 ends. Further features and embodiments of guest virtual machine launch are discussed elsewhere in this document, for example with reference to FIGS. 10-11 and 15-16.

In one embodiment, additional hosts may join the cluster by retrieving the instance principal certificate from the PKI service and authenticating the instance principal certificate against the switch. In one embodiment, the instance principal certificate is retrieved by one or more additional hosts to be added to the cluster. The instance principal certificate held by each of the additional hosts is authenticated by each of the additional hosts against the switch in order to grant access to the virtual network to the additional host. Further features and embodiments of joining the cluster are discussed elsewhere in this document.

In one embodiment, additional guest virtual machines can be launched by hosts (including both the initial host and additional hosts) in the cluster. For each host, the hypervisor may allocate an available virtual function to each of one or more additional guest virtual machines in a one-to-one relationship and launch the additional guest virtual machine in the host with the allocated available virtual function as the network device of the additional virtual machine. Further features and embodiments of guest virtual machine launch are discussed elsewhere in this document.

Hosts (including both the initial host and additional hosts) in the cluster can also maintain their membership in the cluster by retrieving and authenticating updated instance principal certificates within the lifetime of the instance principal certificate previously submitted by the host. In one embodiment, during the operation of the cluster, the host repeatedly (i) retrieves an updated instance principal certificate that includes the virtual network identifier from the PKI service and (ii) authenticates the updated instance principal certificate against the switch to maintain the access of the host to the virtual network indicated by the virtual network identifier at an interval less than a lifetime of instance principal certificates. Further features and embodiments of cluster membership maintenance are discussed elsewhere in this document, for example with reference to FIGS. 17A-17C.

The number of allocatable virtual functions for an SR-IOV-enabled NIC may be limited. Accordingly, once a guest virtual machine is torn down on the host, the virtual function that was assigned to the terminated guest virtual machine is automatically marked available for reassignment to a new guest virtual machine. In one embodiment, in response to an instruction to teardown the guest virtual machine, the hypervisor automatically recovers the virtual function allocated to the guest virtual machine by marking the virtual function to be available for further allocation. Further features and embodiments of cluster membership maintenance are discussed elsewhere in this document, for example with reference to FIG. 16.

In one embodiment, the network interface card is a secondary SR-IOV-enabled high-speed network interface card of the host in addition to a primary general network interface card, as discussed in further detail elsewhere in this document. In this configuration, retrieval of the instance principal certificate occurs through the primary general network interface card, and the authentication occurs through the secondary high-speed network interface card.

In one embodiment, each instance principal certificate retrieval and authentication and each virtual function allocation is performed by the host without the participation of any guest virtual machine on the host. This reduces user-perceived complexity of using a DVMH cluster, and renders the cluster networking transparent or invisible to the guest virtual machines. Cluster networking overhead is also reduced—the guest virtual machines need no special configuration to manage the cluster networking and need not perform any functions to maintain the cluster networking. In one embodiment, as discussed in further detail elsewhere in this document, the host is a bare metal computing device provisioned with a hypervisor configured to execute steps of the retrieval, authentication, allocation, and launch without the participation of any guest virtual machine on the host.

Definitions and Other Embodiments

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
BM: bare metal.
CD: compact disk.
CD-R: CD recordable.
CD-RW: CD rewriteable.
CN: cluster networking.
DRAM: dynamic RAM.
DVMH: dedicated virtual machine host.
DVD: digital versatile disk and/or digital video disk.
EPROM: erasable PROM.
EEPROM: electrically erasable PROM.
Gbps: gigabit-per-second.
HPC: high-performance computing.

LAN: local area network.
MAC: media access control.
NIC: network interface card.
NTP: network time protocol.
PKI: public key infrastructure.
PROM: programmable ROM.
RAM: random access memory.
RDMA: Remote Direct Memory Access.
ROM: read only memory.
SR-IOV: single root input/output virtualization.
SRAM: synchronous RAM.
USB: universal serial bus.
VF: virtual function.
VLAN: virtual LAN.
VM: virtual machine.
WAN: wide area network.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection. Any connection described herein may be presumed to be an operable connection, except where expressly stated otherwise.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A method for operating a dedicated virtual machine host cluster, comprising:
   retrieving, by a host computing device, an instance principal certificate that includes a virtual network identifier for a dedicated virtual network for the cluster;
   authenticating the instance principal certificate by the host against a switch to grant the host access to the dedicated virtual network indicated by the virtual network identifier, wherein the access is through a network interface card of the host;
   wherein the authenticating includes passing the instance principal certificate to the switch and through a logical uncontrolled port of a physical switch port that is configured to accept only authentication traffic;
   in response to the switch receiving the instance principal certificate, detecting and obtaining the virtual network identifier from the instance principal certificate;
   in response to authenticating the instance principal certificate and obtaining the virtual network identifier by the switch, automatically directing network traffic arriving at a logical controlled port of the physical switch port into the dedicated virtual network indicated by the virtual network identifier while the instance principal certificate remains unexpired;
   allocating a virtual function of the network interface card of the host to a guest virtual machine to cause network traffic of the guest virtual machine to pass through the dedicated virtual network; and
   launching the guest virtual machine in the host with the virtual function as a network device of the guest virtual machine.

2. The method of claim 1, further comprising:
   before the retrieval of the instance principal certificate, assigning the virtual network identifier to the cluster and associate the virtual network identifier with a customer entity, and generating the instance principal certificate by a public key infrastructure service that is configured to retrieve the virtual network identifier and include it in the instance principal certificate;

during the allocation of the virtual function to the guest virtual machine, retrieving a device identifier of an unassigned virtual function from a virtual function pool list of virtual functions of the network interface card and marking that virtual function to be assigned to the guest virtual machine; and during the launch of the guest virtual machine, providing the device identifier for the allocated virtual function as a network device parameter for the guest virtual machine to cause the virtual function to be assigned as the network device of the guest virtual machine.

3. The method of claim 1, further comprising:

retrieving the instance principal certificate by one or more additional hosts to be added to the cluster;

authenticating the instance principal certificate by each of the additional hosts against the switch to grant access to the virtual network to the additional host; and for each additional host, allocate an available virtual function to each of one or more additional guest virtual machines in a one-to-one relationship and launch the additional guest virtual machine in the additional host with the allocated available virtual function as the network device of the additional virtual machine;

wherein each instance principal certificate retrieval and authentication and each virtual function allocation is performed by the host without participation of any guest virtual machine on the host.

4. The method of claim 1, further comprising:

during the operation of the cluster, repeatedly (i) retrieving an updated instance principal certificate that includes the virtual network identifier by the host and (ii) authenticating the updated instance principal certificate against the switch to maintain the access of the host to the virtual network indicated by the virtual network identifier at an interval less than a lifetime of instance principal certificates.

5. The method of claim 1, further comprising, in response to an instruction to teardown the guest virtual machine, recovering the virtual function allocated to the guest virtual machine by marking the virtual function to be available for further allocation.

6. The method of claim 1, wherein:

the network interface card is a secondary SR-IOV-enabled high-speed network interface card of the host in addition to a primary general network interface card; and the retrieval of the instance principal certificate occurs through the primary general network interface card, and the authentication occurs through the secondary high-speed network interface card.

7. The method of claim 1, wherein:

the host is a bare metal computing device provisioned with a hypervisor configured to execute steps of the retrieval, authentication, allocation, and launch.

8. A non-transitory computer-readable medium storing computer-executable instructions for operating a dedicated virtual machine host cluster that, when executed by at least a processor of a cloud computing infrastructure cause the cloud computing infrastructure to:

retrieve, by a host computing device, an instance principal certificate that includes a virtual network identifier for a dedicated virtual network for the cluster;

authenticate the instance principal certificate by the host against a switch to grant the host access to the dedicated virtual network indicated by the virtual network identifier, wherein the access is through a network interface card of the host;

wherein the authenticating includes passing the instance principal certificate to the switch and through a logical uncontrolled port of a physical switch port that is configured to accept only authentication traffic;

in response to the switch receiving the instance principal certificate, detect and obtain the virtual network identifier from the instance principal certificate;

in response to authenticating the instance principal certificate and obtaining the virtual network identifier by the switch, automatically direct network traffic arriving at a logical controlled port of the physical switch port into the dedicated virtual network indicated by the virtual network identifier while the instance principal certificate remains unexpired; and allocate a virtual function of the network interface card of the host to a guest virtual machine to cause network traffic of the guest virtual machine to pass through the dedicated virtual network.

9. The non-transitory computer-readable medium of claim 8, wherein the instructions further cause the cloud computing infrastructure to:

before the retrieval of the instance principal certificate, assign the virtual network identifier to the cluster and associate the virtual network identifier with a customer entity, and generate the instance principal certificate by a public key infrastructure service that is configured to retrieve the virtual network identifier and include it in the instance principal certificate;

during the allocation of the virtual function to the guest virtual machine, retrieve a device identifier of an unassigned virtual function from a virtual function pool list of virtual functions of the network interface card and mark that virtual function to be assigned to the guest virtual machine; and launch the guest virtual machine in the host with the virtual function as a network device of the guest virtual machine;

wherein during the launch of the guest virtual machine, provide the device identifier for the allocated virtual function as a network device parameter for the guest virtual machine to cause the virtual function to be assigned as the network device of the guest virtual machine.

10. The non-transitory computer-readable medium of claim 8, wherein the instructions further cause the cloud computing infrastructure to:

retrieve the instance principal certificate by one or more additional hosts to be added to the cluster;

authenticate the instance principal certificate by each of the additional hosts against the switch to grant access to the virtual network to the additional host; and for each additional host, allocate an available virtual function to each of one or more additional guest virtual machines in a one-to-one relationship and launch the additional guest virtual machine in the additional host with the allocated available virtual function as the network device of the additional virtual machine;

wherein each instance principal certificate retrieval and authentication and each virtual function allocation is performed by the host without participation of any guest virtual machine on the host.

11. The non-transitory computer-readable medium of claim 8, wherein the instructions further cause the cloud computing infrastructure to:
during the operation of the cluster, repeatedly
(i) retrieve an updated instance principal certificate that includes the virtual network identifier by the host and
(ii) authenticate the updated instance principal certificate against the switch to maintain the access of the host to the virtual network indicated by the virtual network identifier
at an interval less than a lifetime of instance principal certificates.

12. The non-transitory computer-readable medium of claim 8, wherein the instructions further cause the cloud computing infrastructure to, in response to an instruction to teardown the guest virtual machine, recover the virtual function allocated to the guest virtual machine by marking the virtual function to be available for further allocation.

13. The non-transitory computer-readable medium of claim 8, wherein:
the network interface card is a secondary SR-IOV-enabled high-speed network interface card of the host in addition to a primary general network interface card; and
the retrieval of the instance principal certificate occurs through the primary general network interface card, and the authentication occurs through the secondary high-speed network interface card.

14. The non-transitory computer-readable medium of claim 8, wherein the instructions further cause the cloud computing infrastructure to provision a bare metal computing device with a hypervisor configured to execute steps of the retrieval, authentication, allocation, and launch to create the host.

15. A cloud computing infrastructure for operating a dedicated virtual machine host cluster, comprising:
a high-speed switch;
more than one host computing devices connected to a general network through a network interface card and connected to the high-speed switch through a high-speed network interface card;
a public key infrastructure service accessible through the general network;
non-transitory computer-readable media storing computer-executable instructions which, when executed by at least a processor of a cloud computing infrastructure cause the cloud computing infrastructure to:
retrieve, by a host of the host computing devices, an instance principal certificate that includes a virtual network identifier for a dedicated virtual network for the cluster from a certificate service;
authenticate the instance principal certificate by the host against the high-speed switch to grant access of the host to a to the dedicated virtual network indicated by the virtual network identifier, wherein the access is through the high-speed network interface card of the host;
wherein the authenticating includes passing the instance principal certificate to the high-speed switch and through a logical uncontrolled port of a physical switch port that is configured to accept only authentication traffic;
in response to the high-speed switch receiving the instance principal certificate, detect and obtain the virtual network identifier from the instance principal certificate;
in response to authenticating the instance principal certificate and obtaining the virtual network identifier by the high-speed switch, automatically direct network traffic arriving at a logical controlled port of the physical switch port into the dedicated virtual network indicated by the virtual network identifier while the instance principal certificate remains unexpired; and
allocate a virtual function of the high-speed network interface card of the host to a guest virtual machine to cause network traffic of the guest virtual machine to pass through the dedicated virtual network.

16. The cloud computing infrastructure of claim 15, wherein the non-transitory computer-readable media further comprise instructions that cause the cloud computing infrastructure to:
before the retrieval of the instance principal certificate,
assign the virtual network identifier to the cluster and associate the virtual network identifier with a customer entity, and
generate the instance principal certificate using the public key infrastructure service by retrieving the virtual network identifier and including it in the instance principal certificate;
during the allocation of the virtual function to the guest virtual machine by the host, retrieve a device identifier of an unassigned virtual function from a virtual function pool list of virtual functions of the network interface card and mark that virtual function to be assigned to the guest virtual machine; and
launch the guest virtual machine in the host with the virtual function as a network device of the quest virtual machine;
during the launch of the guest virtual machine by the host, provide the device identifier for the allocated virtual function as a network device parameter for the guest virtual machine to cause the virtual function to be assigned as the network device of the guest virtual machine.

17. The cloud computing infrastructure of claim 15, wherein the non-transitory computer-readable media further comprise instructions that cause the cloud computing infrastructure to:
retrieve the instance principal certificate from the public key infrastructure service by one or more additional hosts to be added to the cluster;
authenticating the instance principal certificate by the each of the additional hosts against the high-speed switch to grant access to the virtual network to the additional host; and
for each additional host, allocate an available virtual function to each of one or more additional guest virtual machines in a one-to-one relationship and launch the additional guest virtual machine in the additional host with the allocated available virtual function as the network device of the additional virtual machine;
wherein each instance principal certificate retrieval and authentication and each virtual function allocation is performed by the host without participation of any guest virtual machine on the host.

18. The cloud computing infrastructure of claim 15, wherein the non-transitory computer-readable media further comprise instructions that cause the cloud computing infrastructure to, during the operation of the cluster, repeatedly
  (i) retrieve by the host from the public key infrastructure service an updated instance principal certificate that includes the virtual network identifier; and
  (ii) authenticate the updated instance principal certificate against the high-speed switch to maintain the access of the host to the virtual network indicated by the virtual network identifier at an interval less than a lifetime of instance principal certificates.

19. The cloud computing infrastructure of claim 15, wherein the non-transitory computer-readable media further comprise instructions that cause the cloud computing infrastructure to, in response to an instruction to teardown the guest virtual machine, recover the virtual function allocated to the guest virtual machine by marking the virtual function to be available for further allocation.

20. The cloud computing infrastructure of claim 15, wherein:
  the host is a bare metal computing device provisioned with a hypervisor configured to execute steps of the retrieval, authentication, allocation, and launch without participation of any guest virtual machine on the host.

\* \* \* \* \*

UNITED STATES PATENT AND TRADEMARK OFFICE
CERTIFICATE OF CORRECTION

PATENT NO. : 11,489,827 B2
APPLICATION NO. : 17/092682
DATED : November 1, 2022
INVENTOR(S) : Knotwell et al.

Page 1 of 1

It is certified that error appears in the above-identified patent and that said Letters Patent is hereby corrected as shown below:

In the Drawings

On sheet 2 of 20, in FIG. 2, under Reference Numeral 215, Line 2, delete "Identifer" and insert -- Identifier --, therefor.

In the Specification

In Column 6, Line 60, delete "solution" and insert -- solution. --, therefor.

In Column 8, Line 18, delete "and or" and insert -- and/or --, therefor.

In Column 16, Line 50, delete "510" and insert -- 510. --, therefor.

In Column 19, Line 10, delete "terminated," and insert -- terminated), --, therefor.

In Column 25, Line 9, delete "1005" and insert -- 1005. --, therefor.

In Column 45, Line 39, delete "that that" and insert -- that --, therefor.

In the Claims

In Column 53, Lines 58-59, in Claim 15, after "access" delete "of the host to a", therefor.

Signed and Sealed this
Sixth Day of June, 2023

Katherine Kelly Vidal
*Director of the United States Patent and Trademark Office*